(12) United States Patent
Betzer-Zilevitch

(10) Patent No.: US 8,424,601 B2
(45) Date of Patent: *Apr. 23, 2013

(54) SYSTEM AND METHOD FOR MINIMIZING THE NEGATIVE ENVIROMENTAL IMPACT OF THE OILSANDS INDUSTRY

(75) Inventor: Maoz Betzer-Zilevitch, Woodbine (CA)

(73) Assignee: Ex-Tar Technologies Inc., Calgary, Alberta (CA)

(*) Notice: Subject to any disclaimer, the term of this patent is extended or adjusted under 35 U.S.C. 154(b) by 459 days.

This patent is subject to a terminal disclaimer.

(21) Appl. No.: 12/636,729

(22) Filed: Dec. 12, 2009

(65) Prior Publication Data

US 2010/0147516 A1    Jun. 17, 2010

Related U.S. Application Data

(60) Provisional application No. 61/122,195, filed on Dec. 12, 2008.

(30) Foreign Application Priority Data

May 12, 2009  (CA) ...................................... 2665747

(51) Int. Cl.
*E21B 43/24* (2006.01)

(52) U.S. Cl.
USPC ........................................ 166/272.3; 166/302

(58) Field of Classification Search .................. None
See application file for complete search history.

(56) References Cited

U.S. PATENT DOCUMENTS

| | | | |
|---|---|---|---|
| 4,969,520 A | 11/1990 | Jan et al. | |
| 6,027,056 A | 2/2000 | Maciejewski | |
| 6,036,748 A | 3/2000 | Wallace et al. | |

(Continued)

FOREIGN PATENT DOCUMENTS

| | | |
|---|---|---|
| CA | 1211063 A | 9/1986 |
| WO | WO 2006 016042 A1 | 2/2006 |

OTHER PUBLICATIONS

"Past, Present and Future of Tailing" a presentation by Mark Shaw of Suncor Energy, Alan Fair of Syncrude and Jonathan Matthews of Shell Canada Energy on Dec. 7-10, 2008 at the International Oil Sands Tailings Conference in Edmonton, Alberta.

(Continued)

*Primary Examiner* — Angela M DiTrani
(74) *Attorney, Agent, or Firm* — Andrew W. Chu; Craft Chu PLLC

(57) ABSTRACT

A method and system for the use of low quality fuel and solids-rich water, like fine tailings or lime sludge, for extracting bitumen from shallow and deep underground oil sand formations. The method includes the steps of combustion fuel and oxidizing gas, mixing hot combustion gas with solids-rich water under controlled pressure, gasifying the liquid water to steam and solids, removing the solids from the gas phase to generate a solid lean gas, recovering the heat and condensing the steam to generate hot water, mixing the hot water with oilsands ore for extracting bitumen. The solid lean gas is mixed with saturated water to scrub the remaining solids and acid gases and produce saturated steam. The solids-rich saturated water is recycled and gasified by being mixed with the combustion gases, and the saturated steam is condensed to generate heat and condensate for steam generation for use in enhanced oil recovery.

33 Claims, 45 Drawing Sheets

Heating fine-tailings to evaporate the water from the fine-tailings and generating a stream of steam, solids and combustion gas.

⇓

Removing the solids from the gas phase to generate combustion gases and steam flow.

⇓

Extracting heat from the solid lean gas stream while condensing the steam into useable liquid water.

⇓

Using the extracted heat to heat the process water flow.

⇓

Using the hot process water for bitumen extraction.

U.S. PATENT DOCUMENTS

| | | | |
|---|---|---|---|
| 6,706,199 | B2 | 3/2004 | Winter |
| 2005/0279500 | A1 | 12/2005 | Heins |
| 2009/0020458 | A1 | 1/2009 | Bozak |
| 2010/0282644 | A1* | 11/2010 | O'Connor et al. ............ 208/427 |

OTHER PUBLICATIONS

"The Waters That Bind Us: Transboundary Implications of Oil Sands Development" by Holroyd, Peggy, and Terra Simieritsch of the Pembina Institute, Feb. 2009.

"Oil Sands Tailings: Regulatory Perspective" presentation by Richard Houlihan and Haneef Mian from the ECRB, presented on Dec. 10, 2008 at the International Oil Sands Tailings Conference in Edmonton, Alberta.

"Tailings Performance Criteria and Requirements for Oil Sands Mining Schemes", Directive 074 by Energy Resources Conservation Board, Feb. 3, 2009.

"TSSG-SAGD-MC and Industrial Applications with Multi-Circulation" by Babcock & Wilcox Canada, published 2010.

"Non Segregating Tailings at the Horizon Oil Sands Project" by Canadian Natural Resources Ltd., published 2008.

"Past, Present, and Future of Tailings: Tailings Experience at Albian Sands Energy" by Jonathan Matthews, Shell Canada Energy, Dec. 8, 2008.

"Past, Present, and Future of Tailings: Management—Suncor Energy" by Mark Shaw, International Oil Sands Tailings Conference—Edmonton AB, Dec. 7, 2008.

"The Past, Present and Future of Tailings at Syncrude" by Alan Fair, International Oil Sands Tailings Conference, Dec. 7-10, 2008.

\* cited by examiner

| /L11 (Material Stream) | | | | |
|---|---|---|---|---|
| Prop Pkg: Gasification | | | | |
| Connections | | | | |
| Material Inlets | | | | |
| | Connection | | Up Stream Unit Op | |
| In | CRx1 | | ---- | |
| Material Outlets | | | | |
| | Connection | | Down Stream Unit Op | |
| Out | CX-01 | | ---- | |
| External Signal Connections | | | | |
| | Connection | | Value | |
| T [C] | CN-1.In | | | 250.1 |
| Equilibrium Results | | | | |
| PropName | Bulk | Vapour | Liquid0 | |
| Phase Fract | 1.00 | 0.95 | 0.05 | |
| T [C] | 250.1 | 250.1 | 250.1 | |
| P [kPa] | 1061.93 | 1061.93 | 1061.93 | |
| MoleFlow [kgmole/h] | 936.07 | 885.00 | 51.08 | |
| MassFlow [kg/h] | 23546.93 | 20216.80 | 3329.63 | |
| Fraction [Fraction] | | | | |
| WATER | 0.6093 | 0.6315 | 0.1667 | |
| CARBON DIOXIDE | 0.0626 | 0.0660 | 0.0006 | |
| CARBON MONOXIDE | 1.32E-05 | 1.40E-05 | 6.98E-08 | |
| OXYGEN | 0.0052 | 0.0055 | 0.0000 | |
| HYDROGEN | 4.46E-06 | 4.71E-06 | 4.67E-08 | |
| ARGON | 0.0035 | 0.0037 | 0.0000 | |
| NITROGEN | 0.2757 | 0.2915 | 0.0011 | |
| ExampleFeedCoal* | 0.00 | 0.00 | 0.00 | |
| gALUMINUM OXIDE | 7.02E-04 | 2.65E-11 | 1.29E-02 | |
| gCALCIUM OXIDE | 3.41E-04 | 1.29E-11 | 6.25E-03 | |
| gDIIRON TRIOXIDE | 2.05E-04 | 7.55E-12 | 3.86E-03 | |
| gMAGNESIUM OXIDE | 1.49E-04 | 5.62E-12 | 2.73E-03 | |
| gMANGANESE OXIDE | 0.00E+00 | 0.00E+00 | 0.00E+00 | |
| gDISODIUM OXIDE | 7.86E-05 | 2.96E-12 | 1.44E-03 | |
| gSILICON DIOXIDE | 0.0373 | 0.0000 | 0.6837 | |
| AMMONIA | 2.47E-04 | 2.61E-04 | 5.22E-06 | |
| HYDROGEN CYANIDE | 1.04E-04 | 1.10E-04 | 8.19E-06 | |
| CARBONYL SULFIDE | 5.85E-04 | 6.17E-04 | 2.19E-05 | |
| HYDROGEN SULFIDE | 5.86E-04 | 6.12E-04 | 1.25E-05 | |
| METHANE | 0.00E+00 | 0.00E+00 | 0.00E+00 | |
| ETHYLENE | 0.00E+00 | 0.00E+00 | 0.00E+00 | |
| ETHANE | 0.00E+00 | 0.00E+00 | 0.00E+00 | |
| PROPANE | 0.00E+00 | 0.00E+00 | 0.00E+00 | |
| n-BUTANE | 0.00E+00 | 0.00E+00 | 0.00E+00 | |
| SULFUR DIOXIDE | 3.72E-05 | 3.93E-05 | 1.69E-06 | |
| SULFUR | 0.00E+00 | 0.00E+00 | 0.00E+00 | |
| gCALCIUM CARBONATE | 0.00E+00 | 0.00E+00 | 0.00E+00 | |
| DeGypsum* | 0.00E+00 | 0.00E+00 | 0.00E+00 | |
| CalciumSulfite* | 0.0065 | 0.0000 | 0.1188 | |

FIG. 22

| /L20 (Material Stream) | | | | |
|---|---|---|---|---|
| Prop Pkg: APRNGL | | | | |
| Connections | | | | |
| Material Inlets | | | | |
| | Connection | | Up Stream Unit Op | |
| In | SX-02 | | ---- | |
| Material Outlets | | | | |
| | Connection | | Down Stream Unit Op | |
| Out | ---- | | ---- | |
| Equilibrium Results | | | | |
| PropName | Bulk | Vapour | Liquid0 | |
| Phase Fract | 1.00 | 0.00 | 1.00 | |
| T [C] | 90.0 | 90.0 | 90.0 | |
| P [kPa] | 1050.00 | 1050.00 | 1050.00 | |
| MoleFlow [kgmole/h] | 5786.41 | 0.00 | 5786.41 | |
| MassFlow [kg/h] | 104297.98 | 0.00 | 104297.98 | |
| Fraction [Fraction] | | | | |
| WATER | 0.9996 | 0.0691 | 0.9996 | |
| CARBON DIOXIDE | 3.15E-04 | 1.73E-01 | 3.15E-04 | |
| CARBON MONOXIDE | 3.66E-10 | 3.49E-05 | 3.66E-10 | |
| OXYGEN | 1.63E-06 | 1.38E-02 | 1.63E-06 | |
| HYDROGEN | 3.59E-10 | 1.18E-05 | 3.59E-10 | |
| ARGON | 1.04E-06 | 9.34E-03 | 1.04E-06 | |
| NITROGEN | 6.42E-05 | 7.31E-01 | 6.42E-05 | |
| AMMONIA | 3.93E-06 | 5.50E-06 | 3.93E-06 | |
| HYDROGEN CYANIDE | 4.12E-07 | 2.55E-04 | 4.12E-07 | |
| CARBONYL SULFIDE | 2.00E-06 | 1.50E-03 | 2.00E-06 | |
| HYDROGEN SULFIDE | 1.15E-05 | 1.68E-03 | 1.15E-05 | |
| METHANE | 1.00E-100 | 1.00E-100 | 1.00E-100 | |
| ETHYLENE | 1.00E-100 | 1.00E-100 | 1.00E-100 | |
| ETHANE | 1.00E-100 | 1.00E-100 | 1.00E-100 | |
| PROPANE | 1.00E-100 | 1.00E-100 | 1.00E-100 | |
| n-BUTANE | 1.00E-100 | 1.00E-100 | 1.00E-100 | |
| SULFUR DIOXIDE | 5.83E-06 | 1.56E-04 | 5.83E-06 | |
| SULFUR | 1.00E-100 | 1.00E-100 | 1.00E-100 | |

FIG. 23

| | Flow 64 (Air) | Flow 60 (Fuel) | Flow 61 (Limestone) | Hot water generated from Flow 51 | Flow 1 (combustion gas from the pressurized boiler) | Flow 30 (Cold process water) | Flow 32 (NCG) | Flow 33 (Hot process water for tar recovery) | Total hot process water (Flows 33 and 51 combined) |
|---|---|---|---|---|---|---|---|---|---|
| | System Pressure: 103kpa | | | Compressor Energy Input: 11.17 KW | | | | | |
| T, C | 25.00 | 25.00 | 25.00 | 75.00 | 800.00 | 20.00 | 46.36 | 75.11 | 75.11 |
| P, kPa | 1.00 | 103.00 | 103.00 | 103.00 | 103.00 | 103.00 | 103.00 | 103.00 | 103.00 |
| Vapor Fraction | 1.00 | 0.00 | 0.00 | 0.00 | 1.00 | 0.00 | 1.00 | 0.00 | 0.00 |
| Enthalpy, MJ/h | -71.77 | -16081.00 | -4809.68 | -1162993.00 | -33389.09 | -817804.00 | -51502.73 | -799690.00 | -1962683.00 |
| Mass Flow rate, kg/h | 12672.09 | 2070.00 | 250.00 | 74314.05 | 14621.72 | 51500.00 | 15022.35 | 51099.37 | 125413.42 |
| Petcock | 0.00 | 1000.00 | 0.00 | 0.00 | 0.00 | 0.00 | 0.00 | 0.00 | |
| H2O | 0.00 | 1000.00 | 0.00 | 74314.05 | 1000.00 | 51500.00 | 1414.42 | 51085.58 | 125399.63 |
| CO2 | 7.70 | 0.00 | 0.00 | 0.00 | 3671.84 | 0.00 | 3670.19 | 1.65 | |
| O2 | 2930.56 | 0.00 | 0.00 | 0.00 | 196.55 | 0.00 | 196.54 | 0.01 | |
| N2 | 9573.56 | 0.00 | 0.00 | 0.00 | 9573.56 | 0.00 | 9573.31 | 0.24 | |
| S | 0.00 | 70.00 | 0.00 | 0.00 | 0.00 | 0.00 | 0.00 | 0.00 | |
| SO2 | 0.00 | 0.00 | 0.00 | 0.00 | 6.99 | 0.00 | 6.80 | 0.19 | |
| CaCO3 | 0.00 | 0.00 | 250.00 | 0.00 | 12.50 | 0.00 | 0.82 | 11.68 | |
| | System Pressure: 2bar | | | Compressor Energy Input: 288.71 KW | | | | | |
| T, C | 25.00 | 25.00 | 25.00 | 75.00 | 800.00 | 20.00 | 34.07 | 75.90 | 75.90 |
| P, bar | 1.00 | 2.00 | 2.00 | 2.00 | 2.00 | 2.00 | 2.00 | 2.00 | 2.00 |
| Vapor Fraction | 1.00 | 0.00 | 0.00 | 0.00 | 1.00 | 0.00 | 1.00 | 0.00 | 0.00 |
| Enthalpy, MJ/h | -71.77 | -16080.97 | -4808.97 | -1231313.00 | -33395.21 | -952781.00 | -39998.18 | -946178.00 | -2177491.00 |
| Mass Flow rate, kg/h | 12672.09 | 2070.00 | 250.00 | 78679.63 | 14621.72 | 60000.00 | 14146.83 | 60474.89 | 139154.52 |
| Petcock | 0.00 | 1000.00 | 0.00 | 0.00 | 0.00 | 0.00 | 0.00 | 0.00 | |
| H2O | 0.00 | 1000.00 | 0.00 | 78679.63 | 1000.00 | 60000.00 | 543.03 | 60456.97 | 139136.60 |
| CO2 | 7.70 | 0.00 | 0.00 | 0.00 | 3671.84 | 0.00 | 3667.09 | 4.76 | |
| O2 | 2930.56 | 0.00 | 0.00 | 0.00 | 196.55 | 0.00 | 196.52 | 0.03 | |
| N2 | 9573.56 | 0.00 | 0.00 | 0.00 | 9573.56 | 0.00 | 9572.84 | 0.71 | |
| S | 0.00 | 70.00 | 0.00 | 0.00 | 0.00 | 0.00 | 0.00 | 0.00 | |
| SO2 | 0.00 | 0.00 | 0.00 | 0.00 | 6.99 | 0.00 | 6.37 | 0.62 | |
| CaCO3 | 0.00 | 0.00 | 250.00 | 0.00 | 12.50 | 0.00 | 0.74 | 11.76 | |
| | System Pressure: 5 bar | | | Compressor Energy Input: 769.53 KW | | | | | |
| T, C | 25.00 | 25.00 | 25.00 | 75.00 | 800.00 | 20.00 | 31.22 | 75.01 | 75.01 |
| P, bar | 1.00 | 5.00 | 5.00 | 5.00 | 5.00 | 5.00 | 5.00 | 5.00 | 5.00 |
| Vapor Fraction | 1.00 | 0.00 | 0.00 | 0.00 | 1.00 | 0.00 | 1.00 | 0.00 | 0.00 |
| Enthalpy, MJ/h | -71.77 | -16080.94 | -4806.81 | -1350261.00 | -33412.00 | -1011536.00 | -36531.10 | -1008416.00 | -2358677.00 |
| Mass Flow rate, kg/h | 12672.09 | 2070.00 | 250.00 | 86280.29 | 14621.72 | 63700.00 | 13880.69 | 64441.02 | 150721.31 |
| Petcock | 0.00 | 1000.00 | 0.00 | 0.00 | 0.00 | 0.00 | 0.00 | 0.00 | |
| H2O | 0.00 | 1000.00 | 0.00 | 86280.29 | 1000.00 | 63700.00 | 283.40 | 64416.59 | 150696.88 |
| CO2 | 7.70 | 0.00 | 0.00 | 0.00 | 3671.84 | 0.00 | 3662.58 | 9.27 | |
| O2 | 2930.56 | 0.00 | 0.00 | 0.00 | 196.55 | 0.00 | 196.48 | 0.06 | |
| N2 | 9573.56 | 0.00 | 0.00 | 0.00 | 9573.56 | 0.00 | 9571.80 | 1.76 | |
| S | 0.00 | 70.00 | 0.00 | 0.00 | 0.00 | 0.00 | 0.00 | 0.00 | |
| SO2 | 0.00 | 0.00 | 0.00 | 0.00 | 6.99 | 0.00 | 5.53 | 1.46 | |
| CaCO3 | 0.00 | 0.00 | 250.00 | 0.00 | 12.50 | 0.00 | 0.72 | 11.78 | |
| | System Pressure: 10 bar | | | Compressor Energy Input: 1225.74 KW | | | | | |
| T, C | 25.00 | 25.00 | 25.00 | 75.00 | 800.00 | 20.00 | 31.24 | 75.02 | 75.02 |
| P, bar | 1.00 | 10.00 | 10.00 | 10.00 | 10.00 | 10.00 | 10.00 | 10.00 | 10.00 |
| Vapor Fraction | 1.00 | 0.00 | 0.00 | 0.00 | 1.00 | 0.00 | 1.00 | 0.00 | 0.00 |
| Enthalpy, MJ/h | -71.77 | -16080.88 | -4803.19 | -1463593.00 | -33434.04 | -1024240.00 | -35423.75 | -1022250.00 | -2485803.00 |
| Mass Flow rate, kg/h | 12672.09 | 2070.00 | 250.00 | 93519.48 | 14621.72 | 64500.00 | 13792.76 | 65328.95 | 158848.43 |
| Petcock | 0.00 | 1000.00 | 0.00 | 0.00 | 0.00 | 0.00 | 0.00 | 0.00 | |
| H2O | 0.00 | 1000.00 | 0.00 | 93519.48 | 1000.00 | 64500.00 | 201.74 | 65298.26 | 158817.74 |
| CO2 | 7.70 | 0.00 | 0.00 | 0.00 | 3671.84 | 0.00 | 3658.76 | 13.09 | |
| O2 | 2930.56 | 0.00 | 0.00 | 0.00 | 196.55 | 0.00 | 196.44 | 0.11 | |
| N2 | 9573.56 | 0.00 | 0.00 | 0.00 | 9573.56 | 0.00 | 9570.33 | 3.23 | |
| Ar | 160.28 | 0.00 | 0.00 | 0.00 | 160.28 | 0.00 | 160.10 | 0.17 | |
| S | 0.00 | 70.00 | 0.00 | 0.00 | 0.00 | 0.00 | 0.00 | 0.00 | |
| SO2 | 0.00 | 0.00 | 0.00 | 0.00 | 6.99 | 0.00 | 4.69 | 2.31 | |
| CaCO3 | 0.00 | 0.00 | 250.00 | 0.00 | 12.50 | 0.00 | 0.71 | 11.79 | |

FIG. 25

| FIG. 2B: | Flow 1 (Air) | Flow 1 (Fuel) | Flow 5 (Limestone) | Hot water generated Flow 9 | Flow 21 (combustion gas and steam from DCSG) | Flow 8 (Cold process water) | Flow 2 (NCG) | Flow 9 (Hot process water for tar recovery) |
|---|---|---|---|---|---|---|---|---|
| *System Pressure: 103kpa  Compressor Energy Input: 11.17 KW* | | | | | | | | |
| T, C | 25.00 | 25.00 | 25.00 | 20.00 | 199.92 | 20.00 | 21.64 | 75.28 |
| P, kPa | 1.00 | 103.00 | 103.00 | 1.03 | 1.03 | 1.03 | 1.03 | 1.03 |
| Vapor Fra | 1.00 | 0.00 | 0.00 | 0.00 | 1.00 | 0.00 | 1.00 | 0.00 |
| Enthalpy, | -71.77 | -16081.00 | -4809.68 | -173257.70 | -174669.00 | -2055535.00 | -36899.52 | -2193304.00 |
| Mass Flov | 12672.09 | 2070.00 | 250.00 | 12934.41 | 24720.51 | 129380.70 | 13897.47 | 140203.70 |
| Petcoke | 0.00 | 1000.00 | 0.00 | 0.00 | 0.00 | 0.00 | 0.00 | 0.00 |
| H2O | 0.00 | 1000.00 | 0.00 | 9949.55 | 10949.55 | 129380.70 | 305.98 | 140024.20 |
| CO2 | 7.70 | 0.00 | 0.00 | 0.00 | 3671.84 | 0.00 | 3661.57 | 10.27 |
| O2 | 2930.56 | 0.00 | 0.00 | 0.00 | 196.55 | 0.00 | 196.52 | 0.02 |
| N2 | 9573.56 | 0.00 | 0.00 | 0.00 | 9573.56 | 0.00 | 9572.89 | 0.66 |
| Ar | 160.28 | 0.00 | 0.00 | 0.00 | 160.28 | 0.00 | 160.24 | 0.03 |
| S | 0.00 | 70.00 | 0.00 | 0.00 | 0.00 | 0.00 | 0.00 | 0.00 |
| SO2 | 0.00 | 0.00 | 0.00 | 0.00 | 6.99 | 0.00 | 0.01 | 6.98 |
| CaCO3 | 0.00 | 0.00 | 250.00 | 0.00 | 12.50 | 0.00 | 0.00 | 12.50 |
| Solids | 0.00 | 0.00 | 0.00 | 2984.86 | 149.24 | 0.00 | 0.25 | 148.99 |
| *System Pressure: 2.5bar  Compressor Energy Input: 394.5 KW* | | | | | | | | |
| T, C | 25.00 | 25.00 | 25.00 | 20.00 | 200.16 | 20.00 | 21.81 | 75.08 |
| P, bar | 1.00 | 2.50 | 2.50 | 2.50 | 2.50 | 2.50 | 2.50 | 2.50 |
| Vapor Fra | 1.00 | 0.00 | 0.00 | 0.00 | 1.00 | 0.00 | 1.00 | 0.00 |
| Enthalpy, | -71.77 | -16080.97 | -4808.61 | -198788.10 | -169626.10 | -1991892.00 | -34408.51 | -2127110.00 |
| Mass Flov | 12672.09 | 2070.00 | 250.00 | 12303.38 | 24195.57 | 125436.50 | 13711.19 | 135920.90 |
| Petcoke | 0.00 | 1000.00 | 0.00 | 0.00 | 0.00 | 0.00 | 0.00 | 0.00 |
| H2O | 0.00 | 1000.00 | 0.00 | 9430.19 | 10430.19 | 125436.50 | 121.51 | 135745.20 |
| CO2 | 7.70 | 0.00 | 0.00 | 0.00 | 3671.84 | 0.00 | 3657.07 | 14.77 |
| O2 | 2930.56 | 0.00 | 0.00 | 0.00 | 196.55 | 0.00 | 196.47 | 0.08 |
| S | 0.00 | 70.00 | 0.00 | 0.00 | 0.00 | 0.00 | 0.00 | 0.00 |
| SO2 | 0.00 | 0.00 | 0.00 | 0.00 | 6.99 | 0.00 | 4.26 | 2.73 |
| CaCO3 | 0.00 | 0.00 | 250.00 | 0.00 | 12.50 | 0.00 | 0.02 | 12.48 |
| Solids | 0.00 | 0.00 | 0.00 | 2873.19 | 143.66 | 0.00 | 0.24 | 143.42 |
| *System Pressure: 5 bar  Compressor Energy Input: 769.53 KW* | | | | | | | | |
| T, C | 25.00 | 25.00 | 25.00 | 20.00 | 200.04 | 20.00 | 22.46 | 75.50 |
| P, bar | 1.00 | 5.00 | 5.00 | 5.00 | 5.00 | 5.00 | 5.00 | 5.00 |
| Vapor Fra | 1.00 | 0.00 | 0.00 | 0.00 | 1.00 | 0.00 | 1.00 | 0.00 |
| Enthalpy, | -71.77 | -16080.94 | -4806.81 | -210287.00 | -177609.20 | -2072298.00 | -33536.08 | -2216371.00 |
| Mass Flov | 12672.09 | 2070.00 | 250.00 | 13019.96 | 24788.08 | 130500.00 | 13634.64 | 141653.50 |
| Petcoke | 0.00 | 1000.00 | 0.00 | 0.00 | 0.00 | 0.00 | 0.00 | 0.00 |
| H2O | 0.00 | 1000.00 | 0.00 | 10015.35 | 11015.35 | 130500.00 | 70.60 | 141444.80 |
| CO2 | 7.70 | 0.00 | 0.00 | 0.00 | 3671.84 | 0.00 | 3636.86 | 34.98 |
| O2 | 2930.56 | 0.00 | 0.00 | 0.00 | 196.55 | 0.00 | 196.37 | 0.17 |
| S | 0.00 | 70.00 | 0.00 | 0.00 | 0.00 | 0.00 | 0.00 | 0.00 |
| SO2 | 0.00 | 0.00 | 0.00 | 0.00 | 6.99 | 0.00 | 1.67 | 5.33 |
| CaCO3 | 0.00 | 0.00 | 250.00 | 0.00 | 12.50 | 0.00 | 0.02 | 12.48 |
| Solids | 0.00 | 0.00 | 0.00 | 3004.61 | 151.01 | 0.00 | 0.25 | 150.76 |
| *System Pressure: 10 bar  Compressor Energy Input: 1225.74 KW* | | | | | | | | |
| T, C | 25.00 | 25.00 | 25.00 | 20.00 | 200.30 | 20.00 | 23.74 | 80.48 |
| P, bar | 1.00 | 10.00 | 10.00 | 10.00 | 10.00 | 10.00 | 10.00 | 10.00 |
| Vapor Fra | 1.00 | 0.00 | 0.00 | 0.00 | 1.00 | 0.00 | 1.00 | 0.00 |
| Enthalpy, | -71.77 | -15890.46 | -3015.15 | -228961.00 | -189889.50 | -2008780.00 | -32944.16 | -2165725.00 |
| Mass Flov | 12672.09 | 2070.00 | 250.00 | 14181.02 | 25693.82 | 126500.00 | 13573.85 | 138620.00 |
| C | 0.00 | 1000.00 | 0.00 | 0.00 | 0.00 | 0.00 | 0.00 | 0.00 |
| H2O | 0.00 | 1000.00 | 0.00 | 10908.48 | 11908.48 | 126500.00 | 47.85 | 138360.60 |
| CO2 | 7.70 | 0.00 | 0.00 | 0.00 | 3671.84 | 0.00 | 3604.61 | 67.23 |
| O2 | 2930.56 | 0.00 | 0.00 | 0.00 | 196.55 | 0.00 | 196.22 | 0.33 |
| S | 0.00 | 70.00 | 0.00 | 0.00 | 0.00 | 0.00 | 0.00 | 0.00 |
| SO2 | 0.00 | 0.00 | 0.00 | 0.00 | 6.99 | 0.00 | 0.62 | 6.37 |
| CaCO3 | 0.00 | 0.00 | 250.00 | 0.00 | 12.50 | 0.00 | 0.02 | 12.48 |
| Solids | 0.00 | 0.00 | 0.00 | 3272.54 | 163.63 | 0.00 | 0.25 | 163.37 |

FIG. 26

SYSTEM AND METHOD FOR MINIMIZING THE NEGATIVE ENVIROMENTAL IMPACT OF THE OILSANDS INDUSTRY

RELATED U.S. APPLICATIONS

The present application claims priority from U.S. Provisional Patent Application Ser. No. 61/122,195, filed on Dec. 12, 2008 and entitled "INTEGRATED STEAM GENERATION PROCESS FOR ENHANCED OIL RECOVERY USING A SOLID FUEL BOILER AND DISTILLATION UNIT."

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This application relates to a system and method for water recovery from waste water such as mature fine tailings (MFT) water in the oilsands industry. The recovered water can be used during the bitumen extraction process or for steam generation. The heat is used for thermally efficient heating of the process water for mixing with bitumen ore or for steam generation. The recovered water can be used for steam generation in a commercially—available, non-direct prior art steam generator, as in OTSG (Once Through Steam Generator) and Boiler type facilities or as a process water to generate the oilsands ore slurry.

2. Description of Related Art Including Information Disclosed Under 37 CFR 1.97 and 37 CFR 1.98.

The present invention minimizes the need for settling fine tailings basins and enables a sustainable tailing practice of "reclaiming as you go". This means continually reclaiming the excavated oilsands areas and the tailing pond as the mine progresses to a new location. This invention can also minimize the use of natural gas as a heat source for the extraction of heavy oil. Petroleum coke, coal or any other low grade, sulfur-rich carbonic fuel can be used instead of natural gas as the heat source. The sulfur content of the low grade carbonic fuel can be reacted with Lime Stone or Lime Sludge slurry waste from lime softening processes (such as WLS (Warm Lime Softener), widely used for OTSG water treatment in EOR facilities like SAGD or CSS). The reaction generates calcium sulfite or calcium sulfate, possibly anhydrate, which is extracted with the other fuel combustion and heated tailing solids. The presence of the calcium sulfite or calcium sulfate, together with the combustion and tailing solids, can increase the stability of a land-fill in order to support traffic.

The invention also improves thermal efficiency while minimizing the amount of $CO_2$ generated as compared to the prior-art facilities used in an oilsands mine to generate the hot process water for the bitumen extraction. This is achieved due to the direct contact heat exchange between the combustion gas or superheated steam and the process water.

The steam can be used for Enhanced Oil Recovery (EOR) facilities or for the separation of bitumen and solvents from sand and water in open mining oil sand facilities. The water recovery process includes generation and separation of solids in a ZLD (Zero Liquid Discharge) environment, where a dry solid waste or semi-dry slurry that can support traffic is generated for effective disposal. The heat is recovered and used to heat the processed water, or to pre-heat boiler feed water for steam generation.

The invention can also eliminate the use of tailing ponds. However, for this option, large quantities of course tailing solids (like sand) will have to be filtered and trucked to the mine site instead of hydro transport as the transportation method.

Tailing pond water is a by-product of the oil, water and sand separation process. These ponds are becoming an increasingly significant environmental problem as the scale of oil sand recovery increases. 1606 ducks died in 2008 after mistakenly landing in contaminated ponds in northern Alberta. The tailing pond problem is continually escalating, as seen in 1979 when there were tens of millions of cubic meters of fine fluid tailings. Currently in the Fort McMurray area there are close to eight hundred million cubic meters of MFT that covers about 60 square kilometers and require long term containment. Some of the oldest tailing ponds are located (irresponsibly), in close proximity to the Athabasca River. Leakages or extensive rainfall in the area can cause these tailing ponds to overflow directly into the river, with devastating effects on the natural environment and on the settlements downriver. The mature tailing water contains suspended fine sediments (less than 40 microns). This sediment can include: clay, heavy metals, hydrocarbons like bitumen, diluent, PAHs (Polycyclic Aromatic Hydrocarbons, which occur in oil and are a byproducts of burning fuels) and Naphthenic Acids, (surfactants found in all heavy oil), sulphate and sodium salinity. The PAHs tend to settle out with the fine sediments.

In Situ oilsands projects also generate large quantities of disposal water and sludge from their softeners in their facility water treatment plant, steam generation facility and in the oil separation process.

Another basic characteristic of an oil sands project is the use of heat and steam. This is a common characteristic for both surface oil sands mining and In-situ oilsands plants.

In mining, the processed water is heated using steam. Steam is also used to remove NCG and to separate diluent from the sand and the water.

In-Situ EOR facilities use steam for injection underground in order to separate the oil from the sand and move it to the surface. Typical EOR In-Situ facilities use SAGD and CSS (Cyclic Steam Stimulation—"Huff and Puff") technologies.

Most of the work done to resolve the oil sands tailing ponds problem, and especially that of mature fine tailing ponds, is separate from the existence of the oil sand mine and the energy—intensive extraction plant. Using this approach (of separating the cause from the problem) will allow companies to defer the solution to the future, at which time the oil facilities plants will stop operating or have re-located. Such an approach can defer the mature fine tailing reclamation costs to the future, allowing maximization of the Oil Companies present profits while leaving the MFT problem to future generations. It is expected that the ERCB (Energy Resources Conservation Board) will reinforce actions to resolve the MFT problem. In a recent presentation done by the ERCB, it was said that "Fluid tailing volumes are growing steadily . . . no fluid tailings pond reclaimed . . . and neither the public nor the government is prepared to continue to accept commitments that are not met and increasing liabilities". The strategy currently in use by Alberta regulators is to force oil producers to implement at least a partial solution for the problems associated with oil sand tailing ponds.

A basic technical problem and/or disadvantage arises when delaying the resolution of the MFT problem to the future: where the oil is recovered, it would be uneconomic to use an intensive energy method, which uses extensive heat to resolve the fine tailings pond problem. In the present invention, the heat used to resolve the MFT problem is recovered to produce hot water and steam that is used by the oil sand production facility, with minimal energy waste. The overall thermal efficiency of the invention, (which will be reflected in the volume of $CO_2$ emitted) for operation of an oilsands mine plant, is no significantly higher than using steam boilers, as is typically done today to generate steam that is used to heat the process water used for bitumen extraction. This is true even without considering the other advantages of the current invention compared to the prior-art steam generator; advantages like resolving the MFT problem, reduction of fresh water consumption and the use of low grade fuel (like petcoke) instead of natural gas. In the future, if the heat energy cannot be consumed by a producing oilsand facility, the heat energy will be wasted which will make the implementation of my invention to consume the MFT pond unfeasible. Other methods (like thickening, centrifuge, weather drying and water capping) that do not use intensive heat can still be used even when the oilsand mines are not in operation. The issue outlined above is one corporate present commercial disadvantage of the invention as compared to other solutions for the MFT.

However, there is no commercially feasible solution currently in use that completely resolves the oil sand tailing problem in Alberta. There are several activities being carried out by the oil sand producers that are at different R&D stages. The technologies considered in the presentation which are being tested by the industry include: Evaporation Dry and Freeze Thaw, In-Situ Densification (coke capping), Thickened Tailing, Accelerated Dewatering, Centrifuge MFT, MFT Water Capped Lake and Consolidated Tailing (CT).

Currently, there is a large-scale centrifuge pilot project in the works. The tailing ponds require either mechanical or chemical manipulation before subjecting the tailing fine clays to the spin dry cycle. To consolidate its tailings (CT), gypsum, a byproduct of the flue gas system for scrubbing out sulphur, is added, possibly with lime. The theory is that the gypsum interacts electrostatically with the clay and the weight of the added sand squeezes out the water. The thickening process, however, uses flocculants. The flocculants are organic polymers that increase the amount of settling in order to generate non-segregating tailings. The chemical treatment, in which very long molecules stick to different clays and interact mechanically, is enhanced through the addition of sand.

Another activity uses CO2. High purity CO2 is the by-product of a hydrogen plant. The CO2 causes a very slight acidification which helps release calcium ions. Most importantly, it also has an electrostatic effect and reacts chemically with the sediment. Whatever the process, the resulting dry stackable tailings have similar properties. The only commercially operated options are the CT and the MFT Water Capped Lake. Field pilots are currently being done for the Centrifuge MFT, the Accelerated Dewatering and thickened tailings. Most of the methods used by the industry include natural (or accelerated) dewatering. Relying on dry weather in Fort McMurray can be tricky. Project execution personnel are well aware of the challenges involved in reducing the moisture content of the soil (to increase soil compaction) due to unexpected precipitation in that area. There is also a chance that the precipitation in the area will increase in the future due to global warming. It is to be expected that drying the MFT will become even more challenging. The prior-art commercially available thickening tailing process and the MFT centrifuge or thickening process can be incorporated into the invention to increase the total amount of treated tailing and solids removed. The thickened tailing, from flocculants enhanced thickening process or from a centrifuge process, can be used in my invention to produce solid waste, which can be used as back-fill for supporting traffic, thus increasing the amount of MFT consumed.

The present invention is based on the opportunity of solving the waste sludge or fine tailing water problem through the use of intensive heat processes, while recovering the water and heat. It can then be used for steam generation or for heating the process water in an oilsands extraction mine facility. Through this integrated approach, the tailing pond waste can be treated using energy-intensive processes (like DCSG—Direct Contact Steam Generation), to generate steam and solid wastes that can be disposed of in landfills or as back-fill in the oilsands ore excavation with minimal environmental impacts.

The definition of "Direct Contact Steam Generation" (DCSG) is that the heat is transferred between the liquid water and the combustion gas. This is accomplished through the direct mixing of the two flows (the water and the combustion gases). In the DCSG, the combustion pressure is similar to the produced steam pressure and the combustion gases are mixed with the steam. The combustion gas is mixture of CO2 steam, and possibly nitrogen and other gases. If steam is available, it can be used instead of the combustion gas mixture.

In a Non-Direct Steam Generator (like a steam boiler with a steam drum and a mud drum) or a "Once Through Steam Generator" (OTSG), the heat transfer and combustion gases are not mixed and the heat transfer is done through a wall (typically a metal wall), where the pressure of the generated steam is higher than the pressure of the combustion. This allows for the use of an atmospheric combustion pressure. The product is pure steam (or a steam and water mixture, as in the case of the OTSG) without combustion gases.

Various patents have been issued, that are relevant to this invention. For example, U.S. Patent publication No. 2009/0020458, published on Jan. 22, 2009 to Bozak et al., describes a method for treating tailing wastes. The method includes the use of jet pumps for agitating the tailings for separation during the carbon phase. The tailings are flocculated and dewatered.

U.S. Pat. No. 4,969,520 Issued on Nov. 13, 1990 to Jan et al., describes a method for treating water for the production of steam for EOR while generating sludge (which is composed mainly of calcium carbonate and magnesium hydroxide). It also describes the separation and recovery of liquids from the sludge using centrifuge, and possibly using a flocculant. The solids are disposed of in a land fill.

U.S. Pat. No. 6,036,748 Issued on Mar. 14, 2000 to Wallace et al., describes a process for reducing the temperature for dissolving gases in black water, which is generated by a gasifier. The process includes flashing the water under low pressure to release the gas and generate evaporation within the black water. This reduces the water temperature while generating water vapor. Some of the water vapor is later condensed and recycled. The remaining, cooled black water is treated to remove the solids.

U.S. Pat. No. 6,706,199 issued on Mar. 16, 2004 to Winter et al., describes a method and apparatus for withdrawing and dewatering slag from a gasification system, using a sloped conveying lock hopper with rotating auger located in the conveyer of the lockhopper. The solid slag converges upwards while being separated from the water. U.S. Pat. No. 6,027,056 Issued on Feb. 22, 2000 to Maciejewski et al., describes a method for the assembly and slurrying of oil sand containing oversized lumps and water, while removing the oversized lumps and producing slurry suitable for piping to a separation facility.

Canadian patent 1,211,063 Issued on Sep. 9, 1986 to de Calonne, describes a method to treat tailing sludge, as generated in an open oilsands mine. The sludge is mixed with secondary fuel, like petcoke or coal. The water content of the mixture is then reduced to produce a mixture suitable for self-sustaining combustion. The combustion heat is used to produce steam (through a boiler heat exchanger) for use in the extraction process. The combustion process is done in a fluidized bed combustion furnace.

It is a goal of the present invention to provide a system and method for the use of waste water and any type of fuel while recovering the water and producing solid waste, to improve deep tar extraction EOR facilities, like SAGD or CSS.

It is another objective of the present invention to provide a system and method for the use of discharged water and tailing water, while recovering the water and removing solid waste, to improve oil sand extraction facilities like oil sand surface mining and excavating.

These and other objectives and advantages of the present invention will become apparent from a reading of the attached specifications and appended claims.

BRIEF SUMMARY OF THE INVENTION

A method for use of solids-rich water, such as fine tailings or lime sludge for extracting bitumen from shallow and deep underground oilsands formations. The method comprising the steps of mixing hot combustion gas or steam with solids-rich water under pressure; gasifying liquid water to a gas phase steam and solids; removing the solids from the gas phase to generate a solid lean gas phase; mixing the gas with process water or by the use of a heat exchanger to condense the steam and to recover gas heat; and using the generated hot water for extraction of bitumen.

The method may further comprise the steps of using the generated hot water for steam generation and non-direct preheating of boiler feed water; and using the steam in an oil sand enhanced oil recovery facility or a mining extraction facility. The method may also include generating a portion of the process water by recovering the heat and condensing the steam generated from the fine tailings and the combustion gases.

The method may further comprise the steps of combusting low grade fuel, like petcoke or coal, with oxygen containing gas, like air, to generate said hot combustion gases; recovering at least a portion of said combustion heat for generating high pressure steam from dematerialized water; and using at least part of said high pressure steam for stripping gases or solvents from the extracted bitumen or for generating steam to replace the combustion gas and drive the process.

The method may further comprise the steps of mixing saturated water with the solid lean gas phase to scrub remaining solids and to produce saturated steam and combustion gases mixture; recycling at least a portion of the saturated water with the scrubbed solids and mixing it with said combustion gas; and condensing the saturated steam to generate heat and dematerialized condensed water for steam generation for use in enhanced oil recovery.

The method may further comprise the steps of mixing combusting fuel and oxidizer gas to generate combustion gases; adding an alkaline chemical, such as limestone, to the fuel to reduce the amount of generated acids, such as SO2; mixing the gas phase with saturated water with alkaline chemical to scrub the remaining solids and acid gases, such as SO2, and produce saturated steam and solid rich saturated water; and recycling at least part from said solid rich saturated water and mixing it with the combustion gases to convert the liquids to gas.

According to another aspect, the present invention further comprises the steps of condensing the saturated steam to generate heat and clean condensed water for steam generation; using the hot condensed water for steam generation; and injecting the steam into an underground formation through an injection well for enhanced oil recovery.

According to another aspect of the present invention, a method for use of solids-rich water, such as fine tailings water, for extracting bitumen from shallow underground oil sand formations, the method comprising the steps of mixing hot combustion gas or steam with fine tailings water under pressure; gasifying the liquid water to gas phase comprising steam and solids; separating the solids and the gas phase; mixing the gas with process water in direct contact or through a heat exchanger to condense the steam and recover the gas heat; mixing the generated hot water with the oilsands ore to generate a slurry; and extracting bitumen from the slurry.

According to one aspect of the present invention, a method for recover bitumen from minable bitumen formations, such as shallow oilsands formations, comprising the steps of mining a formation that contains bitumen and inorganic soil, like oilsands; combusting carbon or hydrocarbon fuel with oxygenated gas to generate combustion gas; mixing process water with the combustion gas to generate a stream of hot water and Non-Condensing Combustion Gas; mixing the mined formation with hot process-water to generate a slurry; recovering bitumen from said slurry; recovering process water from said slurry; and recycling said process water and mixing it with said combustion gas.

According to another aspect of the present invention, further comprising the steps of mixing fine-tailing water with said combustion gas or steam to evaporate the water from the fine-tailing and generate a stream of steam, solids and possibly combustion gas; removing the solids from said gas phase to generate a solids lean gas stream of steam and combustion gas; extracting heat (directly or indirectly) from the solid lean gas stream to condense the steam to water; using the extracted heat to heat the process water flow to generate said stream of hot water; recovering part of said combustion heat to generate high pressure steam from dematerialized water; and using at least part of the generated high pressure steam to remove light hydrocarbons like solvents and Non Condensable Gases from said bitumen.

According to another aspect of the present invention, the invention describes a method for recovering bitumen from minable bitumen formations, such as shallow oilsands formations, comprising the steps of mining shallow formation that contains bitumen and inorganic soil, like oilsands, to extract oilsand ore; combusting carbon or hydrocarbon fuel with oxygenated gas in a gasifier to generate syngas and heat; combusting the Syngas with oxidizing gas and mixing non segregating fine-tailings water with the combustion gas to evaporate the water from the fine-tailings and generating a stream of steam, solids and combustion gas; removing the solids from the gas phase to generate a solids lean gas stream of steam and combustion gas; extracting heat and water from the solids lean gas stream; using the extracted heat and water to heat process water flow; mixing the hot process—water with said mined oilsands ore to generate a slurry; recovering bitumen from said slurry; disposing of the slurry course solids; and process water; recovering the non segregating fine-tailings water and process water; recycling said process water for reuse; recycle said non segregating fine-tailings water back to the syngas combustor; and mixing at least portion of said Non Condensable Combustion Gas, after the water and the heat were recovered, with water, like tailings water, to reduce the pH and increase the settling of different components in the water.

According to another aspect of the present invention, the invention describes a system for reuse of solids-rich water for extracting bitumen from shallow and deep underground oilsands formations. The system comprises a combustion boiler, mixing fuel with oxidation gases therein, forming a mixture, combusting the mixture under high pressures and temperatures therein to generate combustion gases, recovering a portion of the combustion heat to generate steam, said fuel being a carbonic fuel; a gas-solid separator unit, the combustion gases being transferred thereto and removing dry form solids from the gas-solid separator unit; a distillation water treatment plant, generating a stream of water using heat from the combustion gas and steam from the separator unit, wherein the distillation water treatment plant is in fluid connection with the combustion boiler; an enhanced oil recovery facility, having a steam injection well, a bitumen and water production well and a separation facility to separate the bitumen from the water in fluid connection to the steam boiler and to the water treatment plant; a direct contact steam generator, mixing said combustion gases generated by the combustion boiler with water containing high levels of solids therein to form a combustion gas mixture, evaporating the water in the combustion gas mixture to leave the solids in a dry form, wherein the direct contact steam generator is in fluid connection to the combustion boiler and to a water treatment facility, wherein the gas-solid separation unit and said distillation water treatment plant are in fluid connection with the direct contact steam generator.

According to another aspect, the present invention further comprises a system for use of solids-rich water for extracting bitumen from mineable underground oilsands formations. The system comprises an oilsands open mine facility that excavates oilsands ore; mixing the ore with hot process water; separating the bitumen from the water; discharging the course tailings; generating a flow of process water; and generating a flow of fine tailings; a pressurized boiler for combusting sulfur rich, carbon fuel, like petroleum coke or coal, possibly with alkaline slurry, like Lime stone slurry, possibly with sludge generated from water Softening process; a Direct Contact Heat Exchanger to wash the boiler combustion gases, recovering the heat and steam while heating the oilsands mine facility process water for extracting bitumen; said oilsands open mine facility is in fluid connection with said Direct Contact Heat Exchanger for the purpose of heating the process water; said pressurized boiler is in fluid connection with said Direct Contact Heat Exchanger for the purpose of extracting heat from said boiler combustion gas; a Direct Contact Steam Generator (DCSG) for mixing Fine Tailings water, possibly with alkaline slurry, with combustion gas to generate a solids, steam and combustion gases mixture with a solids separator to remove solids; said DCSG is in fluid connection with said oilsands open mine facility for the purpose of consuming said fine tailings water for steam generation; said DCSG is in fluid connection with said Direct Contact Heat Exchanger for the purpose of condensing the steam and heating said process water.

The present invention is also comprises from the following steps:

Combusting carbon or hydrocarbon fuel with oxygenated gas to generate combustion gas and possibly steam.

Mixing waste water with the combustion gas or steam to evaporate the water from the fine-tailings and generating a stream of steam, solids and combustion gas.

Separating the solids from the gas phase to generate combustion gases or possibly steam flow.

Extracting heat from the solid lean gas stream while condensing the steam into useable liquid water.

Using the extracted heat to heat the process water flow.

Using the hot process water for oilsands extraction.

An alternative method/embodiment of the instant invention comprises from the following steps:

Mining a formation that contains bitumen and inorganic soil, like oilsands.

Mixing the mined formation with hot process-water to generate slurry.

Recovering the bitumen.

Disposing of the course solids.

Separating the process-water from the fine-tailing water.

Pre-heating the fine tailings.

Using the extracted heat to heat the process water flow.

Heating the fine-tailing water with the combustion heat or the steam to evaporate the water from the fine-tailing and generating a stream of steam, solids and possibly combustion gas.

Separating the solids from the gas phase to generate a solids lean gas stream of steam and possibly combustion gas.

Recycling the hot process-water to the first step.

Mixing the mined formation with hot process-water to generate a slurry.

An alternative method/embodiment of the instant invention comprises from the following steps:

Combusting carbon or hydrocarbon fuel with oxygenated gas to generate heat and combustion gas.

Using the combustion heat to heat fine—tailings to generate a mixture of solids and gas. Removing the solids from the gas phase to generate a solids lean gas stream of steam and combustion gas.

Extracting heat from the solid lean gas stream to condense the steam to process-water.

Mixing the mined formation with hot process-water to generate a slurry.

An alternative method/embodiment of the instant invention comprises from the following steps:

Combusting carbon or hydrocarbon fuel with oxygenated gas to generate heat, using at least a portion of the heat for generating steam, mixing the steam with tailings to convert the tailing water into steam and solids, removing the solids from the gas phase.

Extracting heat from the solid lean gas stream to condense the steam to process-water.

The method and system of the present invention for steam production for extraction of heavy bitumen by injecting the steam to an underground formation or by using it as part of an above ground oil extraction facility includes the following steps: (1) mixing carbon or hydrocarbon fuel and oxidizing gases like oxygen, enriched air or air; (2) combustion of the mixture under high pressure and temperature; (3) using the combustion heat with liquid water that include high levels of solids and organics while transferring the liquid phase to a gas phase; (4) separating the solids and the gas phase; (5) using the gas phase heat to evaporate the de-oiled produced water and make-up water at the distillation facility to produce distilled water and concentrated brine; (6) recycling the discharge fluids, like brine from the water treatment facility and blow down from the steam generation facility back to the first step and mix them with the combustion gas; (7) using the produced water (BFW) for steam generation through non-direct heat exchange with combustion gas (This can be done in a separate commercially available steam generation facility or by recovering part from the heat from the DCSG.); (8) using the produced steam to recover oil. In another embodiment, to improve the solids removal and possible SO2 removal, if sulfur rich fuel is used, the produced gas will include these two additional steps after step (4) above: (4A) mixing the produced gas with liquid water, possibly with lime or other alkaline materials for SO2 removal, at saturated temperature and pressure in order to produce a clean, wet saturate steam and gas mixture, while removing most of the SO2 and scrubbing any remaining solids from the gas; (4B) recycling at least part of the solid rich water that includes the scrubbed solids, the generated calcium sulfite and calcium sulfate back to step (3) and mixing it with combustion gas to convert the liquid phase water to steam.

Step (3) can be done in a Direct Contact Steam Generator reactor, where most of the water evaporates as it is converted to steam. There are several feasible designs for the DCSG. The structure can include, but is not limited to: a horizontal rotating reactor, a fluidized bed reactor and an up-flow reactor or any other reactor that can be used to generate a stream of gas and solids. Any other DCSG, like a pressurized spray dryer that can consume the highly contaminated water can be used as well to convert the water to steam and solids. The DCSG can be operated by using steam instead of combustion gas.

The discharged NCG is at a relatively low temperature, close to the water condensation temperature. The cooled combustion gases can be discharged to the atmosphere. An additional option, if the recovery of CO2 for sequestration is required, is to separate the CO2 from combustion gases using a membrane. Low temperature membrane technology is commercially available. The discharged pressure will be used for the separation process.

Another option is to use an oxygen plant where the combustion gases will be mainly CO2, which can be directly recovered for sequestration.

According to one aspect of the present invention, a method has been provided for producing a steam and gas mixture for injection into an underground formation to extract heavy bitumen by mixing fuel with oxidation gases to form a mixture; combustion of the mixture under high pressures and temperatures to generate combustion gases; mixing said combustion gases with water having a high level of solids therein to form a combustion gas mixture; evaporating the water in the combustion gas mixture to leave the solids in a dry form; washing the combustion gas mixture with water at a saturated temperature and pressure; scrubbing any remaining solids from the combustion gas mixture to form a clean steam and gas mixture; and injecting the clean steam and gas mixture into the underground formation to extract the heavy bitumen.

According to another aspect of the present invention, a system is provided for producing a clean steam and gas mixture for injection into an underground formation to extract heavy bitumen by mixing fuel with oxidation gases in a combustion boiler to form a mixture, combustion of the mixture under high pressures and temperatures in the combustion boiler to generate combustion gases, mixing said combustion gases with water in the combustion boiler having a high level of solids therein to form a combustion gas mixture, evaporating the water in the combustion gas mixture to leave the solids in a dry form, transferring the combustion gases to a gas-solid separator unit, removing the dry form solids from a gas-solid separator unit, transferring the combustion gases to a steam generation and wash vessel, washing the combustion gas mixture in the steam generation and wash vessel with water at a saturated temperature and pressure, scrubbing any remaining solids from the combustion gas mixture to form the clean steam and gas mixture, and injecting the clean steam and gas mixture into the underground formation to extract the heavy bitumen.

According to another aspect of the present invention, a method is provided for producing a pure steam mixture for injection into an underground formation to extract heavy bitumen by mixing fuel with oxidation gases to form a mixture; combustion of the mixture under high pressures and temperatures to generate combustion gases; mixing said combustion gases with water having a high level of solids therein to form a combustion gas mixture, evaporating the water in the combustion gas mixture to leave the solids in a dry form, removing the dry form solids; washing the combustion gas mixture with water at a saturated temperature and pressure, scrubbing any remaining solids from the combustion gas mixture to form the clean steam and gas mixture; transferring the clean steam and gas mixture to a heat exchange condenser, using heat from the clean steam and gas mixture to heat water supplied from a distillation facility, combustion of the water from the distillation facility to generate a pure steam mixture that can be used to extract the heavy bitumen, and injecting the pure steam mixture into the underground formation to extract the heavy bitumen. According to another aspect of the invention, the pressurized combustion gas driving the DCSG can be replaced by the usage of steam.

BRIEF DESCRIPTION OF THE DRAWINGS

FIGS. 1, 1A, 1B, 1C, 1D, 1E, 1F, 1G and 1H are schematic diagrams of the present invention for the generation of hot water for oil-sand mining extraction facilities, with fine tailing water recycling, in order to achieve zero liquid discharge with fine tailing water recycling.

FIG. 12A is a schematic view of FIG. 12, incorporating a direct contact steam generator.

FIGS. 21, 22, and 23 are schematic views and charts of results, respectively, of the present invention as presented by a simulation program described in Example 1.

FIG. 25 is a chart of results from a process simulation of the present invention according to Example 4.

FIG. 26 is another chart of results from a process simulation by the present invention according to Example 5.

DETAILED DESCRIPTION OF THE DRAWINGS

FIG. 1, 1A, 1B, 1C, 1D, 1E, 1F, 1G and 1H are self explanatory block diagrams for describing the present invention.

Figure 1:
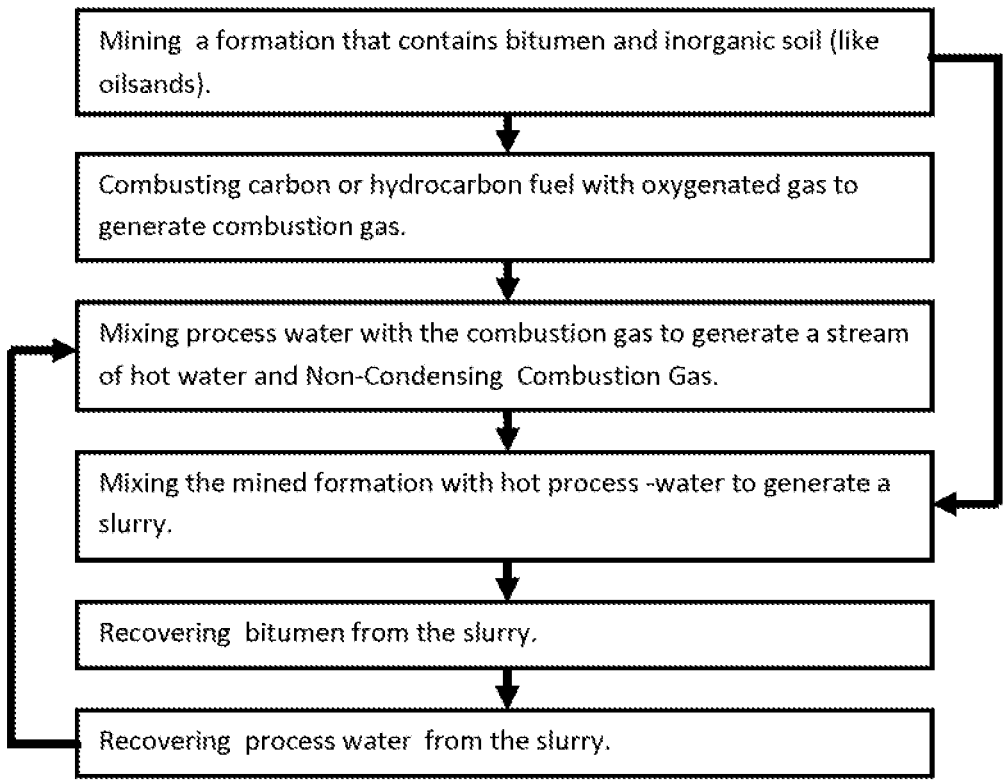
Figure 1A:
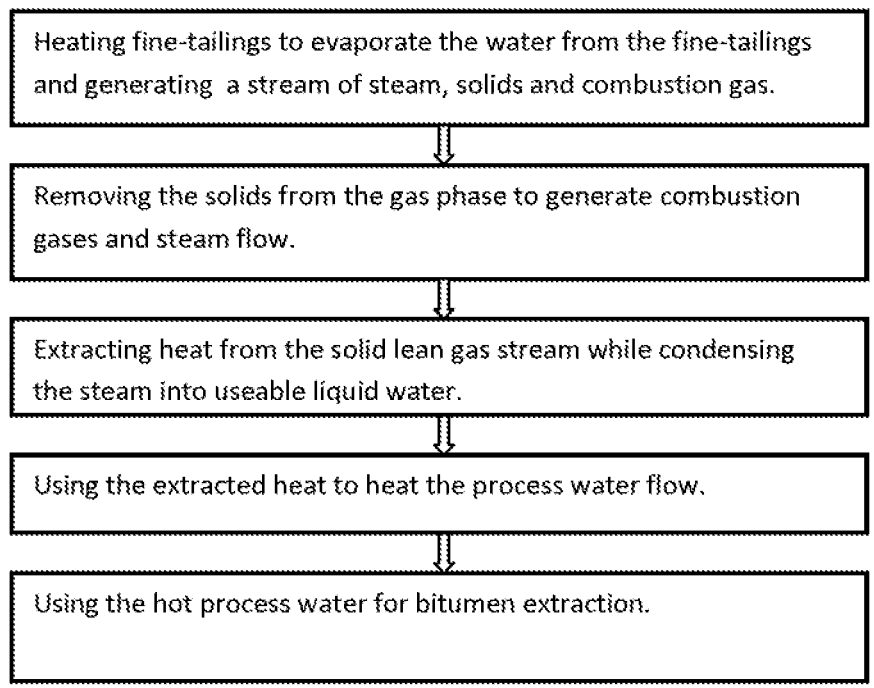
Figure 1B:
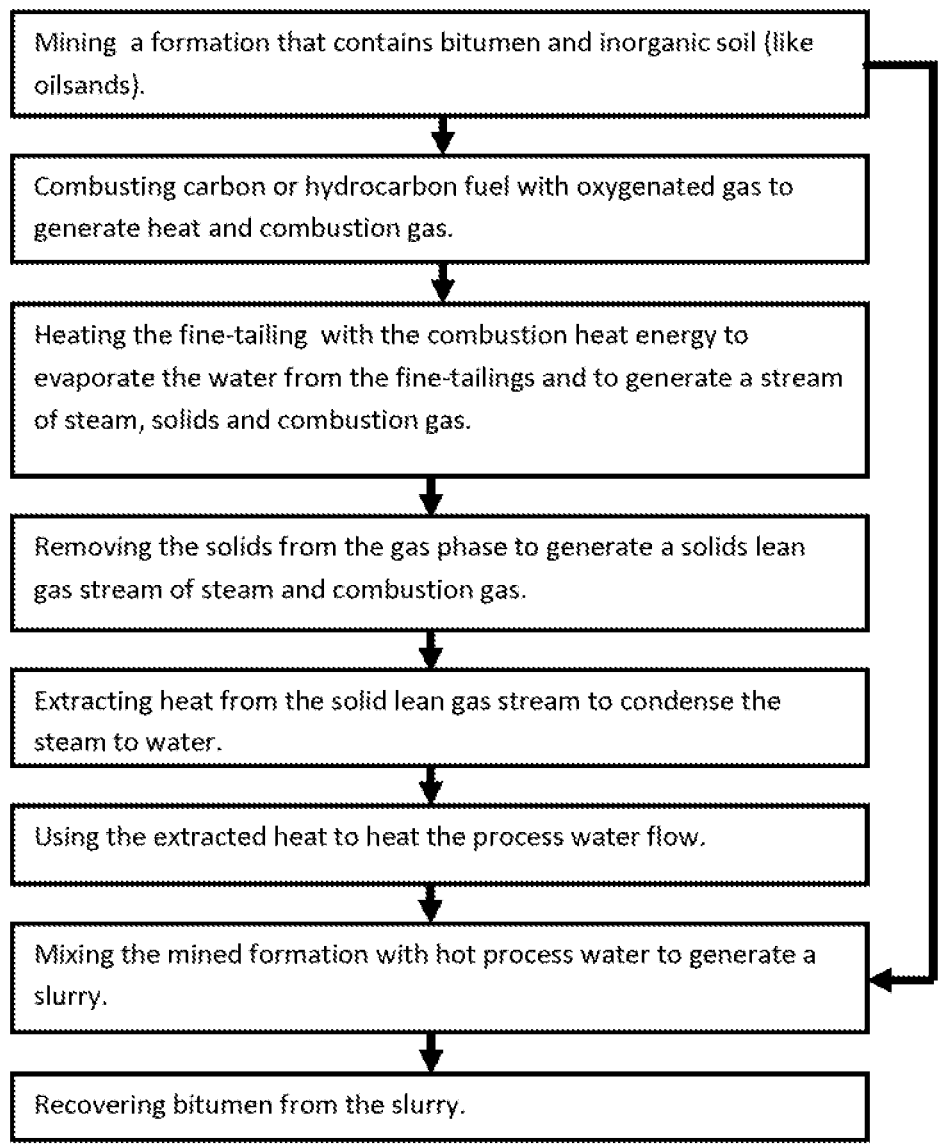
Figure 1D:
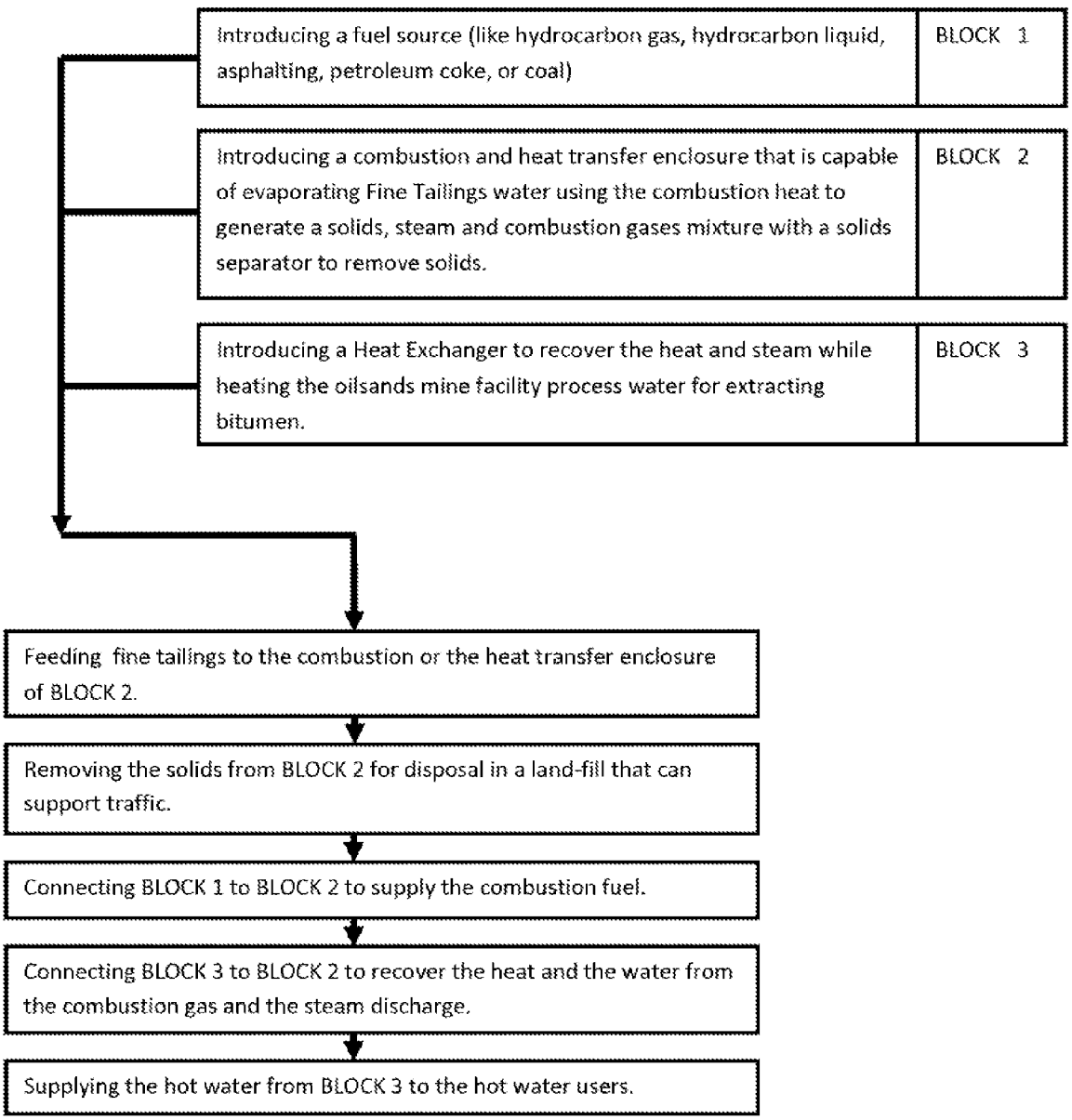
Figure 1E:
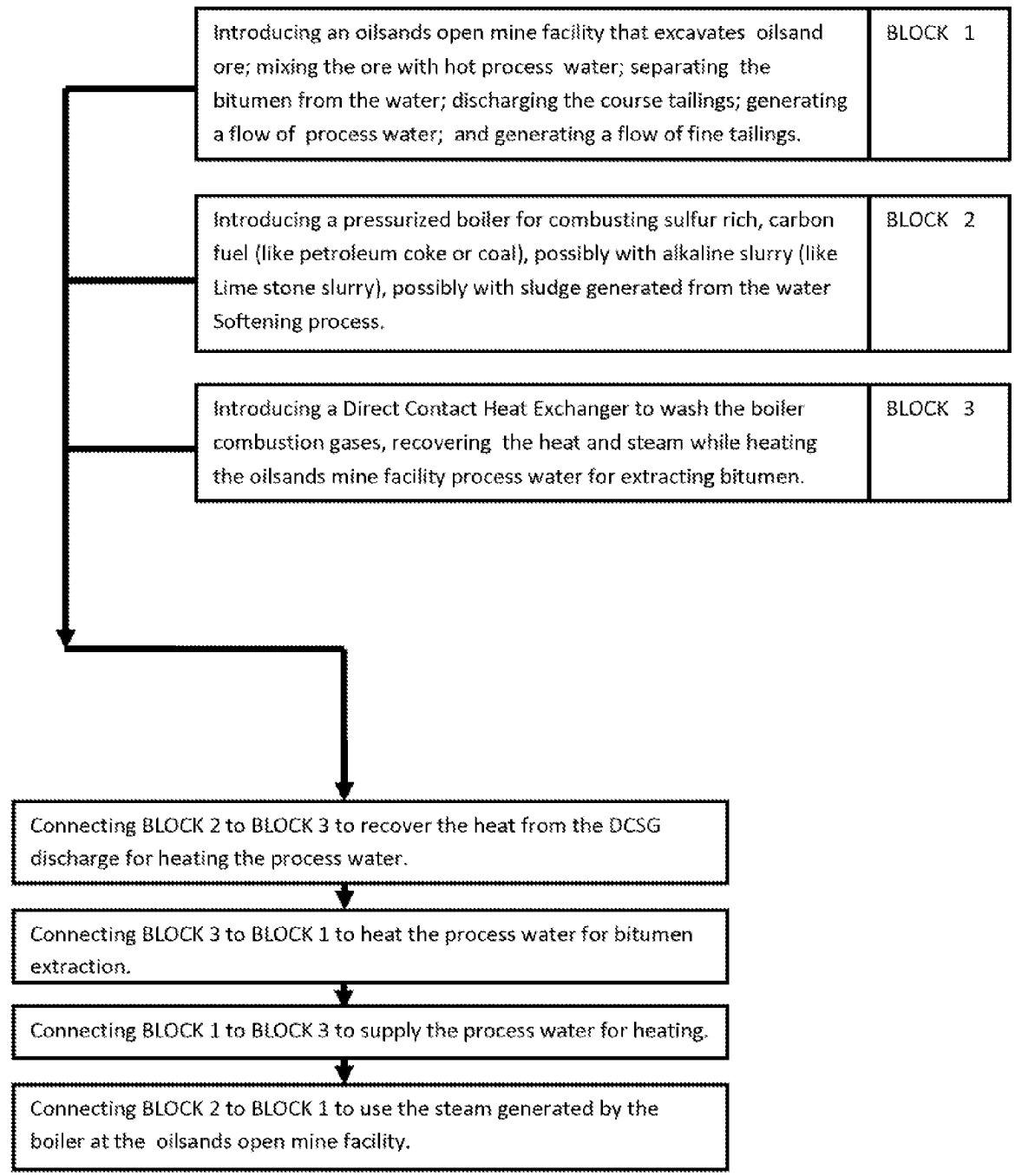
Figure 1F:
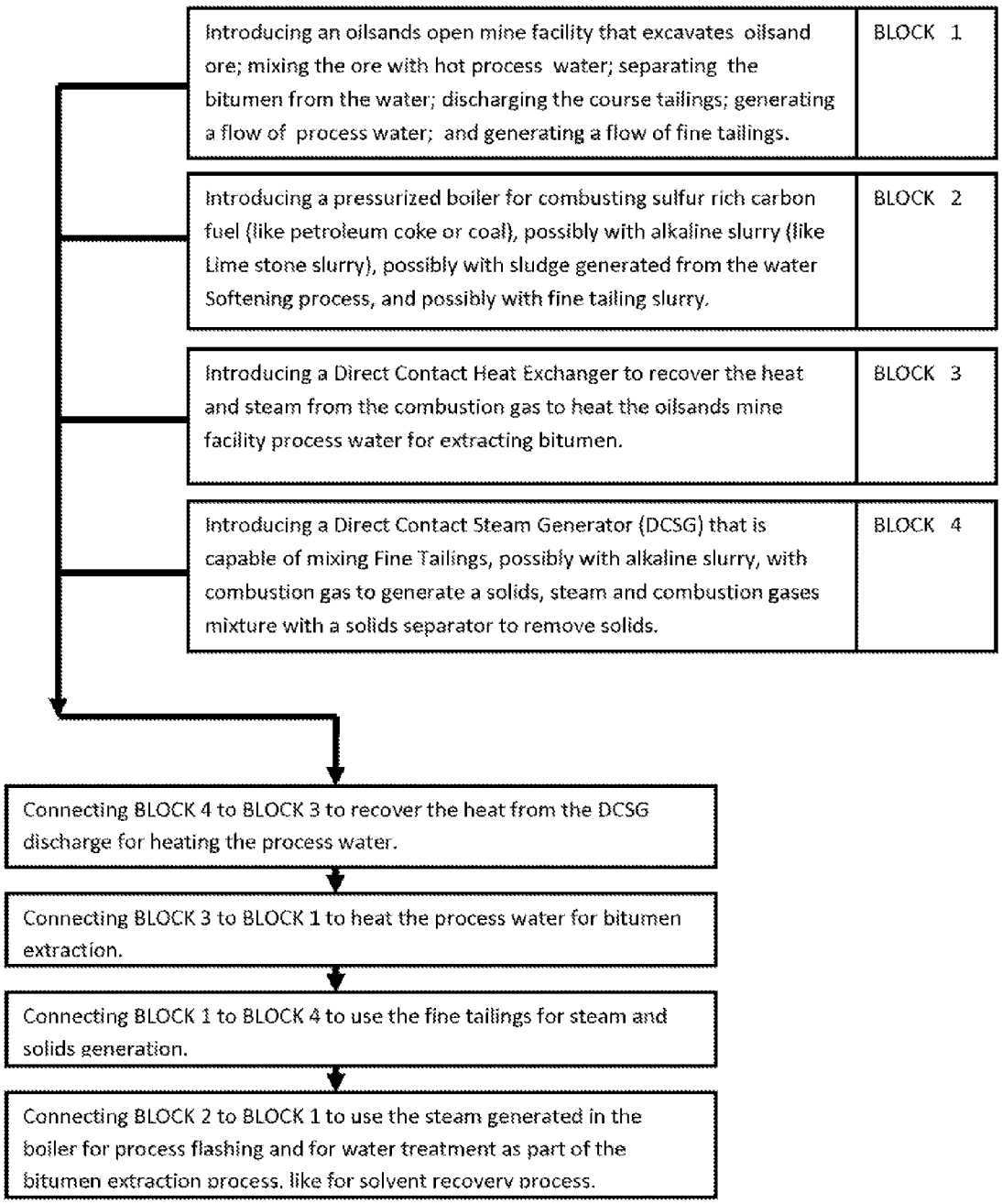
Figure 1G:
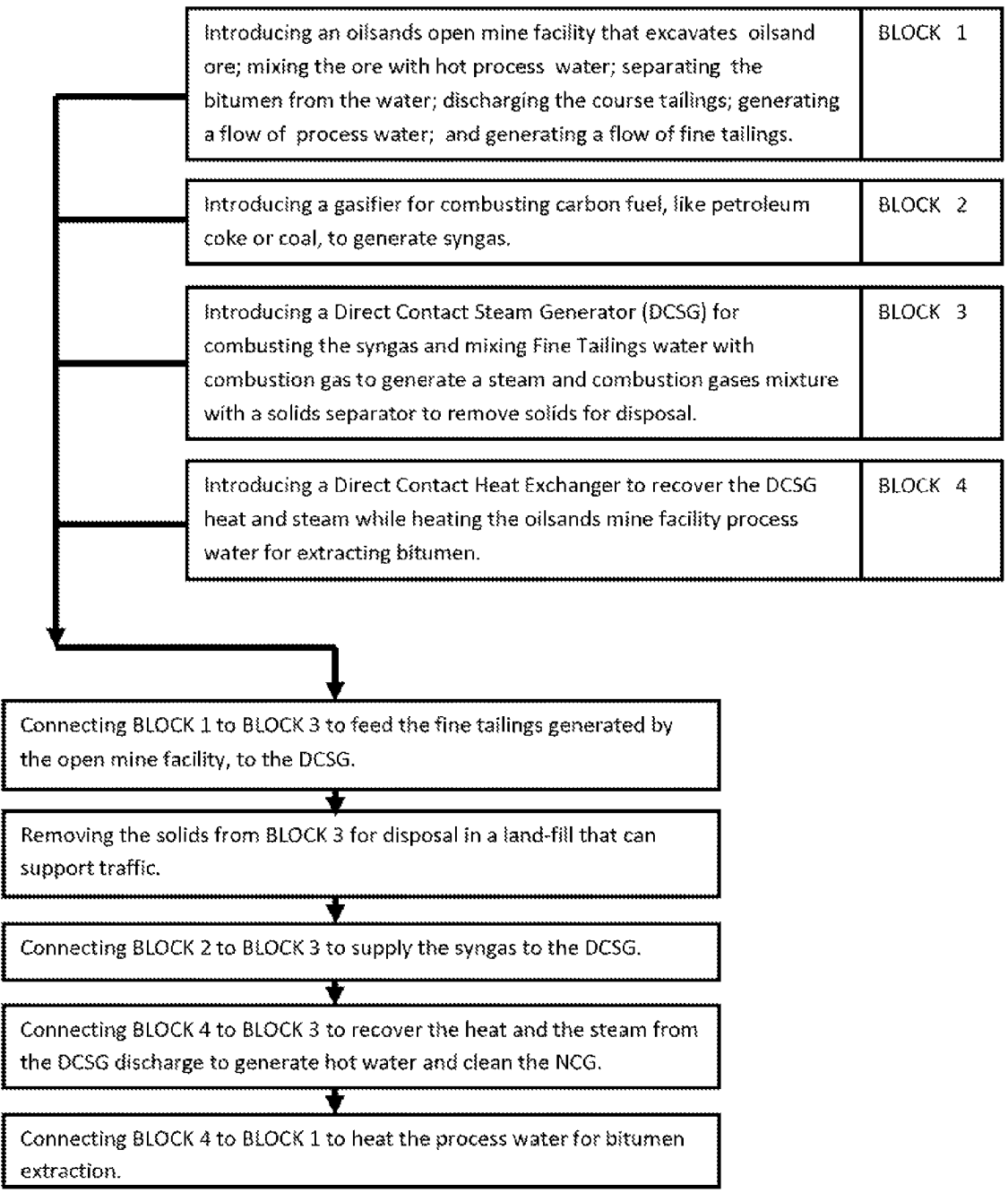
Figure 1H:
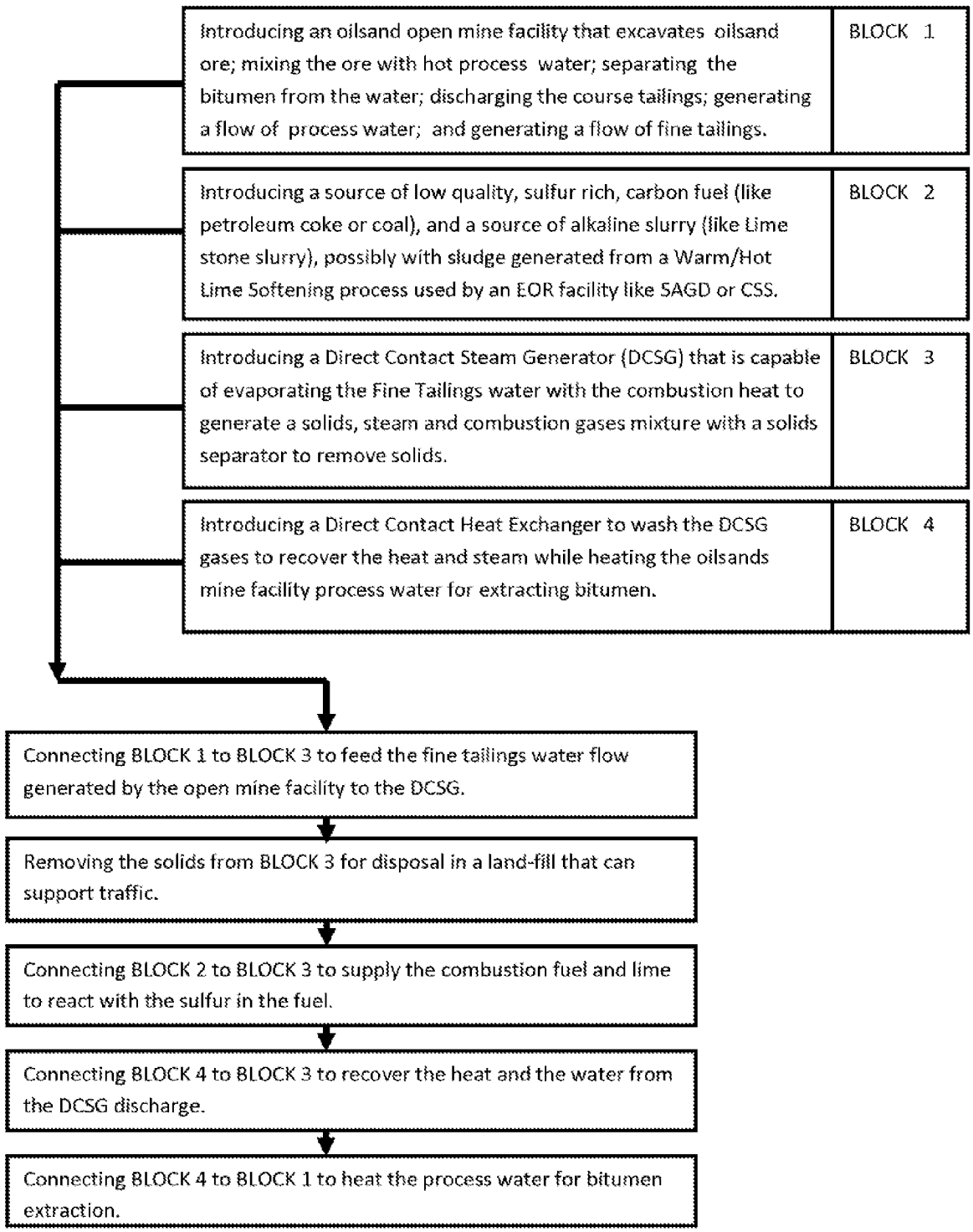
Figure 1I:
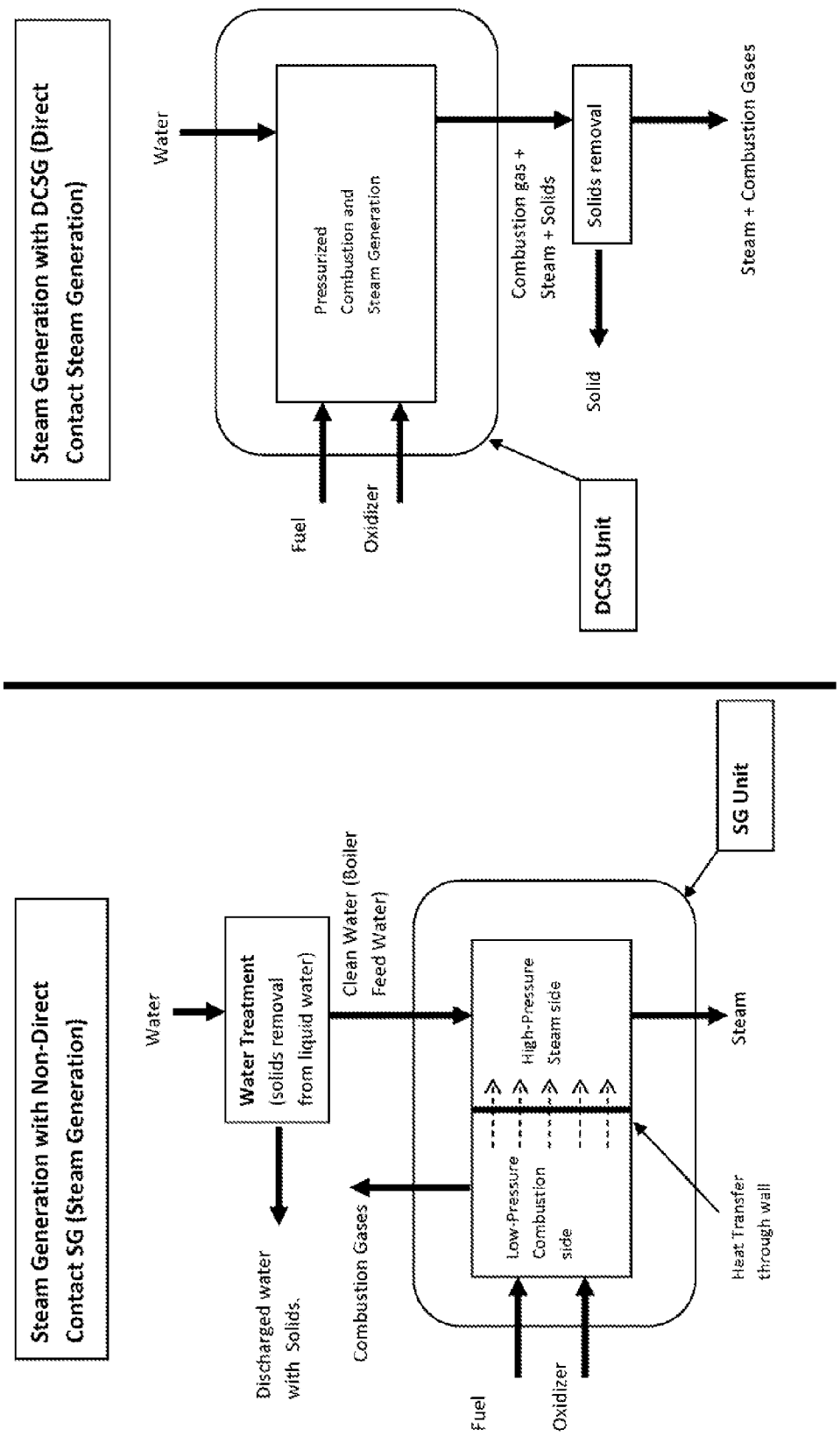
FIG. 1I is a schematic diagram of the principal of Direct Contact Steam Generation and Non-direct Contact Steam Generation.

FIG. 1I is a self explanatory comparison of the principal of Direct Contact Steam Generation and Non-direct Contact Steam Generation.

Figure 2:
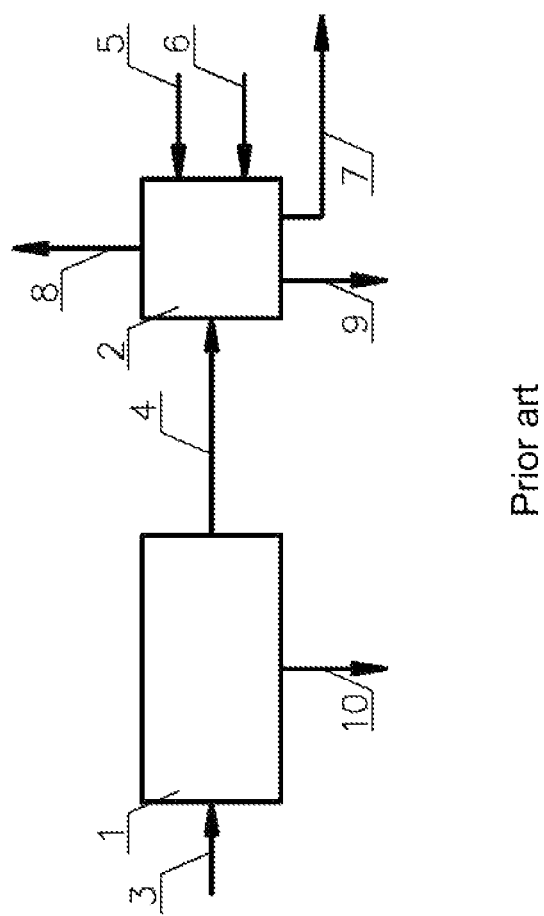
FIG. 2 shows a general block diagram of a prior art steam generation facility used in the oil industry. These facilities are standard and are commercially available.

FIG. 2 shows a general block diagram of a prior art steam generation facility used in the oil industry. These facilities are standard and are commercially available. They include two basic units—a water treatment unit 1, and a steam generating unit 2 that uses the treated water. The water treatment facility can be any type of commercially available facility—a warm lime softener, an RO (Reverse Osmosis) facility, an evaporation based facility or ion exchange—based facility. Feed water 3 is treated to remove impurities. The particular water treatment facility in use and the level of water purity depends on the water 4 quality required by the steam generation facility, as there is a significant difference between the water requirements of OTSGs and boilers. The water treatment plant 1 generates a stream of rejected water. This reject water is typical of the water treatment process currently being used. It can include sludge from the lime softeners, water from the filters, ion exchangers and polisher back-flashes or back-washes, RO reject water, evaporator blowdown, etc. The steam generation plant can be an OTSG or Co-Gen facility that generates 80% steam 7. It could also be a steam boiler that generates 100% steam 7. In the heavy oil industry, it is standard to use OTSG for in-situ facilities (like SAGD or CSS) and to use steam boilers producing 100% quality steam for the oil sand open mining facilities, as seen in steam generation facility 2. Most of the water is recycled and used as an in-direct heat transfer medium. Steam generation facility 2 uses carbon based fuel or hydrocarbon fuel 5 and oxidizer gas 6. In most of the current oil sands projects, the fuel in use is natural gas and the oxidizer gas is air. There are also commercial projects in which the fuel is syngas, mainly CO. An additional option for fuel is to use the produced bitumen, possibly in the form of a slurry mixture. Typically, the oxidation gas 6 is air under atmospheric pressure. Another option is to use enriched air or pure oxygen as the oxidizing gas, (see patent application WO 2006/016042 A1 for Mihel Conturie et al, published 16 Feb. 2006). However, oxycombustion requires the use of an air separation unit to generate an oxygen—rich gas stream. This type of boiler can be used if the high concentration produced CO2 discharged from boiler 8 can be used as part of the process or for sequestration (to offset the air separation plant costs). Typically, the combustion gas 8 is released to the atmosphere through the steam generator stack at a temperature slightly higher than the dew—point, to prevent corrosion. The steam generation emits a stream of reject water. The quality and quantity of the reject water depends on the steam generation facility in question. For OTSG, 80% quality steam is generated. The remaining 20% water can be flashed in a few stages to recover water in the form of low-pressure steam. 9. Then, the remaining water is discharged as reject water, preferably to disposal wells (or to a separate ZLD facility, if required by environmental regulators). For boiler—based steam generation, water is constantly being discharged from the boiler mud drums 9. The produced steam 7 is used for injection into the underground formation, (in the case of In-Situ steam generation facilities) or for heating the processed water, the bitumen slurry and the sandy water. The steam is also used for flashing the diluent into the open mine excavation—based oil sand facilities.

Figure 2A:
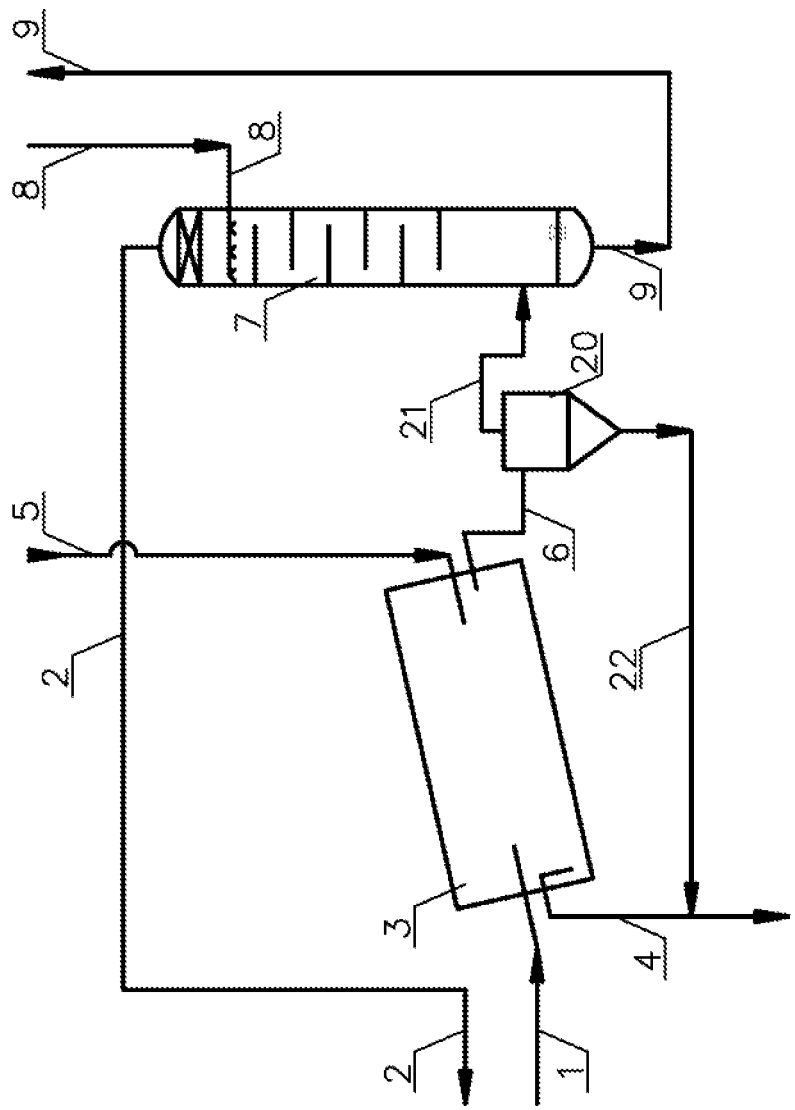
FIG. 2A, 2B, 2C and 2D are other schematic views of the present invention with oilsands mine fine tailing water recycling.

FIG. 2A is a schematic of the present invention for the generation of hot water for oil sand mining extraction facilities, with fine tailing water recycling, in order to achieve zero liquid discharge with fine tailing discharge.

Energy 1 is being injected into reactor 3. The energy should be in the form of a high temperature combustion gas, typically in the range of 1300-400 C. Another option is to inject the energy in the form of high temperature steam. Typically super-heated dry steam in temperatures ranging 250-600 C. Another option is to inject the carbon or hydrocarbon fuel, (like natural gas or petcoke slurry) and the oxidizer gas (like air) into the steam generation reactor 3 and then combust them. Energy is released in the form of heat to generate hot combustion gas. Fine Tailing water 5, possibly with high concentrations of solids like clay, hydrocarbons and other contaminants, is injected into DCSG (Direct Contact Steam Generator) reactor 3, where most of the water evaporates as it is converted to steam. There are several feasible designs for the unit 3. The design can include a horizontal rotating vessel, a fluidized bed reactor, and an up-flow reactor or any other reactor that can be used to generate a stream of gas and solids. Any available DCSG unit that can consume Fine Tailings and generate steam and solids can be used as reactor 3. A stream of hot gas 6, possibly with carried-on solids generated in reactor 3, flows into a commercially available solid-gas separator 20. Also, solids 4 can be discharged directly from the reactor 3 (depending on the type of the DCSG reactor used). The separated solids 22 and 4 are disposed of in a landfill. They can be mixed with tailing slurries in order to generate a stable material that can be disposed of into an oilsand mine for reclamation and for supporting traffic. The solid lean gas flow 21, with steam from water flow 5, is mixed with the oilsand mine process water 8 in vertical vessel 7. The processed water is heated due to direct contact with the gas 21. The water carried within the gas condenses and is converted to process water 8. The heated water 9 is typically at temperatures of 70 C-90 C. It is recycled back to the oil sand mine, where it can be mixed with the excavated oil sand ore after passing through the breaker. The pressure in the system can range from slightly above 1 bar up to 50 bar. An increase in pressure augments the efficiency of the water heating and recovery and reduces the needed facility size. The down-side of using high pressure, however, is that higher TIC (Total Installed Cost) and operation costs for the facility will need to be taken into consideration.

Figure 2B:
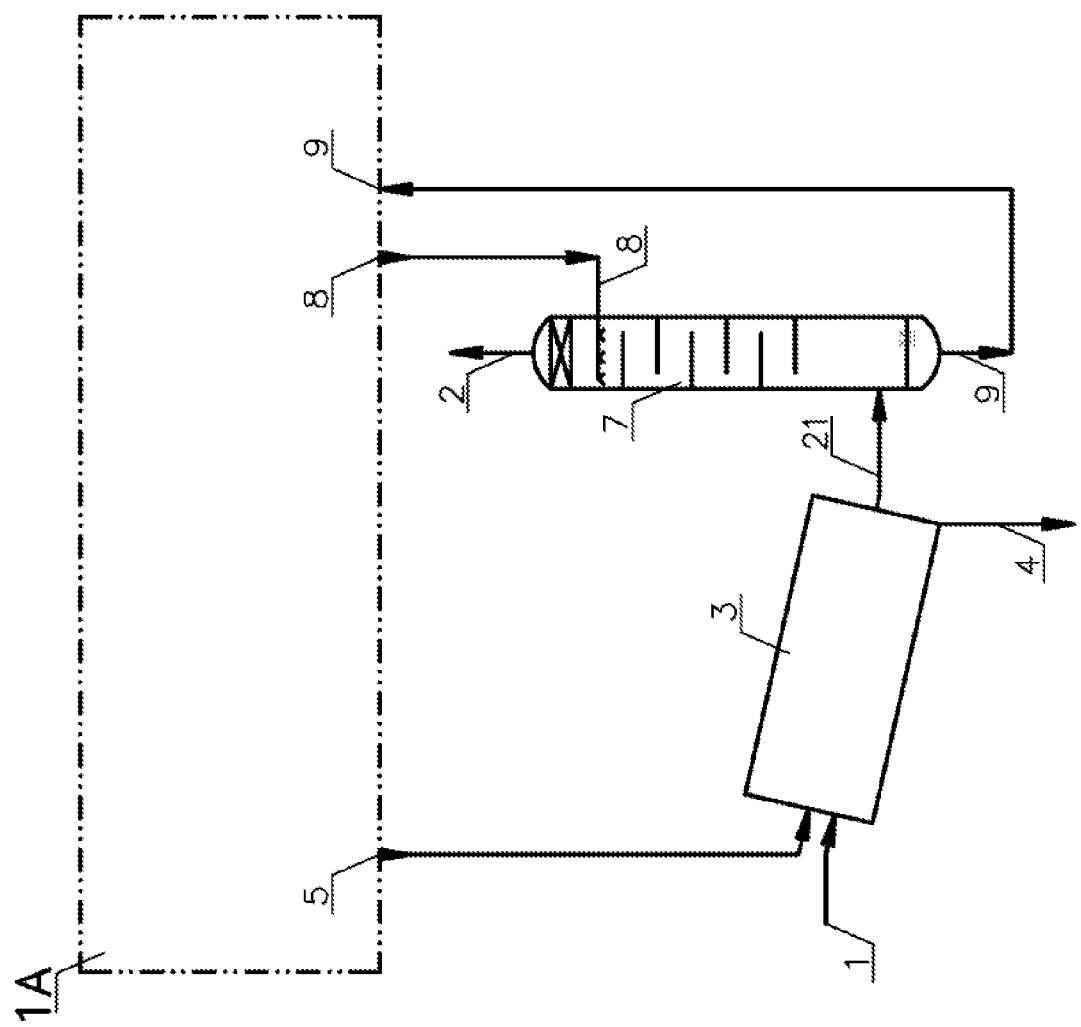

FIG. 2B is a schematic of the present invention for the generation of hot water for oilsand mining extraction facilities, with Fine Tailing water recycling.

Block 1A includes a Prior Art commercial open mine oilsand plant. The plant consists of mining oilsand ore and mixing it with hot process water, typically in a temperature range of 70 C-90 C, separating the bitumen from the water, sand and fines, and discharging the water mixture to a tailing pond. The cold process water 8 includes recycled process water together with fresh make-up water that is supplied from local sources (like the Athabasca River in the Wood Buffalo area). Another bi-product from the open mine oilsand plant is Fine Tailing (FT) 5 which, after a time, is transferred to a stable Mature Fine Tailings (MFT). Hot pressurized combustion gas or a mixture of fuel and oxidizer 1 is fed to enclosure 3. The hot combustion gases are mixed in enclosure 3 with a flow of FT 5 from Block A1. Most of the liquid water in the FT is converted to steam. The remaining solids 4 are removed from the steam and combustion gas mixture 21. Another option is to inject the carbon or hydrocarbon fuel and oxidizer gas into the steam generation reactor 3 and then combust them. Energy is released in the form of heat to generate hot combustion gas. The FT 5 can be injected with the fuel into the combustion to control the combustion temperature. The mixture of pressurized steam and combustion gas is mixed with the cold process water from Block 1A in a direct contact heat exchanger 7. A non-direct commercially available heat exchanger, as described in FIG. 15, can be used as well. The cold process water 8 is heated to generate hot process water 9 that is supplied back to operate the Open Mine Oilsand plant 1A. The steam generated from the FT and possibly from the combustion, is condensed and recovered with the hot process water supplied back to Block A1. The pressurized Non Condensable Gases (NCG) from the combustion process are released at 2 or are further used or treated (not shown). The enclosure 3 system pressure can vary from 103 kpa to 50000 kpa and the temperature at the discharge point 21 can vary from 100 C to 600 C.

Figure 2C:
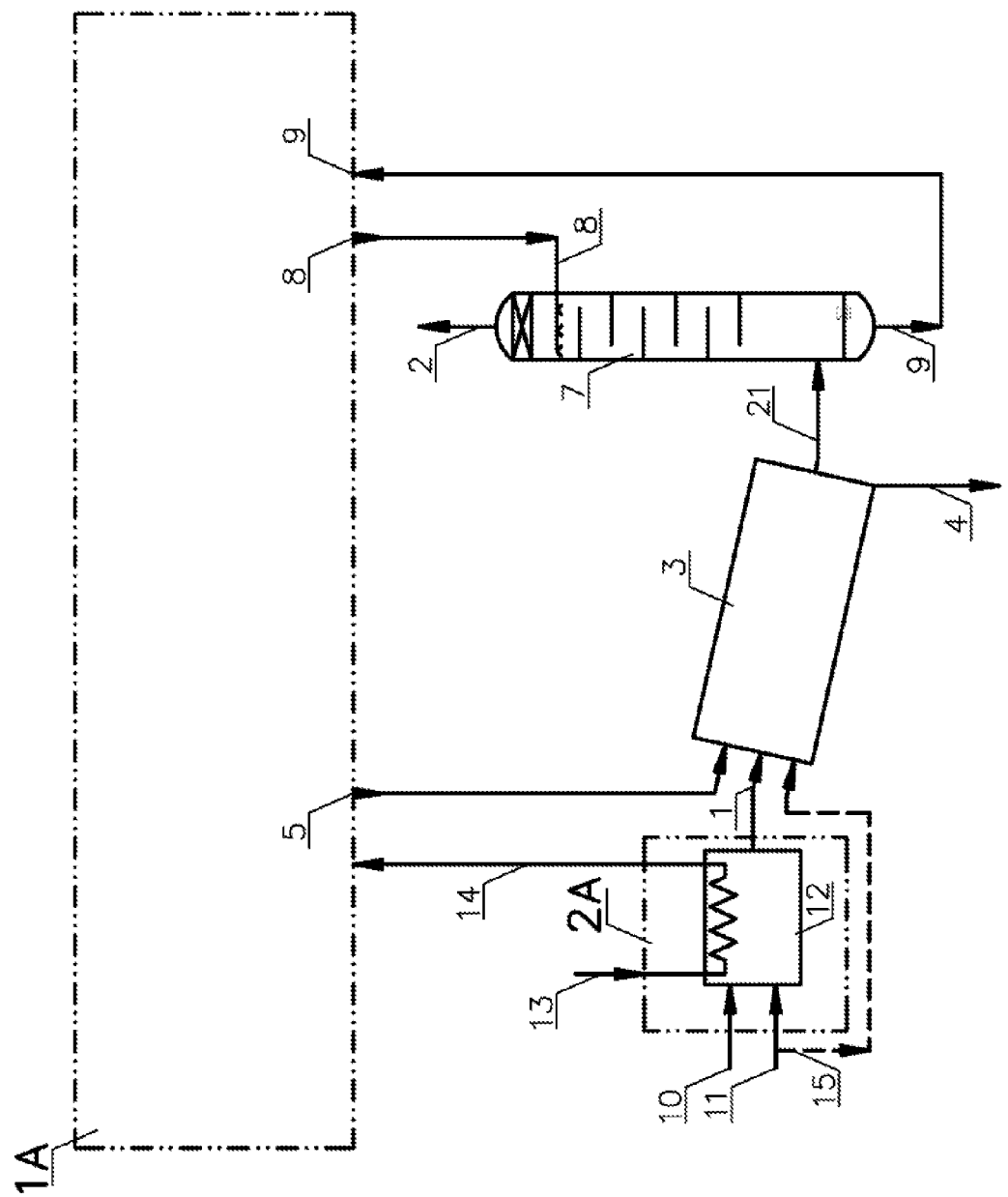

FIG. 2C is a schematic of the present invention as described in 2B, where the combustion gases for mixing with the FT/MFT are generated in a separate boiler or gasifier. BLOCK 1A includes a Prior Art commercial open mine oilsand plant. BLOCK 2A include a commercially available pressurized boiler or gasifier where the difference is in the combustion gas composition which, in the case of the gasifier, the combustion gas (called syngas) still has caloric value. Fuel 10 and oxidizer gas 11 is supplied into a pressurized boiler or gasifier 12 where some of the combustion heat is recovered to generate steam 14 from BFW 13. There are a few commercially available designs that can be used for unit 12. A PFBC (Pressurized Fluid Bed Combustion) boiler is one option. There are also a few commercial down flow and up-flow fluid bed gasifiers that can be used, like the down flow GE coal gasifier, for generating hot syngas. Heat is recovered directly from the gasifier for generating steam 14. The pressurized hot syngas 1 is directed to a DCSG where it is mixed with additional oxidizing gas 15 and it is fully combusted to generate additional heat and mixed with FT/MFT 5 to use the heat for transferring the water in the MFT into steam. When a pressurized boiler is used, there is no additional requirement for supplying oxidizer 15. The heat energy source is only the heat of the fully combusted combustion gases from the pressurized boiler 12.

Figure 2D:
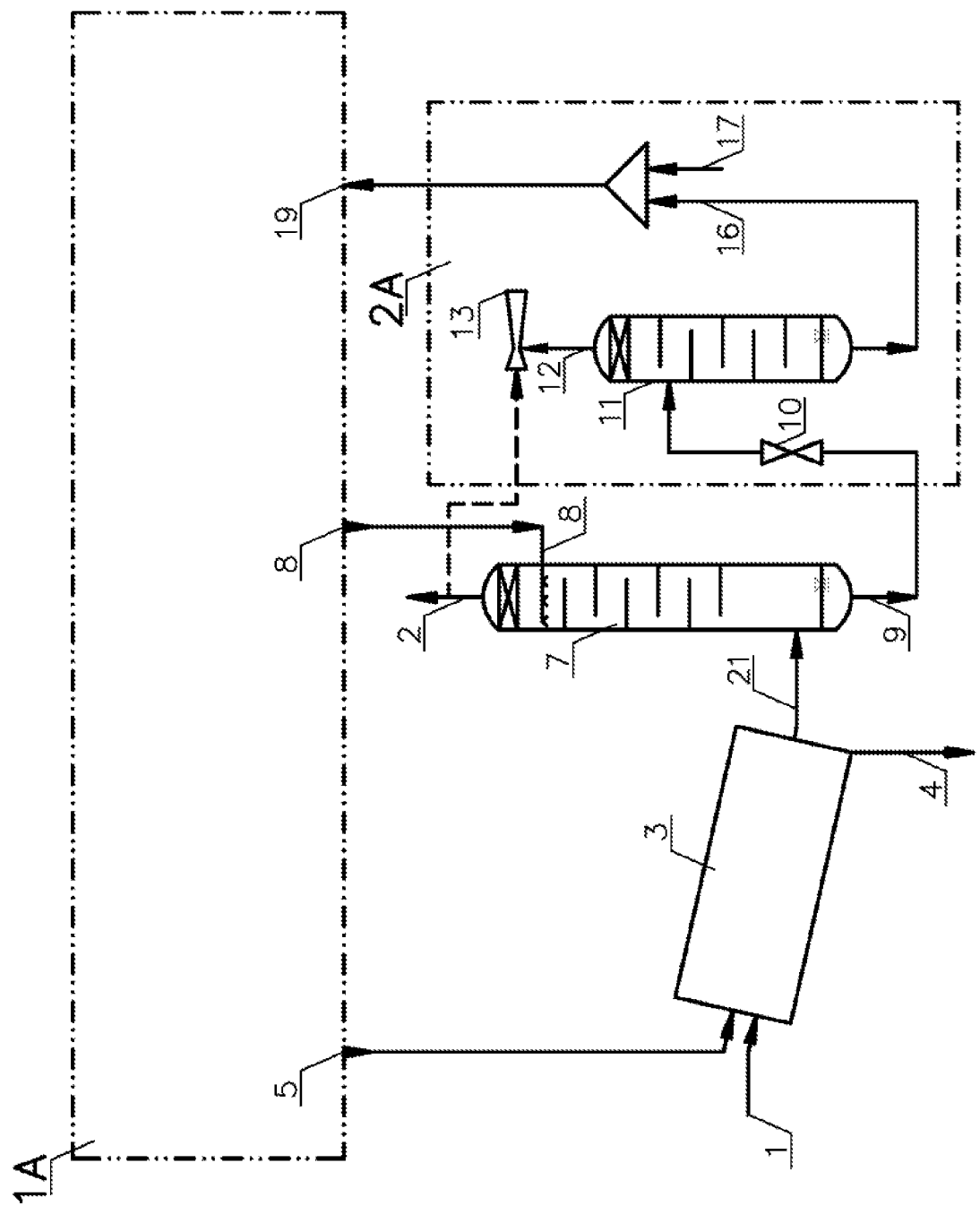

FIG. 2D is a schematic of the present invention as described in 2B, for generating slightly caustic (pH7.5-9) hot water for mixing with the oilsand ore. Most of the acid gases, like the SOX and the NOX, can be eliminated with the use of alkali material in the boiler (if a fluid bed boiler is used) and in the DCSG. However, a large percent of CO2 is an integral part of the combustion gas composition. Some of the CO2 will dissolve in the extraction process water while generating a weak acidity. One solution is to separate the flows and use a heat exchanger to prevent mixture of the process water with the combustion gas, as described in FIGS. 9, 3 and 3A. 3A or to recover the heat through heat exchanger, as described in FIGS. 3B and 15. Another option is to add caustic chemicals, like soda caustic, to react with the acidity. To minimize the amount of NaOH, the hot process water pressure is reduced 9 allowing the CO2 to bubble out from the water 12. NaOH 17 is added to the hot process water to react with the carbonic acid remains which generates the caustic pH required for the extraction process. The slightly caustic process water is supplied to the oilsand plant for extracting the tar from the sand.

Figure 3:
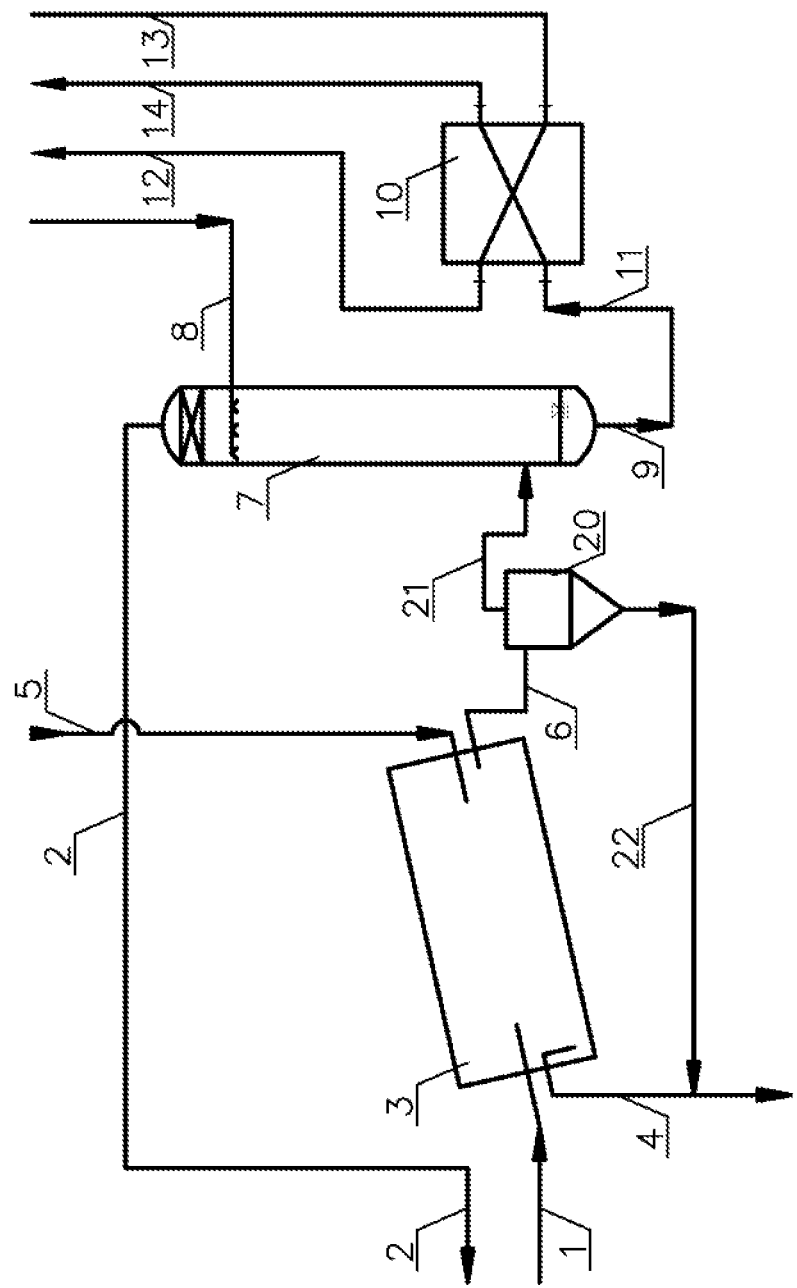
FIGS. 3, 3A, and 3B are schematic views of an illustration of the current invention for the generation of pre-heated water that can be used at a later time for steam generation in an oil sand EOR facility or mining extraction facility.

FIG. 3 is one illustration of the present invention for the generation of pre-heated water that can be used at a later time for steam generation in an oil sand EOR facility or mining extraction facility. The invention has full disposal water recycling, so as to achieve zero liquid discharge.

Energy 1 is introduced to the Direct Contact Steam Generator reactor 3. The energy may be in the form of a high temperature combustion gas, typically in the range of 1300 C-400 C or a high temperature dry steam, or as a mixture of carbon or hydrocarbon fuel, like natural gas or petcoke slurry, and an oxidizing gas, like air. The combustion inside the reactor releases energy in the form of heat to generate hot combustion gas. Contaminated water 5, like FT or MFT, is injected into reactor 3. There, most of the water is converted to steam, leaving solids with a low moisture content. There are several possibilities for the design of reactor 3. The design can be a horizontal rotating reactor, an up-flow reactor, or any other type of reactor that can be used to generate a stream of solids and gas. A stream of hot gas 6, possibly with carried-on solids generated in reactor 3, flows into a commercially available solid-gas separator 20. Solids 4 can also be discharged directly from the reactor 3, depending on the type of reactor used. The separated solids 22 and 4 are disposed of in a landfill. The solids lean flow 21, (rich with steam from flow 5) mixes with condensing water 8 in the direct contact vertical vessel 7. As described in FIG. 2B, the pressurized Non Condensable Gases (NCG) 2 released from the top of vertical vessel 7. The steam in flow 21 condenses by direct contact with the recycled water 8. The solid remains that previously passed through solid separation unit 20 and were carried on with the gas flow 21, are washed with the heated water 9. They are recycled back to the water treatment facility that originally supplied water for the steam generation facility (not shown). The condensing water 11 is cooled in heat exchanger 10, while transferring the heat energy to water 13. The heated water 14 can be used as a pre-heated water for steam generation or as the hot process water for open mine oilsand facility. The heat extracted from gas flow 21, due to water condensation in vessel 7 and from the NCG (Non Condensable Gas) cooling (in case combustion gas was used and not only steam), is a result of direct heat exchange with the recycled condensed water 8. BFW (boiler Feed Water) 13 from a commercially—available water treatment and steam generation facility (not shown), or process water from a bitumen extraction facility, flows through heat exchanger 10 to collect heat and generate pre-heated BFW or hot process water 12. It is then used in the steam generation facility to generate high-pressure steam for EOR. For example, it may be used in SAGD or for any other function that requires steam in an oilsand bitumen extraction facility. The temperature of the pre-heated water is dependant on the pressure in vessel 7. The pressure in the system can range from slightly above 1 bar up to 100 bar. The temperature of the preheated water, as well as the overall thermal efficiency of the system, increases as the pressure increases. However, this advantage comes with added facility costs. The system generates a stream of NCG 2 that can be further treated through a process such as CO2 separation for CO2 sequestration. The CO2 can also be injected into an underground reservoir to recover oil or maintain the reservoir pressure. The solids free NCG 2 can be used in the oil extraction process for slurry aeration or be released into the atmosphere, possibly after going through an expander in order to recover energy for compressing the process oxidizer gas (not shown). If steam is used in 1, the amount of NCG will be minimized.

Figure 3A:
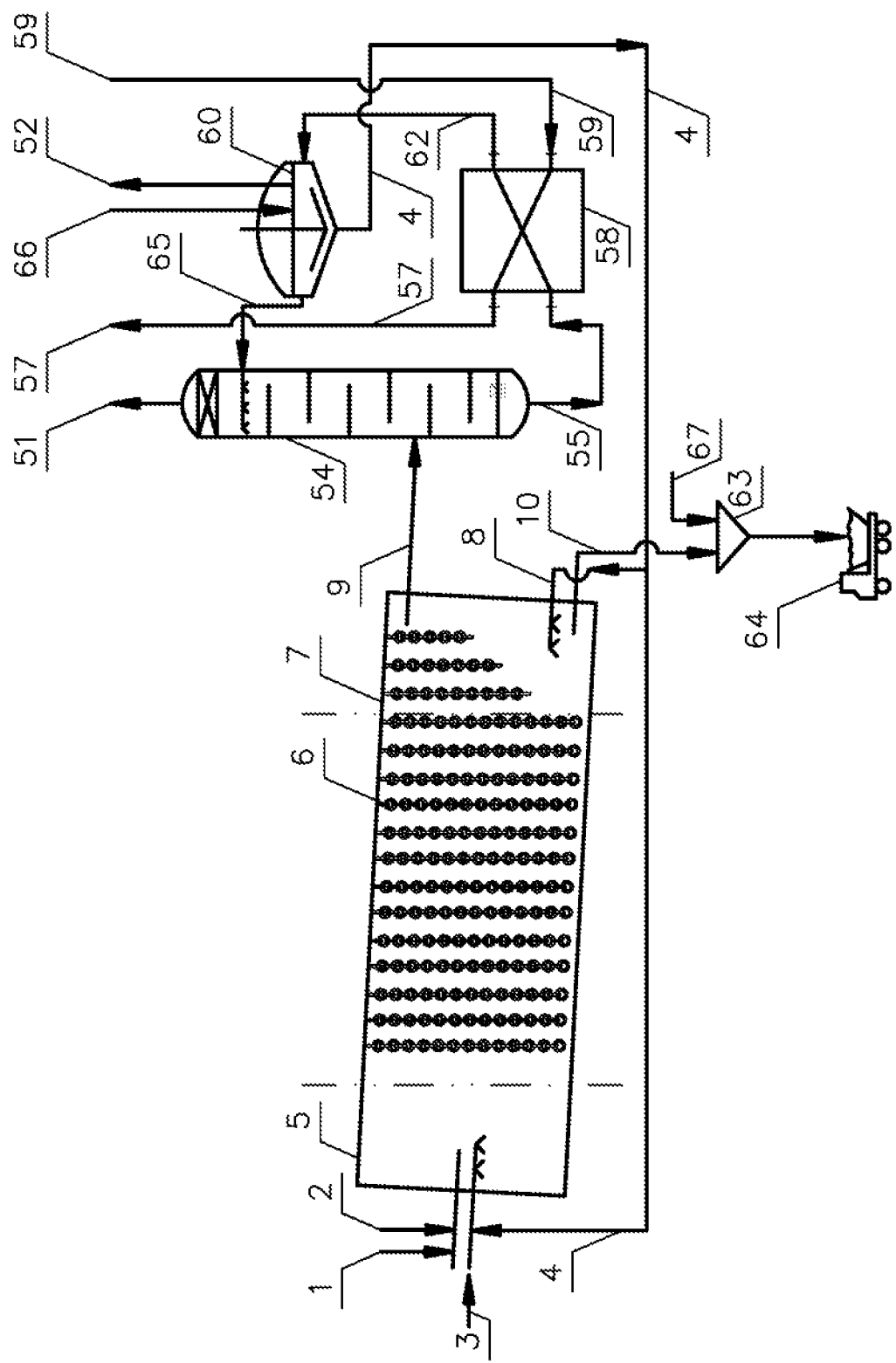

FIG. 3A describes another embodiment of the present invention.

Fuel 1 and oxidizer 2 are injected into a pressurized rotating parallel flow DCSG 5 and combusted in the combustion section 5. Fine Tailing water 3, together with solid rich recycled condensing water 4, are injected into the DCSG. The DCSG includes heat transfer section 6 with internal chains to improve the heat transfer and remove internal solids deposits. The solids are removed from the DCSG in a solid or semi-solid form. Additional MF 8 can be provided to the solids before they are discharged. The MF can increase the water content of the solids to prevent dust and to allow the reaction of the calcium sulfite to produce calcium sulfate (gypsum). The amount of FT 8 is such that the solids are dry enough (after mixing with air for oxidizing) to support traffic. If lime stone or possibly softening sludge was used to remove the SO2 from the combustion, the solids, with some FT 8, will be mixed 63 with air 67 to create an oxidation reaction of the calcium sulfite. This reaction will consume water, which will be supplied by adding additional FT 8 or MFT and through this, increasing the amount of FT that is permanently removed. It will also create a stabilizing effect because of the crystal water affinity with the gypsum (to generate a hydrate molecule). The solids removed through line 10 from the vessel to discharge point can be trucked 64 using the oilsand ore mine's existing equipment to then be used as back-fill in the ore excavation. The discharged gas 9 is discharged from the discharge section 7 and injected into scrubber and direct contact heat exchanger 54. The hot combustion gas with the steam from the DCSG is mixed with the recycled cool condensing water 65. The steam is condensed to generate a hot water 55, typically in the range of 80 C-150 C, and any remaining solids from the DCSG are scrubbed by the liquid water. The NCG 51 are released from the top of the vessel. The hot condensate recycled water 55 flows through heat exchanger 58 where the hot condensing water 55 leaving 54 heats the cold process water 59 supplied from the oilsand mine facility to generate the hot process water 57 used in the extraction oilsand mine facility. The cooled condensing water 62 is separated in separator 60. Alkali material like lime stone slurry, possibly with WLS (Warm Lime Softener) sludge 66, is added to recycled condensed water. The solid rich condensed water that includes solids that were carried by flow 9 leaving the DCSG, the alkali material that reacted with the SO2 and generated calcium sulfite, and possibly other solids (if, for example, Dolomite was present) are separated at separator 60. The solids rich flow 4 is recycled back to the DCSG. The access condensate water 52 is supplied to the Oilsands mine facility, where it can be further treated before being added to the process water or it can be added directly to the cold process water 59.

Figure 3B:
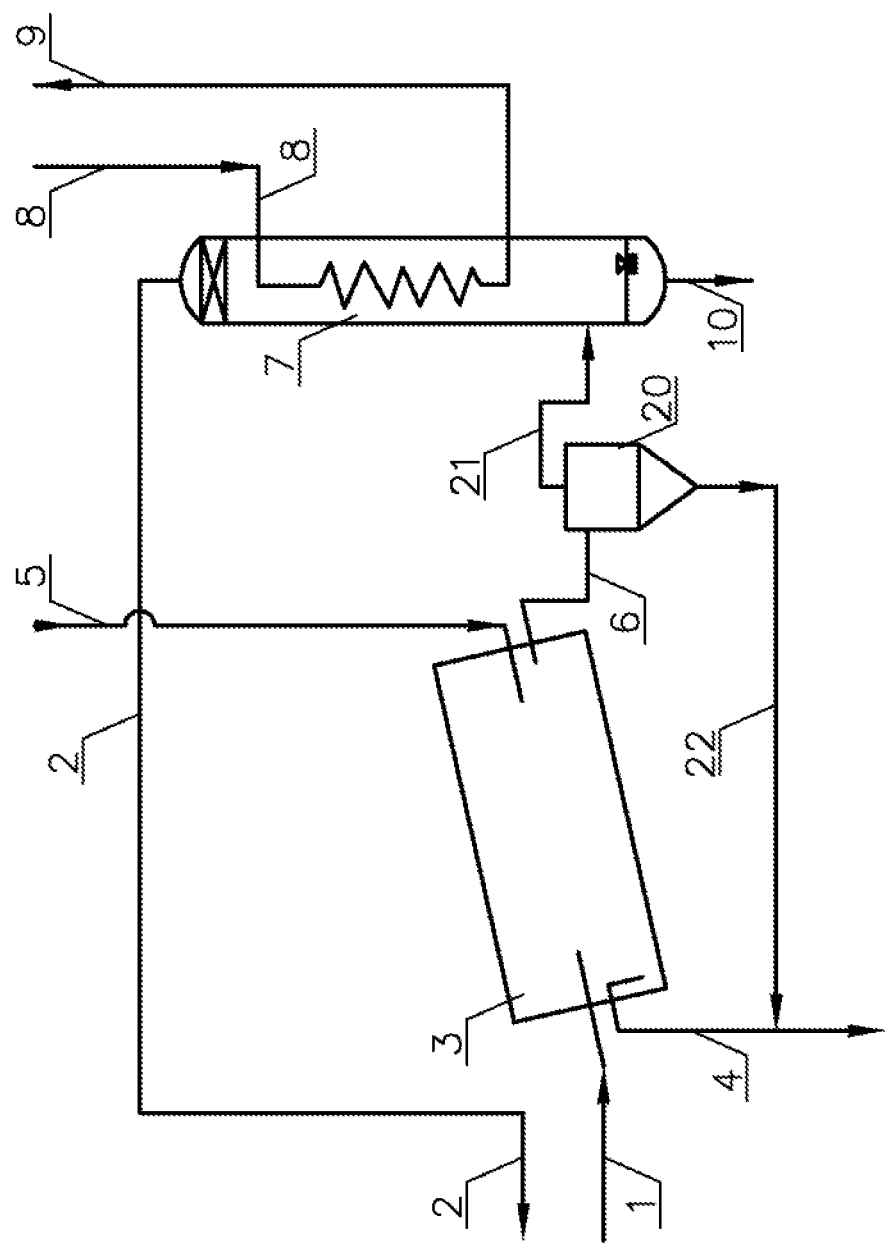

FIG. 3B describes another embodiment of the present invention for the generation of pre-heated water that can be used at a later time for steam generation in an oil sand EOR facility or mining extraction facility. This embodiment is similar to the embodiment presented in FIG. 2A or 3 with a commercially available non-direct heat exchanger condenser 7 as described in FIG. 15. The advantage in this configuration (compared to the direct heat exchanger of FIG. 2A or 3) is the prevention of formation of a combustion gases and process water mixture, and by that preventing the process water 9 acidity problems. The disadvantages are the need for a large heat transfer area because of the low heat transfer coefficient of gas flow 21, and a possible need to treat the NCG 2 after their heat was recovered because they are not washed by the heated process water 8

Energy 1 is being injected to reactor 3. The energy should be in the form of a high temperature combustion gas, typically in the range of 1300-400 C. Another option is to inject fuel and an oxidizer into reactor 3 and combust them inside the reactor. The energy is released in the form of heat, to generate hot combustion gas. Fine Tailing water 5 (possibly with high concentrations of solids like clay, hydrocarbons and other contaminants) is injected into reactor 3, which can be a horizontal counter flow Direct—Contact Steam Generator reactor. Any other reactor design can be used as well. Inside, most of the water evaporates as it is converted to steam. A stream of hot gas 6, possibly with carried-on solids and SO2 gas generated in reactor 3, flows into a commercially available solid-gas separator 20. Also, solids 4 can be discharged directly from the reactor 3, depending on the type of reactor used. The separated solids 22 and 4 are disposed of in a landfill or mixed with the MFT to generate a stable material that can be disposed of in an oilsand mine for reclamation and to support traffic. The solid lean flow 21, rich with water converted to gas from flow 5, is mixed with saturated water in vessel 12. To increase the mixture the saturated water 11 can be recycled within the vessel. Alkali chemicals like Lime stone, possibly with slurry from HLS/WLS (Hot Lime Softener/Warm Lime Softener), can be added to the make-up water 14 to react with the SO2. HLS/WLS are wildly used, for example, in the Fort McMurray and Cold Lake area on a large scale to treat water for steam generation in OTSG (Once Through Steam Generation) for deep formation EOR methods (Enhance Oil Recovery) like SAGD or CSS. The saturated water generates saturated NCG and steam 13. The solids rich water 10, including the generated calcium sulfite and calcium sulfate with the remains of the calcium that didn't react with the sulfur, can be discharged for disposal or can be recycled back to the DCSG 3, where the calcium remains will continue to react with the SO2 and will eventually be removed in solid form 4 or from the solid separator 22. The saturated, clean flow is injected into vessel 7 where it is used to heat the processed water used for ore preparation 9. The processed water is heated due to direct contact with the gas 13. The water carried within the gas condenses and is converted to processed water 8. The NCG that was not soluble into the hot process water is recovered as gas 2. The heated process water 9 is typically at temperatures of 70 C-90 C. It is recycled back to the oil sand mine, where it can be mixed with the excavated oil sand after the breaker. The pressure in the system can range from slightly over 1 bar up to 50 bar. This increase in pressure augments the efficiency of the water heating and recovery process and reduces the required facility size. The down-side of using high pressure, however, is that higher construction costs for the facility will need to be taken into consideration.

Figure 5:
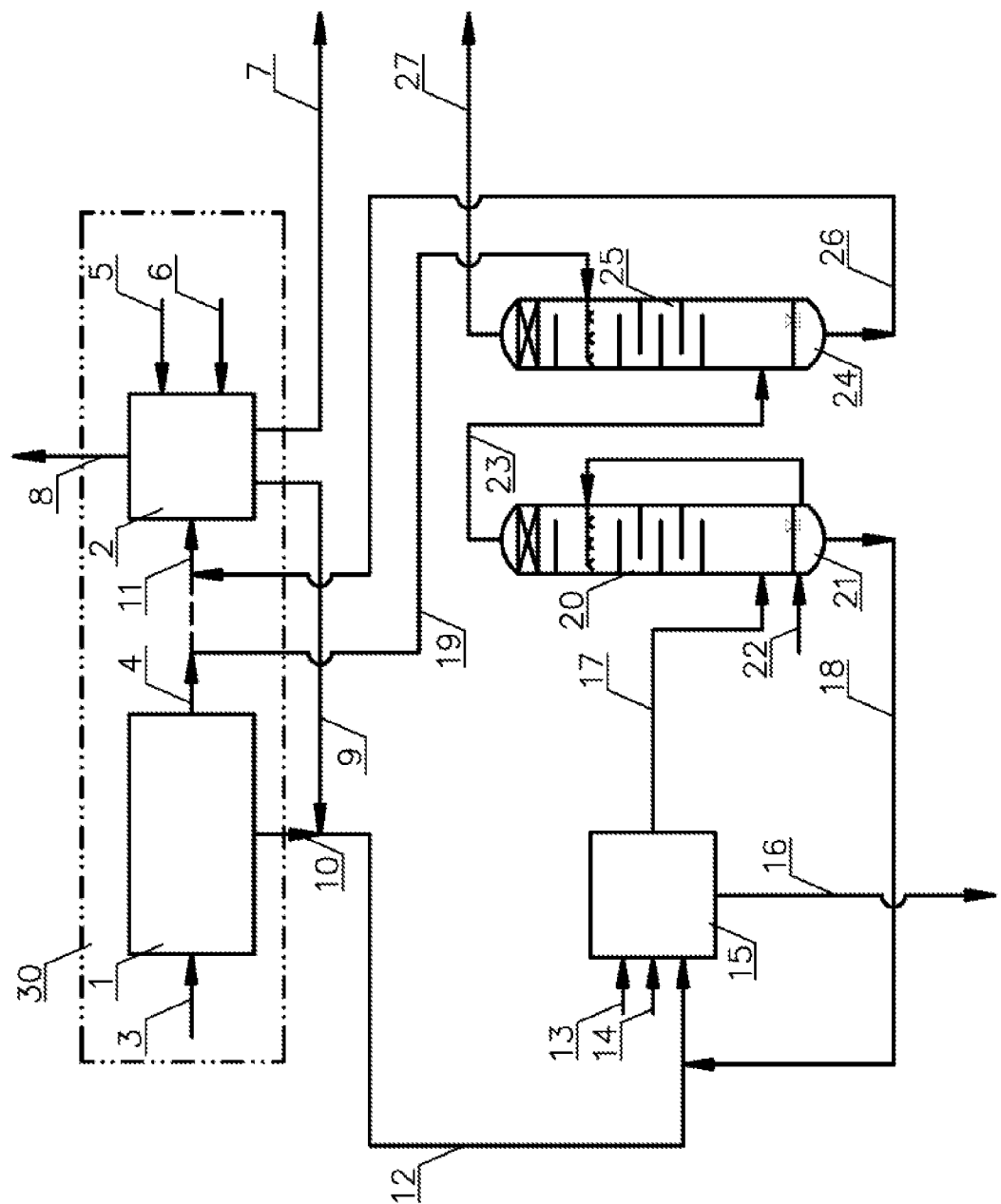
FIG. 5 is a schematic view of the current invention with a direct contact steam generator.

FIG. 5 is an illustration of the invention, shown in combination with a commercially available steam generation facility 30—a prior art steam generation facility 30 including a water treatment unit 1 and a steam generation unit 2. Flow 3 is the water treatment plant water feed. Flow 4 is the BFW, which is the treated water generated by the water treatment unit 1. The water discharged from water treatment plant 10 and the water discharged from the steam generation facility 9 is injected into a Direct Contact Steam Generator facility 15, where the discharged water is subjected to a hot pressurized combustion gas. The pressure can vary from ibar up to 70 bar. Hot gases are generated from the combustion of carbon-based fuel 14 and oxidizer gas 13. The fuel 14 can be in the form of a gas (like natural gas), liquid (like slurry or liquid hydrocarbon) or solid (like pet-coke or coal). Dry solids or semi-dry solids 16 in a non-pumpable slurry form are removed from the produced gas flow 17. The discharged solids 16 can be disposed of efficiently in a landfill. Gas flow 17 contains non-condensable gas and steam from water 12 in the form of gas, possibly with some solid remnants. The gas 17 is washed in vessel 20 through direct contact with saturated water 21. During this stage, additional steam can be generated. Make-up water 22 is continually added. The water can include lime and additional alkalis to remove gas contaminants, such as SO2. Solids rich contaminated saturated liquid—phase water 18 is recycled back to the direct contact steam generator 15. There, it will be converted to mainly gas 17 and solids 16 for disposal. A saturated, solids free steam and non-condensed gas mixture 23 is generated. Steam 23 is mixed in pressurized vessel 25 with the boiler feed water 19 from water treatment plant 1. The steam is condensed into water 24. The temperature and pressure in vessel 25 is different in comparison to vessel 20, as the purpose of vessel 25 is to recover the saturated steam flow generated in vessel 20. Water 24, is at a lower temperature due to being saturated at the partial pressure level inside vessel 25. The heat from the non-condensable gas and from the condensed water vapor in gas flow 23 is recovered in direct contact with BFD 19; this is done to generate heated boiler feed water 26. The heated BFW can be at a temperature in the range of 50-200 C. The heated BFW is used as the water source 11 in steam generation unit 2. Based on the pressure inside vessel 25, the percentage of NCG will vary as will the volume of BFW 19 that was injected into vessel 25 from the water treatment plant. This is done in order to collect the heat and the water. The generated heated BFW 26 is pumped from the bottom of vessel 25 to the steam generation unit 2, and is then pressurized and converted to steam at steam generation facility 2. The system may include pre-treatment of the BFW to remove dissolved gases that have negative impacts on the steam generation facility, like traces of CO2 or SO2 (not shown). The steam generation unit 2 used for this process should be a common, commercially available, direct facility unit. This may include an OTSG or steam boiler (possibly with economizer), air pre-heater, flue gas recycler, or any other commercially available improvement. Fuel 5 and air 6 are used in the steam generation facility 2 for steam generation, while generating flue gases 8. The steam generation facility generates high-pressure steam 7 and some reject water 9. The reject water is recycled back, along with the water treatment facility reject water 10, to the direct contact steam generation unit 15. The high-pressure steam 7 can be used for EOR and is injected into an underground formation, as in SAGD, or is used as the heat source in an oilsand mining plant operation.

Figure 6:
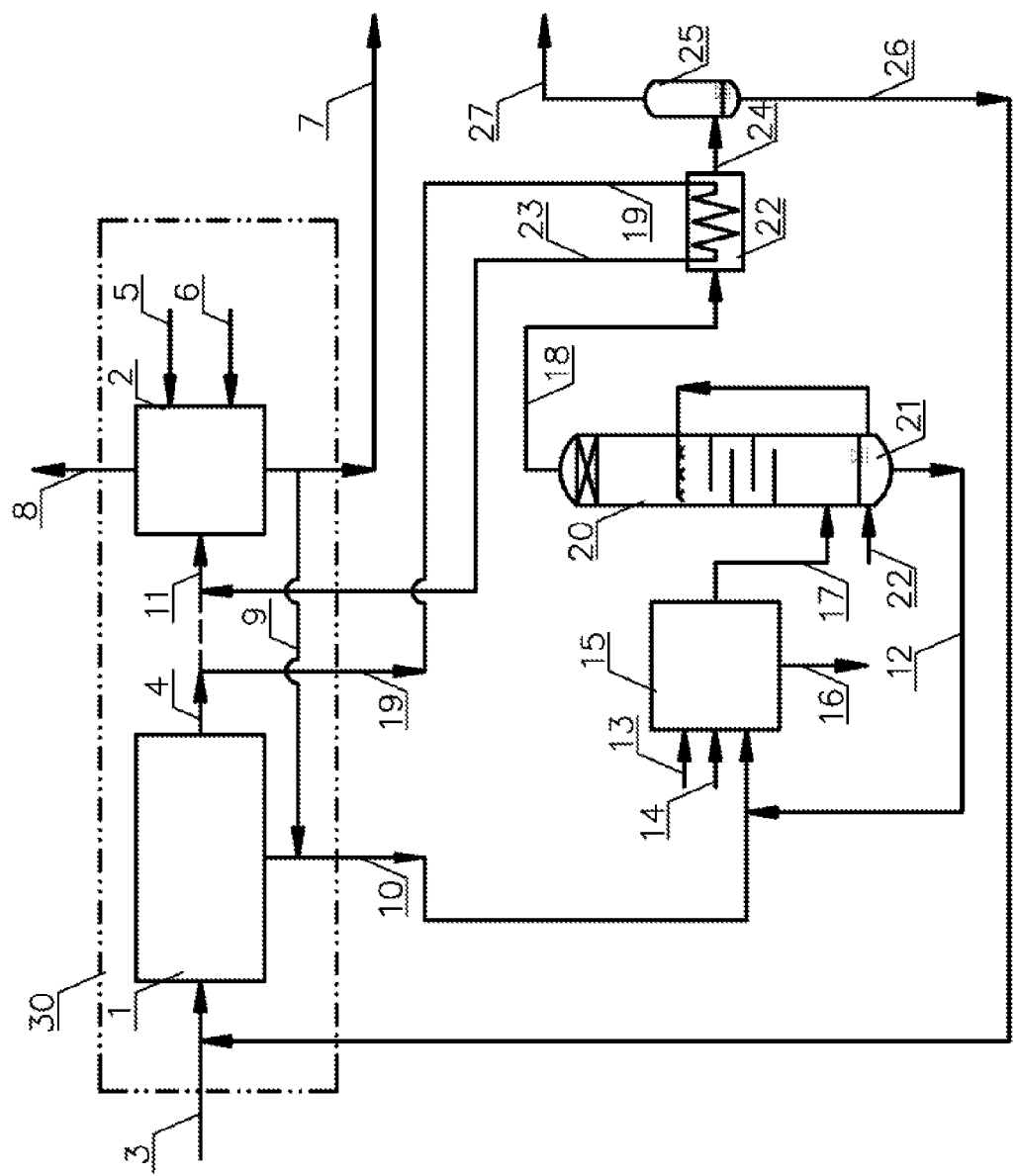
FIG. 6 is a schematic view of the current invention with steam generation and non-direct pre-heating of boiler feed water.

FIG. 6 is a schematic of the present invention that includes commercially available steam generation facilities, with non-direct pre-heating of the BFW. FIG. 6 is partly similar to FIG. 5. Reference characters 3, 4, 5, 6, 8, 9 and 11 are described in FIG. 5. The prior art facility in FIG. 6 shows steam generation that requires high quality BFW, as in the case of a package boiler. In the boiler, condensed water from the direct contact mixture of BFW with the saturated steam and NCG (Non Condensable Gas) flow cannot be used without complicated treatment before using the water in the steam boiler 2. A prior art steam generation facility 30 includes a water treatment unit 1 and a steam generation unit 2. The discharged water from both the water treatment plant and the steam generation facility 10 is injected directly to a Direct Contact Steam Generator facility 15. There, the discharged water is subjected to a pressurized hot combustion gas. The hot gases are generated from the combustion of carbon-based fuel 14 and oxidizing gas 13. Dry solids or semi-dry solids 16 in non-pumpable slurry form are removed from the produced gas flow 17. The discharged solids 16 can be disposed of efficiently in a landfill or in an excavation site, where they can be covered and re-claimed back into the environment. Gas flow 17 contains hot combustion non-condensable gas and steam from the water that was converted to steam, possibly with some carried-on solid remnants. It is possible to only use steam without the combustion gas as gas flow 17. The gas 17 is washed in vessel 20 through direct contact with saturated water 21. During this stage, additional steam is generated. Make-up water 22 is continually added. The water can include lime stone and additional alkalis to remove gas contaminants like SO2. A saturated, solids free steam and non-condensed gas mixture 18 is generated. Liquid saturated water with scrubbed contaminates 12 is discharged from vessel 20. Heat and water from stream 18 is recovered in heat exchanger 22 with BFW 19 from the steam generation facility. The heated BFW 23 is used in the steam generation facility for steam generation. The liquid water and NCG gas phase 24 is separated in liquid-gas separator 25. The recovered condensed liquid water 26 is recycled back to the water treatment facility 1 for further treatment, before it can be fed into steam generation facility 2. The remaining Non Condensable Gas, with some carry-on water vapor 27, can be released to the atmosphere, or sent for further treatment (like CO2 sequestration). In case the steam was used as the gas 17, the amount of NCG will be minimized. The produced steam 7 from the steam generation facility 2 can be used for many purposes. It can be used for underground injection (as in EOR), or to heat water, or to separate bitumen from oilsand slurry. As well, it can be used to flash out diluent in open oil sand mine extraction.

Figure 7:
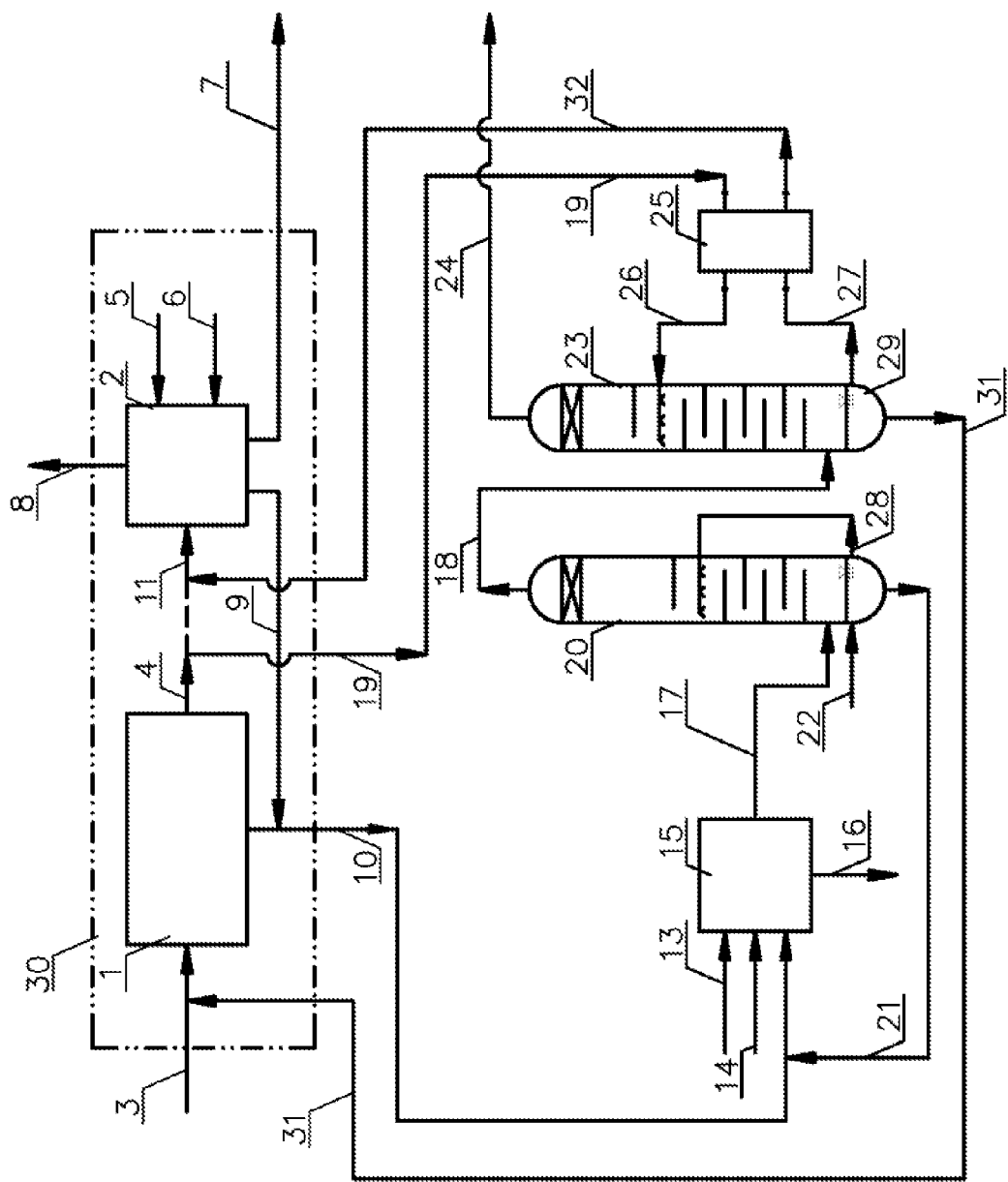
FIG. 7 is another schematic view of the current invention with steam generation and non-direct pre-heating of boiler feed water.

FIG. 7 is a schematic of the present invention for the integration of the present invention with a commercially available steam generation facility and with non-direct preheating of the BFW. FIG. 7 has some similarity to FIGS. 5 and 6 with a few notable differences. Reference characters 3, 4, 5, 6, 8, 9 and 11 are described in FIG. 5. The prior art facility in FIG. 7 includes steam generation that requires high quality BFW. A prior art steam generation facility 30 includes a water treatment unit 1 and steam generation unit 2. The discharged water from the water treatment plant and from the steam generation facility 10 are injected directly into a Direct Contact Steam Generator facility 15, where the discharged water is subjected to a pressurized hot combustion gas. The hot gases are generated from the combustion of carbon-based fuel 14 and oxidizing gas 13. Dry solids, or semi-dry solids 16, in slurry form are removed from the produced gas flow 17. The discharged solids 16 can be disposed of efficiently in a landfill or at the excavation site where the solids can be covered and re-claimed by nature. Gas flow 17 contains hot combustion, non-condensable gas and steam from the water, possibly with some carried-on solid remnants. The gas 17 is washed in vessel 20 through direct contact with saturated water 21. During this stage, additional steam is generated. Make-up water 22 is continually added. The water can include lime and additional alkalis to remove gas contaminants like SO2. A saturated, solids free steam, non-condensed gas mixture 18 is generated. The heat and water from stream 18 is recovered in vessel 23 with direct heat exchange with recycled water 23. The hot recycled water 27 flows through liquid-liquid heat exchanger 25, where the recycled water 26 cooled while transferring heat to the BFW 19 from the steam generation facility; the heated BFW 32 is used in the steam generation facility. The recovered condensed liquid water accumulates in sump 29 where flow 31 is recycled back to the water treatment facility 1, for further treatment before it can be fed into the steam generation facility 2 and heated in heat exchanger 25. The remaining Non Condensable Gas, with some carry-on water vapor 24, can be released to the atmosphere. Or it can be sent to undergo further treatment, like CO2 sequestration. The produced steam 7, from the steam generation facility 2, can be used for underground injection as in EOR, to heat water and separate bitumen from oilsand slurry.

Figure 8:
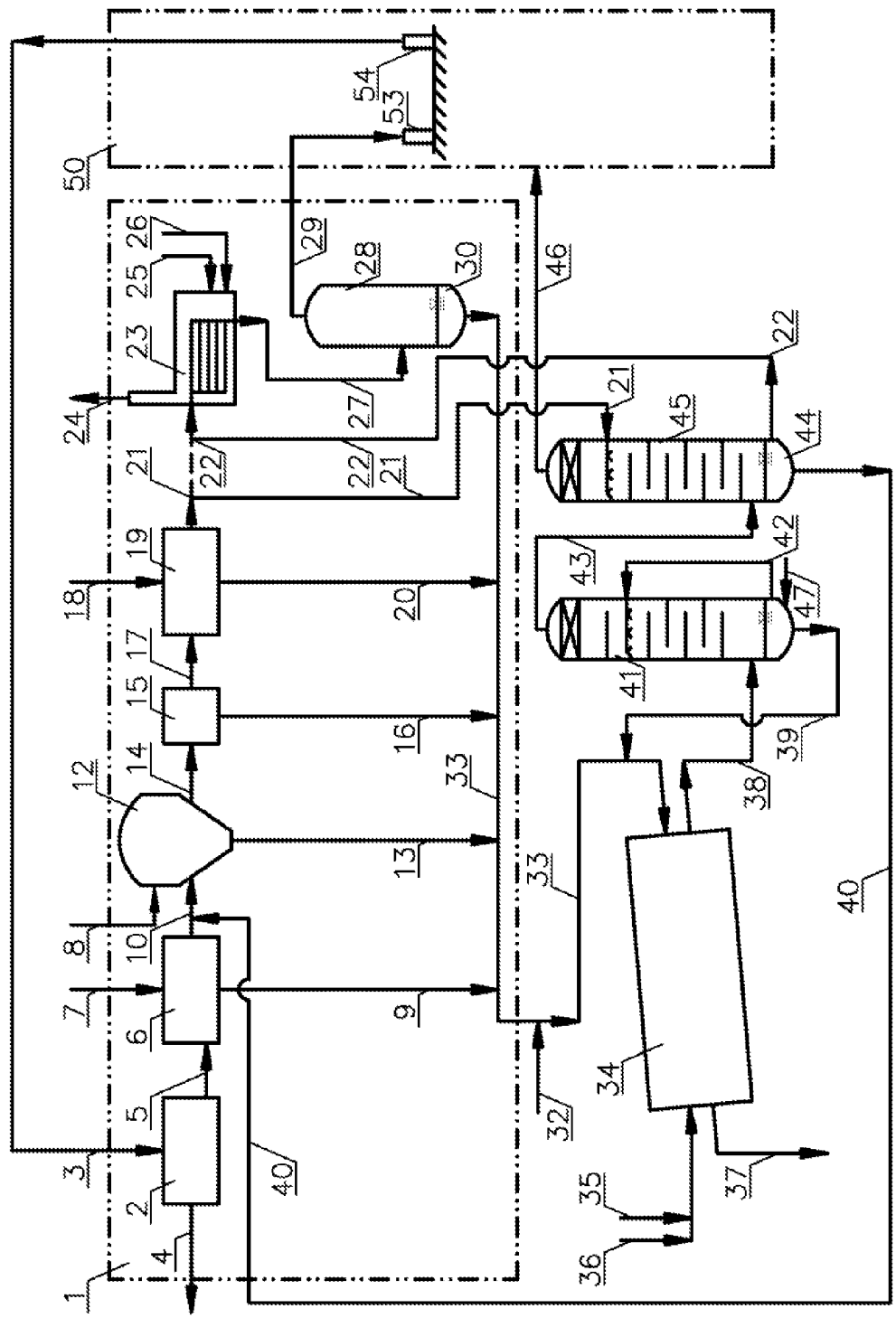
FIG. 8 is a schematic of an integrated facility of the present invention with a commercially-available steam generation facility and enhanced oil recovery for heavy oil production.

FIG. 8 is a schematic of an integrated facility of the present invention with a commercially available steam generation facility and EOR for heavy oil production. The steam for EOR is generated using a lime softener based water treatment plant and OTSG (Once Through Steam Generator) steam generation facility as described in BLOCK 1. This type of configuration is currently most common in EOR done in Alberta. It is producing oil from deep oil sand formations using SAGD or CSS. Produced emulsion of water and bitumen 3, is broken down inside a separator facility 2 to oil 4 and water 5. There are many methods of separating the bitumen from the water—the most common one uses gravity. Light hydrocarbons can be added to the product 3 to improve the separation process. The water, with some oil remnants, flows to a produced water de-oiling facility 6. In this facility, chemicals, like de-oiling polymers 7 are added. Waste water, with oil and solids 9, is rejected from the de-oiling facility 6. In a traditional system, the waste water would be recycled or disposed of in deep injection wells. The de-oiled water 10 is injected into warm lime softener 12, where lime, magnesium oxide and other softening chemicals are added 8. The softener generates sludge 13. In a standard facility, the sludge is disposed of in a landfill. The sludge is semi-wet and hard to stabilize. The softened water 14 flows to a filter 15, where filter waste is generated 16. The filtered water 17 is sent to an ion-exchange package 19, where regeneration chemicals 18 are continually used and rejected with carry-on water as waste 20. In a standard system, the treated water 21 flows to an OTSG 23 where approximately 80% quality steam is generated 27. The OTSG typically uses natural gas 25 and air 26 to generate steam. The flue gas is released to the atmosphere through stack 24. Its saturated steam pressure is around 100 bar and the temperature is slightly greater than 300 C. The steam is separated in separator 28, to generate 100% steam 29 for EOR and blowdown water 30. The blow down water can be used as a heat source and also to generate low pressure steam. The steam 29 is delivered to pads, where it is processed and injected into the ground through injection well 53. The production well 54 produces an emulsion of water and bitumen 3. In some EOR facilities, injection and production occur in the same well, where the steam is 80% quality steam 27. The injection well 53 and the production well are located on a well pad 50. The steam is then injected into the well with the water. This is typical of the CSS pads. The reject streams includes the blow down water from OTSG 30, as well as the oily waste water, solids and polymer remnants from the produced water de-oiling unit. This also includes sludge 13 from the lime softener, filtrate waste 16 from the filters, and regeneration waste 20 from the Ion-Exchange system 19. The reject streams are collected 33 and injected into Direct Contact Steam Generation 34. Additional water 32, from any available water source, can be added. The energy source can be a gas, liquid, solid, carbon or hydrocarbon—based fuel 36 and oxidizing gas (like air) 35. The DCSG can be vertical, stationary, horizontal or rotating, as seen in scheme 34. Dry or semi-dry solids 37 are discharged from the DCSG, after most of the liquid water is converted to steam. The combustion gas and steam 38 temperature can vary between 120 C to 300 C. The pressure can vary between 1 bar and 50 bar. The solid lean gas is injected into vessel 41, where the gas is washed with saturated water 42 to remove the solids remnants and generate additional steam. The water can include lime for removal of sulfur gas. Make-up water 47 can be added to the vessel 47. Solid rich water 39, possibly with gypsum (generated from the reaction between the sulfur and the lime), is continually removed from the bottom of vessel 41. It is recycled back to the DCSG, where the solids are removed in a dry or semi-dry form 37. The liquid water is converted back to steam 38. The solids—free saturated steam and combustion gases 43 flow to a second vessel 45. In this vessel, the steam condenses to liquid water 44. Then, it is cooled due to direct contact heat exchange with the BFW (Boiler Feed Water). Water 21 is generated by the water treatment facility 1 is heated while condensing additional steam to heated liquid water. The heated water, 22 can be sent back as pre-heated BFW to the OTSG, to generate 80% quality steam, or it can be recycled back to water treatment facility 40, where it is added to de-oiled produced water 10. The NCG 46 can be supplied to the well pad 50 where it can be injected underground.

Figure 9:
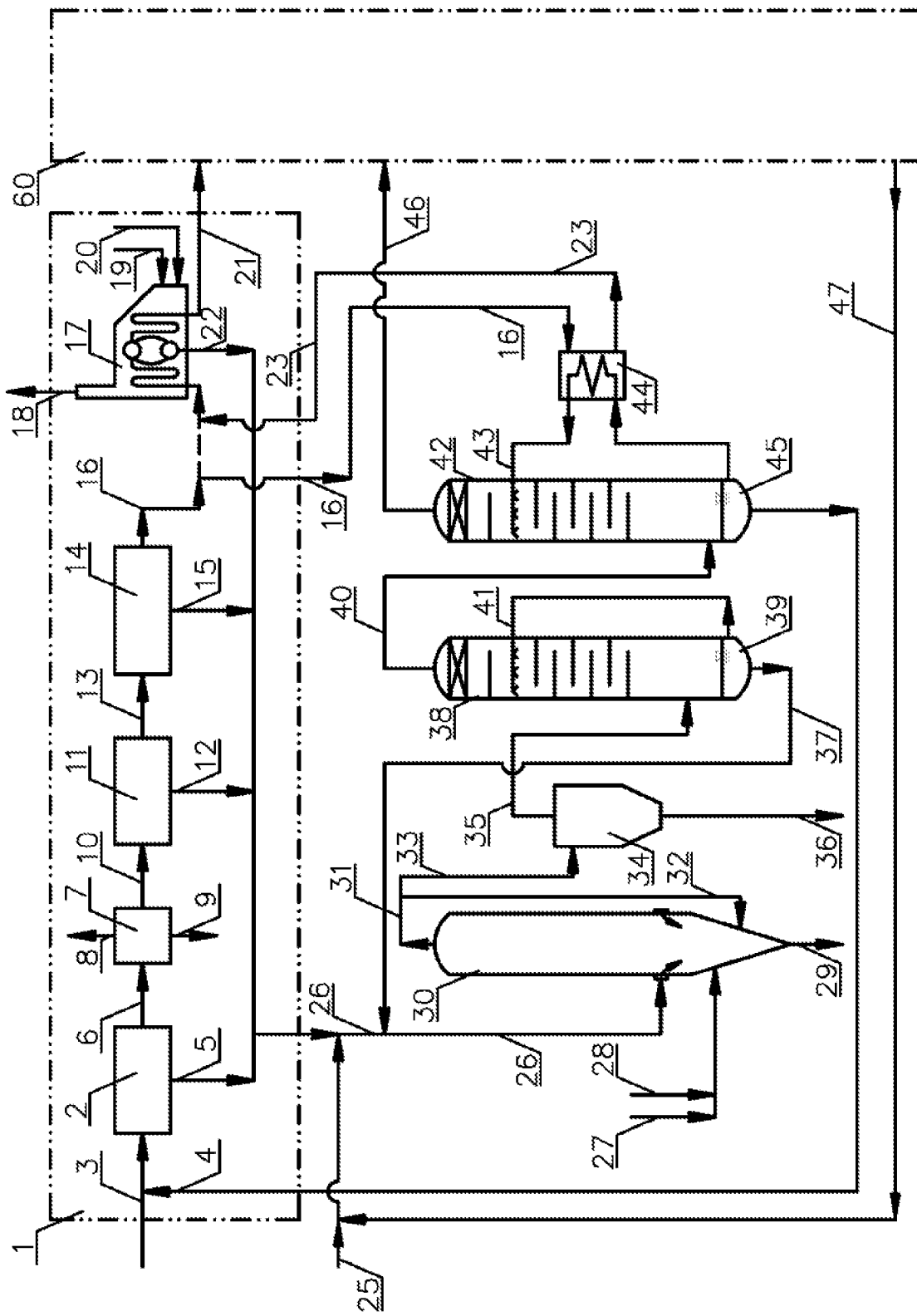
FIG. 9 is a schematic of an integrated facility of the present invention with a commercially-available steam generation facility and open-mining oilsand facility.

FIG. 9 is a schematic of an integrated facility with a commercially available steam generation facility 1, for open mining oilsand facility 60. The steam for the bitumen extraction is generated with commercially available boilers 17 that include steam and mud drums. The water for steam generation is produced using a standard, commercially available water treatment facility that is based on ion exchange and polishers. Raw water 3 flows to the de-mineralized water clarifier and filter 2. The filtered water 6 flows to a cation reactor and de-gasifier 7 where contaminate gases 8 are removed in a gas form 8 and contaminated water removed in a liquid form 9. The water 10 then flows to anion reactor 11. From the anion reactor, the water 13 flows to a mixed bed polisher 14 to generate de-mineralized BFW quality water 16. Chemicals are continually supplied during the process, to remove minerals and other contaminates. In the process, reject and backwash water is continually generated 5, 9, 12, 15. The reject water contains minerals and water treatment chemicals. The reject water is collected and injected into the vertical up-flow, cold fluid bed, direct contact steam generator 30. Fuel 27 and oxidizer 28 are injected to the bottom of fluidized bed steam generator 30. The contaminated water 26 is sprayed into the steam generator 30, above the combustion zone. The sprayed water is composed of: water treatment facility 1 reject water, boiler blow-down water 22, and reject water 47 from oilsand mine extraction facility 60. Any additional contaminated water 25 from external sources can be used as well. The reject water includes tailing water and possibly hydrocarbon contaminants. The liquid water is converted to steam and carries most of the solids upwards, where they are discharged at the top of the vessel as a solid—rich stream of gas 31 and from the bottom of the steam generation vessel 29. Some of the cooler discharged gas 32, at a temperature range of 150 C-400 C, can be recycled back to the bottom of the vertical steam generator 30 to maintain the cold fluid bed below the combustion zone. This reduces the temperature and increases the up-flow stream in vessel 30. Solids 36 are removed from the bottom of the vessel 29 in dry form and from the solid—rich gas flow 33 by commercially available solids-gas separation unit 34. The solid lean gas flow 35 is washed in tower 38 with saturated water 41 to remove any solid remnants. Sulfur gas can be removed as well with the use of lime. After most of the solids have been removed, the solid rich water 37 is recycled back from the sump 39 to steam generator 30. Make-up water, possibly with alkali material like lime stone, is added to vessel 38 to maintain saturated liquid water level. The saturated stream of steam and NCG 40 flows to vessel 42, where heat is recovered using direct—contact cold water circulation 43. The recovered heat goes in through liquid heat exchanger 44. The heat increases the temperature of the treated BFW (Boiler Feed Water) in steam generation facility 1. The heated BFW temperature can be in the range of 70 C-200 C, depending on the partial steam pressure of vessel 42. The heated BFW 23 is fed to the boiler steam generator 17 to generate high pressure steam 21 for the oil sand mine and bitumen extraction facility 60. The boiler combusts carbon or hydrocarbon full 19 with oxygen containing gas like air 20. Combustion gas 18 released to the atmosphere or for further treatment. The condensate 45 can also be used directly as process water in facility 60 or pumped as feed water 4 to the water treatment plant and steam generation facility 1. The cold non-condensate gas 46, mainly combustion gas like $CO_2$, is released to the atmosphere or used in the open mine oilsands extraction facility 60 where it can be mixed with other tailing stream as described in other figures.

Figure 9A:
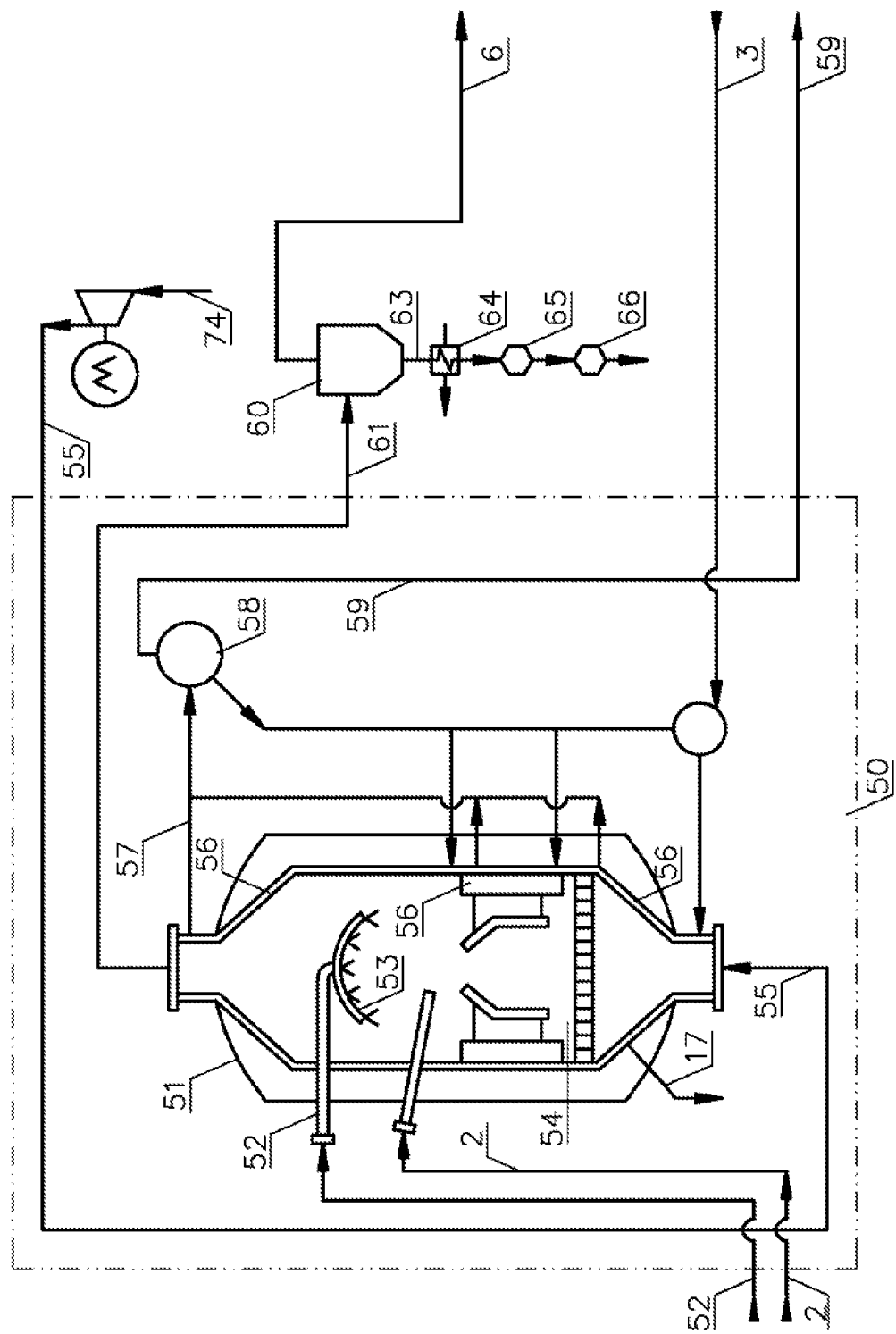
FIG. 9A is a schematic view of a combined fluidized bed combustion boiler and a direct contact steam generator with an in-direct internal heat exchanger for generation of high-pressure steam.

FIG. 9A is a combined fluidized bed combustion boiler and a direct contact steam generator with an in-direct internal heat exchanger for generation of high-pressure steam as described in BLOCK 50. Fuel 2 is mixed with air 55 and injected into a Pressurized Fluidized-Bed Boiler 51. The fuel 2 can be any available low quality carbon or hydro carbon fuel in a pumpable form. This carbon or hydrocarbon fuel can include coal, petcoke, asphaltin or any other available fuel. Lime stone can be added to the fuel 2 or to the tailing water 52 to remove acid gases like SOX. The Fluidized-Bed boiler is modified with water injection 52 and with reduced capacity internal heat exchangers to recover less combustion heat. The reduction in the required capacity of the heat exchanger is because more combustion energy will be consumed due to the direct heat exchange with possible water within the fuel (if water slurry fuel was used) and the additional injected solid rich water 52 leaving less available heat to generate high pressure steam through the boiler heat exchangers 56. The boiler produces high-pressure steam 59 from distilled, de-mineralized feed water 3. There are several pressurized boiler designs that can be modified with direct water injections. Examples for pressurized boilers are the Pressurized Internally Circulating Fluidized-bed Boiler (PICFB) developed by Ebara, and the Pressurized-Fluid—Bed-Combustion-Boiler (PFBC) developed by Babcock-Hitachi. Any other pressurized combustion boiler that can combust petcoke or coal and simply modified with tailing injection (separate from the fuel) can be used as well. The importance in separating the low quality (like tailing) water injection into two flows is to combine the "boiler" section at the bottom, that is capable in efficiently combusting the low grade fuel at relatively high temperatures (typically more than 700 C), with the DCSG above the combustion zone that mixes additional low quality (like MFT) with the combustion gases to generate steam and solids. The allowable temperature in the DCSG section can be lower than the combustion temperature, allowing for recovery of more combustion energy for direct contact steam generation. Another modification to a typical pressurized fluid bed boiler can be reducing the boiler combustion pressure, down to possibly 102 kpa (depends on the design process water temperature, as showed in Example 6). A lower working pressure will reduce the plant TIC (Total Installed Cost) and the pumps and compressors energy consumption. The use of the relatively low pressure system will have an impact on the process performance that has to be evaluated in detail to choose the optimal combustion and DCSG pressure. Steam is generated in heat exchanger inside the boiler. The generated steam 57 is separated in steam drum 58. The generated steam is used in the oil processing area for flashing solvents and any excess steam can be used for standard heating purposes. The combustion air 74 is compressed air 55, injected at the bottom of the boiler to maintain the fluidized bed 54. High pressure 100% quality steam 59 is generated from distilled water 3 through heat exchange inside the boiler 56. Low quality water, like fine tailing water that contains organics, is sprayed at the upper section of the boiler 53 and mixed with the up-flowing combustion gases generated by the boiler. The liquids evaporate while steam and dry solids are generated. Most of the solids generate small solid particles which are carried with the up-flowing gas, and large solid particles which fall to the fluidized bed by gravitation. Dry solids 17 can also be discharged in intervals from the bottom of the pressurized boiler. The solids—rich combustion gases discharged from the boiler 61 flow to a dry solids separator 60. The dry solid separator is a commercially available package. The dry solids are removed in dry form from the separator 63, possibly through heat recovery 64 and de-compression 65 and 66 valve sections. The heat energy and steam in solids lean flow 6 are recovered to heat the process water as described in the other figures.

Figure 10:
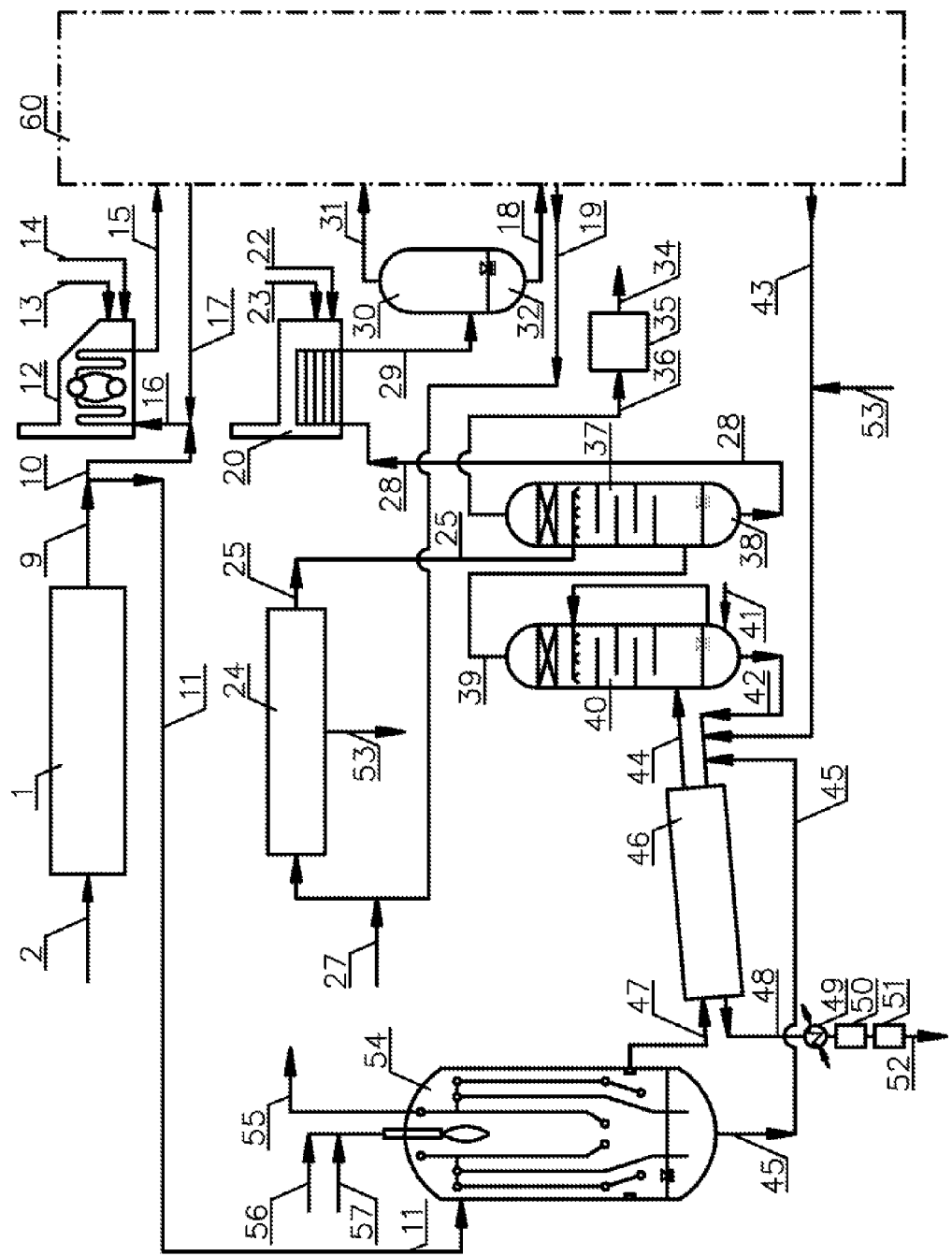
FIG. 10 a schematic of an integrated facility of the present invention with a commercially-available steam generation facility, open-mining oilsand facility, and gasifier for syngas generation.

FIG. 10 is a schematic of the integrated facility of the present invention for open mine oilsand extraction plant 60, using commercially available steam generation facilities, and a gasifier for syngas generation. The steam for bitumen extraction can be generated using a commercially available boiler 12, an OTSG 20, or a gasifier 54. The steam boiler 12 and the gasifier 54 generate steam from BFW water 9. The steam is used for heating purposes, through heat exchangers in a closed cycle. This minimizes the size of the heat treatment facility 1 required for generating high quality BFW, as it will have to produce only start-up and make-up water. The water treatment plant 1 for the generation of BFW is a commercially available package. The water 2, for production of BFW in the water treatment package is fresh water (not processed water from bitumen extraction 60). For example, river water without oil traces can be used. The BFW 16 is fed to the steam boiler 12 facility. Some of the BFW 11 is fed to the gasifier unit 54. The produced steam 15 from the steam boiler 12 and from the gasifier 55 is fed to oil extraction plant 60 to heat the processed water. The condensed water 17 is recycled back from oilsand plant 60, as a BFW to be re-used in the boiler 12 and the gasifier 54. The oilsand extraction facility requires processed steam as well. The processed steam is used in direct contact with the process flow; for example, it is used for froth de-aeration or for flashing out light carbons and diluent. The steam generated through OTSG can use a much lower quality water than boiler 12 and gasifier 54. The generated 80% steam 29 is separated in separator 30 to generate 100% steam 31 and blow-down water 18 that is recovered from the sump 32 at the bottom of steam separator 30. The 100% steam and the blow-down water 18 are both used in the oilsand open mine facility 60. The blow-down water 18 is mixed with process water from facility 60, with the pressure dropping, to generate processed hot water at 80-90 C for tar separation. Some processed water 19 from facility 60 can be sent to water treatment plant 24. The use of fresh water, 27 instead of the processed water 19, is preferable so as to reduce the water treatment plant 24 requirements as it eliminates the oil removal stage. The water treatment plant is tailor—made to the quality of the source water. If fresh river water is used, the plant, 24 would be very simple, as the OTSG can use this type of water with minimum treatment (I.e. treatments like filtering, oxygen removal and adding anti-scaling additives). If the water used by the water treatment plant is processed water, then the water treatment system 24 will be similar to a typical water treatment plant used in EOR facilities, like SAGD, as described in FIG. 8. The liquid (or slurry) waste discharge 53 from the water plant 24 can be added to the fine tailing stream 43. The gasifier 54 can be any type that is commercially—available.

The use of a gasifier with a water quenching bath is preferable. That is because the integration of gasifier 54 with DCSG (Direct Contact Steam Generation) 46 eliminates the problem of treating the "black" and "grey" water 45. This, in turn, is because the gasifier quenching water 45 is converted to steam and the solids are discharged in a dry form and are ready for the landfill. Water—quenching gasifiers have been developed by Texaco from the 1950's. Currently, they are available from GE. The gasifier 54 uses oxygen enriched gas 56 and carbon fuel 57. The carbon fuel can be petcoke or coal slurry. In the gasifier, the exothermic reaction heat generates high pressure steam 55 from BFW 11. The gasifier can replace the industrial boiler 12 as the high quality steam producer where all the treated BFW 9 will be consumed 11 by the gasifier and the steam 55 will replace the High quality steam 15. The boiler 12 burns natural gas 13 with air 14 as oxidizer. The produced synthetic gas 34 can replaced the natural gas or portion of the natural gas as the boiler fuel 13. The boiler uses portion 10 of the treated BFW clean water 9. The pressurized hot discharged syngas 47 flows to DCSG 46, where it is mixed with solid rich water to generate a stream of gas 44 with dry solid discharge 48. The water injected to the DCSG 46 may be the solid rich quenching water from gasifier 54, the concentrated fine tailing water 43 from the oilsand bitumen extraction facility 60, or the recycled saturated water 42. The liquid waste discharge 53 from the water treatment plant 24, possibly with contaminated water from other sources, can be added to the fine tailing stream 43 as well. The solids 52 are discharged from the DCSG through pressure chambers 50 and 51, in order to reduce the pressure to atmospheric. Heat exchanger 49 can be used to recover heat from the discharged solids. The solid lean gas flow 44 is treated in vessel 40, where the solid remnants are scrubbed from the gas flow. The liquid water in vessel 40 is saturated so that additional steam is continually generated. Make-up water 41 is added to vessel 40 to generate a saturated stream of solid—free syngas and steam 39. The make-up water can include the HLS (Hot Lime Softening) sludge from the OTSG water treatment 24. The heat and water is fully recovered from the saturated stream 39 in vessel 37. This is done through direct contact between the treated water 25 and the up-flow saturated gas 39 in vessel 37. The steam is converted to water and washed from the syngas, generating cooler and dryer syngas 36 and hot water 28. The water 28 pumped from the liquid sump 38 located at the bottom of vessel 37. The sump liquid water 38 can be internally circulated as shown in vessel 40. The liquid water 28 can be used in the OTSG 20 to generate 80% steam. To avoid direct use of the water that recovers the heat from the syngas in the OTSG, a heat exchanger can be added (not shown). The syngas is treated using various commercially—available methods in facility 35. Sulfur, mainly H2S, can be removed from the syngas. Hydrogen can be generated, for use in sweetening the produced oil. The sweet syngas 34, composed mainly of CO, may be used to replace natural gas as the fuel source in the OTSG 20 and steam boiler 12 or in the OTSG 20 as the fuel 22, possibly with make-up natural gas and combust with oxidizer 23 like air to generate steam. It can also be used to generate electricity and steam in a co-generation facility (not shown).

Figure 11:
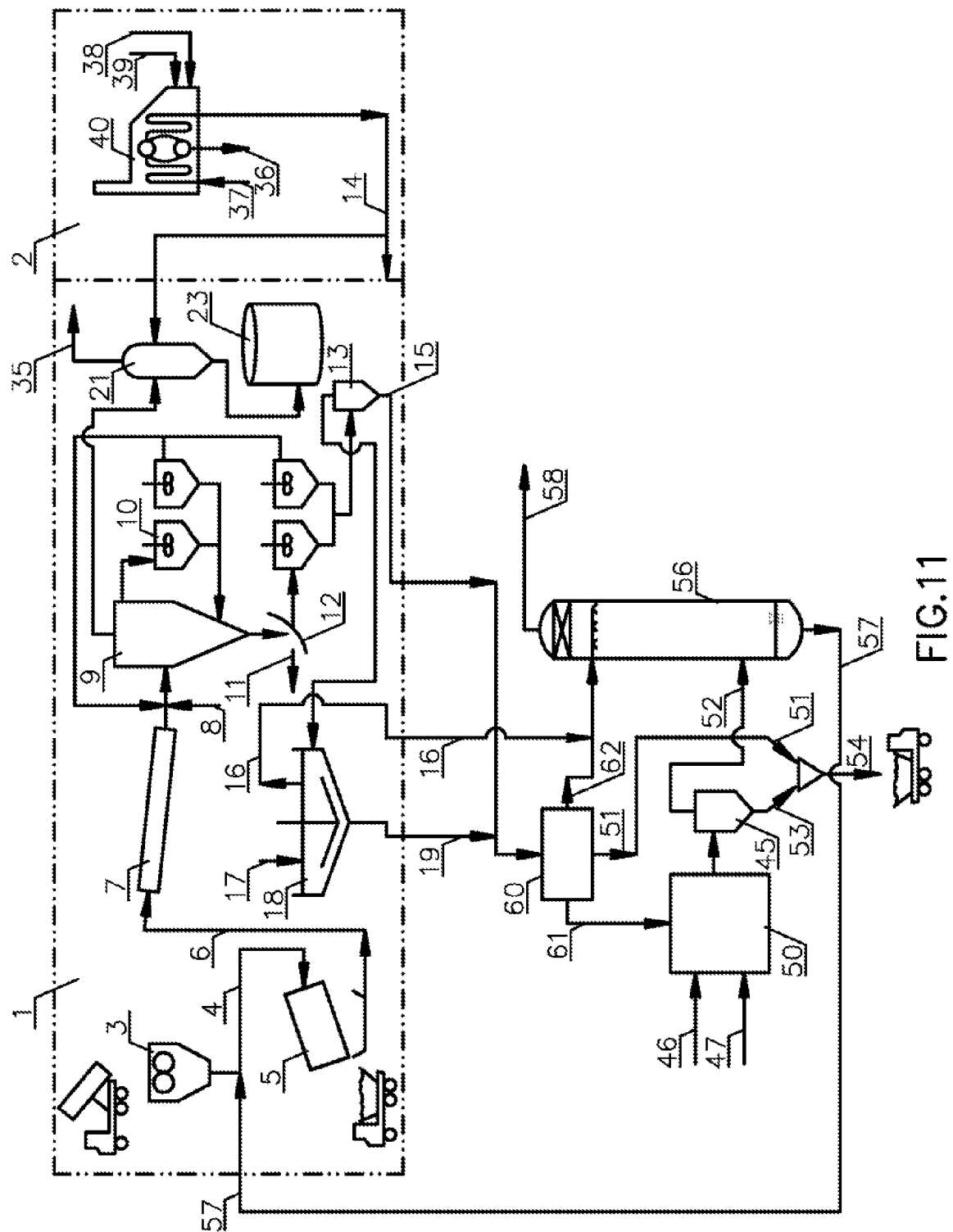
FIG. 11 is a schematic view of the present invention with an open mine oilsand extraction facility, where the hot process water for the ore preparation is generated by recovering the heat and condensing the steam generated from the fine tailings and the combustion gases without the use of a tailing pond.

FIG. 11 is a schematic of the invention with an open mine oilsand extraction facility, where the hot process water for the ore preparation is generated by recovering the heat and condensing the steam generated from the fine tailings and the combustion gases without the use of a tailing pond. A typical mine and extraction facility is briefly described in block diagram 1. Mined Oil sand feed is transferred in trucks to an ore preparation facility, where it is crushed in a semi-mobile crusher 3. After crushing 4 it is also mixed with hot water 57 in a rotary breaker 5. Oversized particles are rejected and removed to landfill. The ore mix goes through slurry conditioning, where it is pumped through a special pipeline 7. Chemicals and air are added to the ore slurry 8. In the invention, the NCGs (Non Condensed Gas) 58 that are released under pressure from tower 56 can replace the injected air at 8 to generate aerated slurry flow, or its compression energy can be recovered (by an expander) to compress air that can be used at 8. The conditioned aerated slurry flow is fed into the bitumen extraction facility, where it is injected into a Primary Separation Cell 9. To improve the separation, the slurry is recycled through floatation cells 10. Oversized particles 11 are removed through a screen 12 in the bottom of the separation cell. From the flotation cells, the coarse and fine tailings are separated in separator 13. The fine tailings flow to thickener 18. To improve the separation in the thickener, flocculant is added 17. Recycled water 16 is recovered from the thickener and fine tailings are removed from the bottom of thickener 18. The froth is removed from the Primary Separation Cell 9 to vessel 21. In this vessel, steam 14 is injected to remove air and gas 35 from the froth. The recovered froth is maintained in a Froth Storage Tank 23. The steam is generated in block diagram 2. It can be produced in a standard high pressure steam boiler 40, in OTSG, or by a COGEN, using the elevated temperature in a gas turbine tail (not shown). The boiler consumes fuel gas 38, air 39 and treated BFW 37. It produces blow-down water 36 that can be added to the process water or disposed in the tailing pond. The coarse tailings 15 and the fine tailings 19 are removed and sent to tailing processing area 60. The fine and coarse tailings can be combined or removed and sent separately (not shown) to the tailing process area 60. In unit 60, the sand and other large solid particles are removed and then put back into the mine, or stored in stock-piles. Liquid flow is separated into 3 different flows, mostly differing in their solids concentration. A relatively solids—free flow 62 is heated. This flow is used as heated process water 57 in the ore preparation facility, for generation of the oilsand slurry 6. The fine tailings stream can be separated into two sub streams. The most concentrated fine tailings 51 are mixed with dry solids, generated by the DCSG, to generate a solid and stable substrate material that can be put back into the mine and used to support traffic. The medium concentrated fine tailing stream 61 flows to DCSG facility 50. Fuel 46 and oxidizing gas 47 are used in the facility to generate a hot combustion gas. The combustion can be a full or partial combustion (like in a gasifier). Some of the combustion energy in facility 50 can be used to generate "standard" steam in a heat exchanger (like in a boiler or gasifier with a radiation heat exchange section). The discharged combustion gas energy is used to convert the fine tailing 61 water into a dry or semi dry solid and gas stream. The fine tailings 61 maintain the heat of the tailing streams 19 and 15 produced in the extraction plant 1. The tailings supplied to the DCSG facility 50 can be pre-heated. The combustion heat can also be used to generate steam to convert the fine tailing water 61 into a dry or semi dry sold and gas stream. The temperature of the discharged solid—rich gas can vary from 150 C to 400 C. The solids are separated from the gas stream in any commercially available facility 45 which can include: cyclone separators, centrifugal separators, mesh separators, electrostatic separators or other combination technologies. The solids lean gas 52 flows into tower 56. The gas flows up into the tower, possibly through a set of trays, while the solid carried-on remnants are scrubbed from the up flowing gas through direct contact with liquid water. The water vapor that was generated from heating the fine tailing in the DCSG is condensed and is added to the down-flowing extraction water process 57. The presence of small amounts of remaining solids in the hot process water can be acceptable. That is because the hot water is mixed with the crushed oilsand 3 in the breaker during ore preparation. The temperature of the discharged hot water 57 is between 70 C and 95 C, typically in the 80 C-90 C range. The hot water is supplied to the ore preparation facility. The separated dry solids from the DCSG are mixed with the concentrated slurry flow from the tailing water separation facility 60. They are used to generate a stable solid waste that can be returned to the oilsand mine. Any commercially available mixing method can be used in the process: a rotating mixer, a Z type mixer, a screw mixer, an extruder or any other commercially available mixer. The slurry 51 can be pumped to the mixing location, while the dry solids can be transported pneumatically to the mixing location After mixture a stable dust free solid material 54 that can support traffic is generated. The NCG (Non Condensed Gases) 58 that were not condensed by the process water, are discharged from the top of the tower 56. It replaces the air and can be injected into the slurry at 8 for aeration. It can also be expanded on a turbo expander to recover excess energy. Furthermore, it can be treated to remove gas fractions (for example, recover CO2 for EOR or sequestration). Otherwise it can just be released to the atmosphere. The described arrangement, where the fine tailings are separated into two streams 61 and 51, is intended to maximize the potential of the process to recover MFT. It is meant to maximize the conversion of fine tailings into solid waste for each unit weight of the supplied fuel source. The system can work in the manner described for tailing pond water recovery. The tailing pond water is condensed into hot water generation 57, without the combination of the dry solids 53 and tailing slurry 51. The generated dry solids 53 are a "water starving" dry material. As such, they are effective in the process of drying MFT (Mature Fine Tailing), to generate trafficable solid material without relying on weather conditions to dry excess water. The water affinity of the dry solid composite released from the DCSG 50 is dependent on its composition and particle size. The most effective water affinity material is a solid that, with the presence of water, creates crystals with water molecules (also called hydration). Gypsum (that contains calcium sulfite and calcium sulfate) belongs to this group of materials. If a highly sulfurous material fuel is used in the DCSG (like petcoke), lime can be added to remove the SO2 and generate gypsum. The gypsum will lose its crystal water when it is subjected to the high temperatures inside the DCSG, as its water will be converted to steam. Some tailing water might naturally contain additional minerals (in additional to the generated gypsum) that belong to this group of materials. Such minerals can include calcium silicate, calcium aluminate and kaolin. When subjected to heat, the kaolin will naturally release its crystal water in the form of steam and transferred into metakaoline. This hydration water affinity will improve the ability of the dry discharged solids to solidify MFT slurry to a stage where it can carry traffic.

Figure 11A:
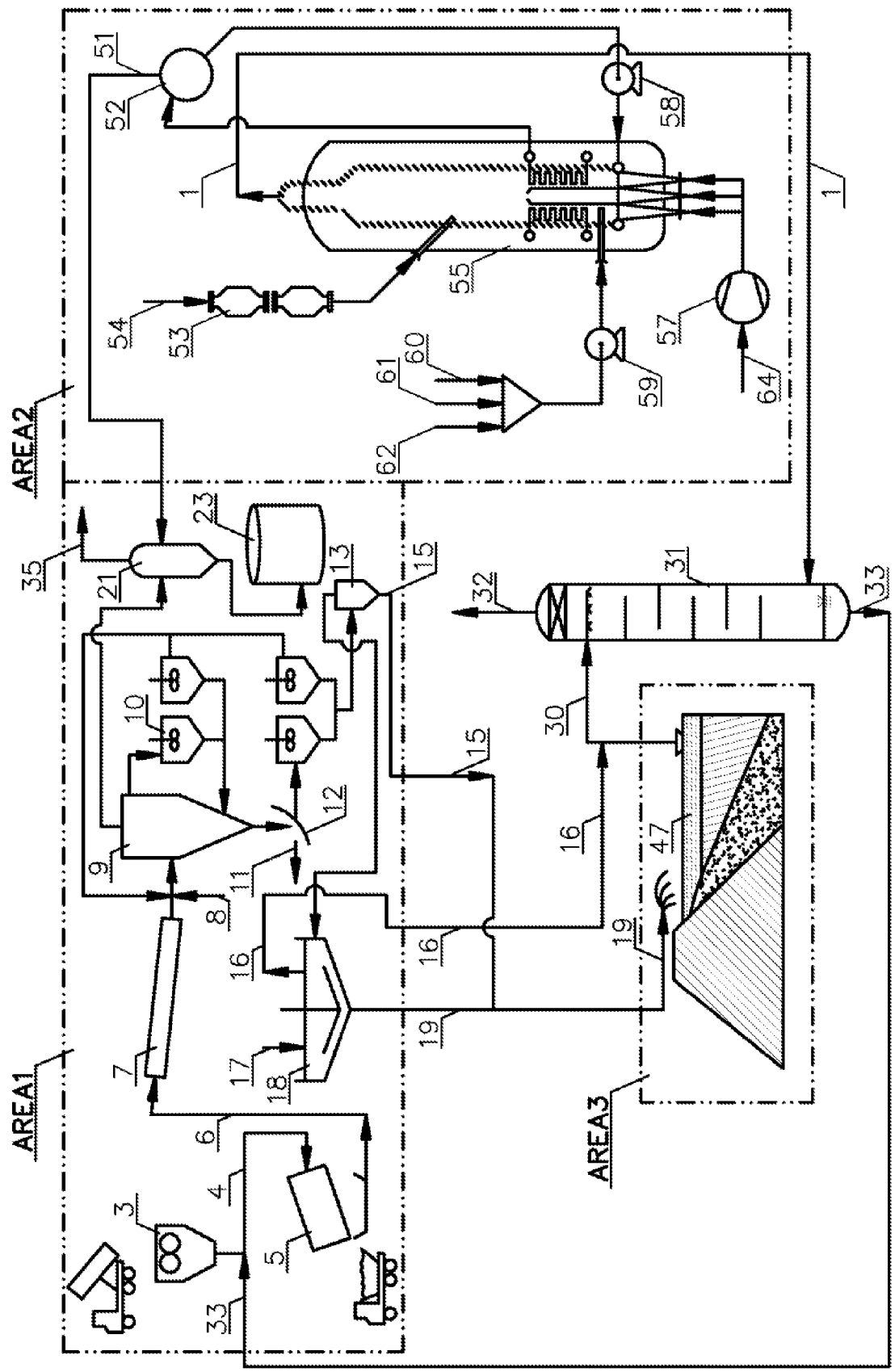
FIG. 11A is a schematic view of integrating a pressurized boiler with an oilsands mine for heating the ore preparation process water in a direct contact with the combustion gases.

FIG. 11A describes a system and method for generating hot process water through a direct contact heat transfer with boiler combustion gas. The use of a DCSG is required if FT removal in solid form is advantageous. If there is no requirement to remove the FT/MFT (like in the case where other reclamation methods to resolve the MFT problem will prove to be effective, cost-effective and accepted by the regulators), then a simplified method and system, without the use of DCSG, as described in FIG. 11A, can be used with a few significant advantages. The main advantage of such a facility, compared to prior art methods for production of hot water for oilsand bitumen extraction are: The overall thermal efficiency in the system described in FIG. 11A is higher in comparison to the prior art used in the oilsand mine facilities (that includes boiler systems generating steam to heat the process water). The high efficiency will result in a reduction in the amount of $CO_2$ generated. Another advantage is the use of a solid low grade fuel like petcoke and coal, instead of clean, valuable natural gas. Another advantage is the simplification of the scrubbing system. This is an advantage as compared to boiler systems that operate on a sulfur rich solid fuel like petcoke and coal for generating steam with in-direct heat exchangers, as used in power plants, for example. The discharged combustion gas should be treated to remove $SO_2$ remains and solid particles (fling ash) before releasing it to the atmosphere. In power plants, this is done using lime stone, possibly with the fuel or after the combustion as a means to scrub the $SO_2$, and with bag filters and electric static precipitators after the cyclone separators in order to remove the dust to bring it to acceptable levels. In the present facility, there will be no need to use extensive scrubbers and filters beyond maybe a basic cyclone separator, as the process water used for the oilsand extraction will wash the combustion from the traces of $SO_2$ gas and the small solid particles. The small amount of solids, like fly ash, will not have any significant negative impact on the process water. The pH might be affected by small traces of acid gas and can be adjusted as part of the extraction process with additional alkaline material. Because the process waters are much less sensitive to contamination than the environment (as they are mixed with dirty oilsand ore) the scrubbing system will be minimal, if it exists at all, with an associated low cost compared to a scrubbing system for releasing combustion gases to the environment. The process includes crushing fuel 60, like petcoke, together with lime stone 61 and water 62 to generate a pumpable slurry 59 (Some limited amount of tailing water, like MFT, can be consumed as the water 62 for generating the boiler fuel slurry; mixing the fuel slurry together with compressed air 57 that is generated by compressing atmospheric air 64; combusting the mixture under pressure to generate pressurized combustion gas 1 and heat (the combustion can be performed in a fluidized bed where the compressed air 57 is supplied from the bottom as described in FIG. 11A); additional solid fuel 54 can be added to the combustion chamber 55 through compression/decompression fuel feeding system 53; recovering at least a portion of the combustion heat through a heat exchanger inside the boiler 55 to generate steam 51, the high pressure steam is recovered from steam drum/steam separator 52. The boiler can be a forced circulation design with a recycle water pump 58 or natural circulation without pump 58. Boiler feed water is added to the water feed to the boiler heat exchanger to replace the generated steam 51. The generated steam 51 is used in AREA 1 or for any other use; directing a stream of a cool process water 30, possibly from the upper layer of a tailing pond 47 or from any other available water source 16, and mixing the process water with the pressurized combustion gas 1 to recover the combustion gas heat while heating the process water 33; directing the hot process water 33 to the oilsand extraction facility (AREA 1) and mixing it with oilsand ore 3 to generate slurry 6; and separating the water and solids (16 and 19) from the bitumen 23. The solids generated by the pressurized boiler resulting from the supplied fuel and the lime stone (or dolomite) supplied to the combustor, can be removed and mixed with MFT to accelerate its stabilization (as shown in FIG. 13). If required, an additional solid separation unit can be added to separate solids from the pressurized combustion gas 1 (not shown). The combustion gas 1 can be replaced by steam. The facility in AREA 2 can be any commercially available Pressurized Boiler that generates high pressure steam and pressurized combustion gases. Examples for pressurized boilers are the Pressurized Internally Circulating Fluidized-bed Boiler (PICFB) developed by Ebara, and the Pressurized-Fluid—Bed-Combustion-Boiler (PFBC) developed by Babcock-Hitachi. Any other pressurized combustion boiler that can combust petcoke or coal can be used as well. The oilsand mine and extraction facility in AREA 1 including its characters is a prior art facility described in FIG. 11. AREA 3 includes a tailing pond (see FIG. 12). As described in FIG. 13, some relatively small amounts of MFT (in comparison to the MFT amounts that are consumed by the DCSG, as described in the other examples) can be dried and stabilized with the use of the combustion solids removed from the boiler and from the combustion gases (not shown). The cold process water is heated by direct contact with up-flow combustion gas in a pressurized vertical vessel 31, which can include internal trays. These types of vessels are widely commercially available. The pressurized cold and clean pressurized combustion gas 32 (after it was scrubbed by the process water) can be released to the atmosphere, or used in the extraction process, or for generating energy through a turbo expander, or to recover the $CO_2$ with a commercially available membrane gas separation facility (not shown).

Figure 12:
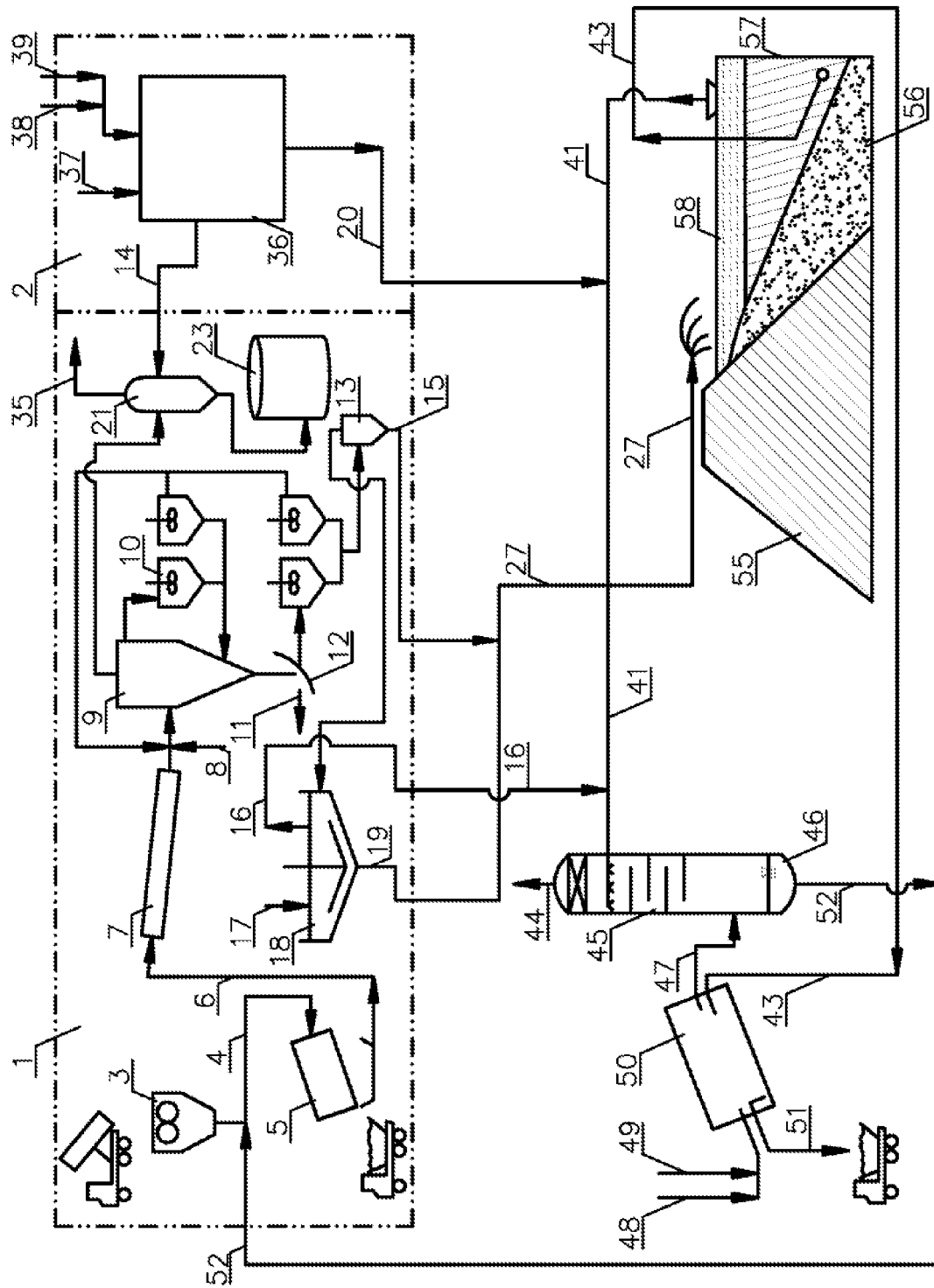
FIG. 12 is a schematic view of the present invention with an open mine oilsand extraction facility, where the hot process water for the ore preparation is generated from condensing the steam produced from fine tailings.
Figure 13:
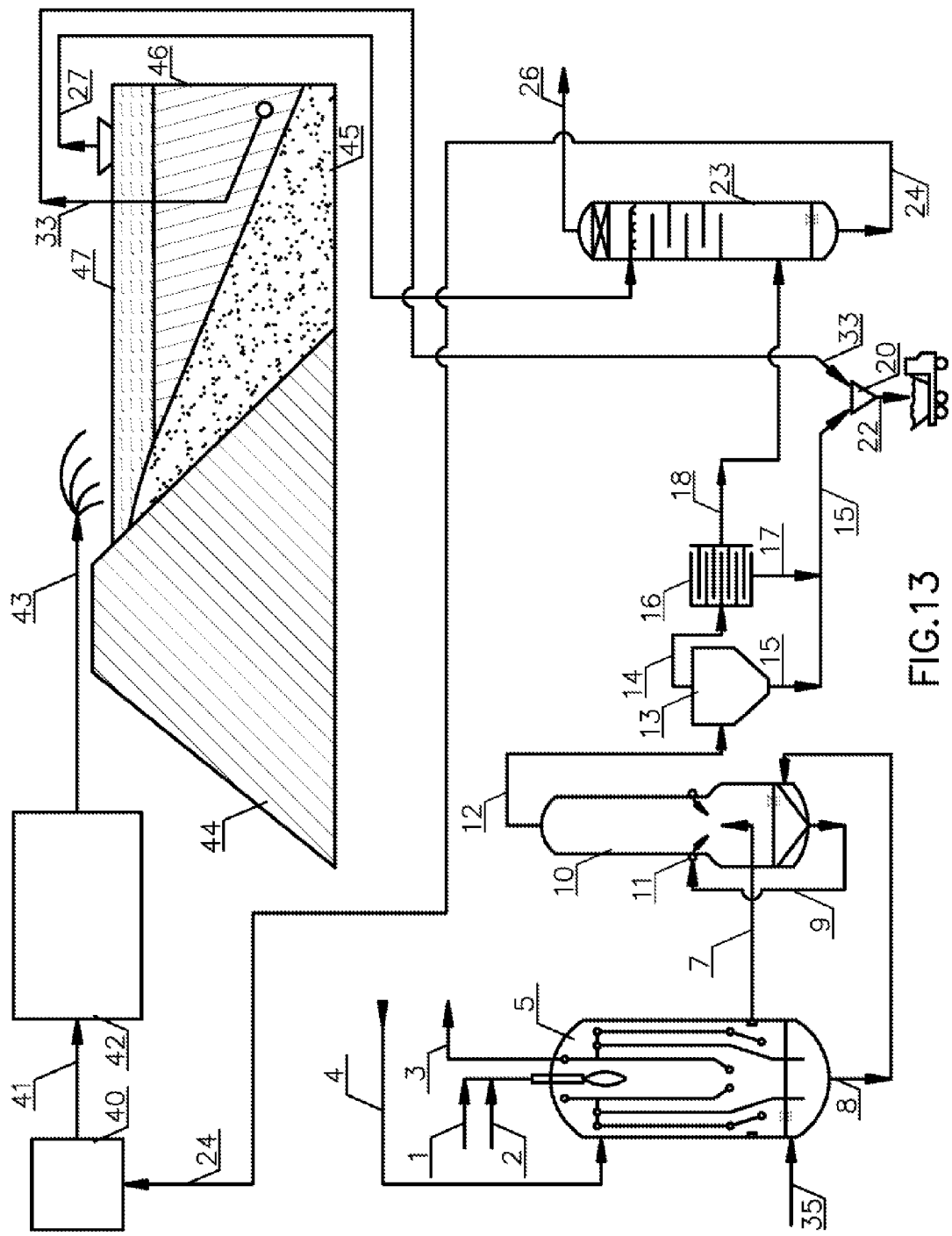
FIG. 13 is a schematic view of a gasifier unit and an open mine oilsand extraction facility, where the hot process water is heated in direct contact with the syngas.

FIG. 12 is a schematic of the invention with an open mine oilsand extraction facility, where the hot process water for the ore preparation is generated from condensing the steam produced from the fine tailings. As in FIG. 11, a typical mine and extraction facility is briefly described in block diagram 1 including its characters as previously described in FIG. 11. The tailing water 27 from the oilsand mine facility 1 is disposed of in a tailing pond. The tailing ponds are built in such a way that the sand tailings are used to build the containment areas for the fine tailings. The tailing sources come from Extraction Process. They include the cyclone underflow tailings 13, mainly coarse tailings and the fine tailings from the thickener 18, where flocculants are added to enhance the solid settling and recycling of warm water. Another source of fine tailings is the Froth Treatment Tailings, where the tailings are discarded using the solvent recovery process—characterized by high fines content, relatively high asphaltene content, and residual solvent. A sand dyke 55 contains a tailing pond. The sand separates from the tailings and generates a sand beach 56. Fine tailings 57 are put above the sand beach at the middle-low section of the tailing pond. Some fine tailings are trapped in the sand beach 56. On top of the fine tailing is the recycled water layer 58. The tailing concentration increases with depth. Close to the bottom of the tailing layer are the MFT (Mature Fine Tailings). The recycled water 41 is pumped from a location close to the surface of the tailing pond (typically from a floating barge). Clean process water from the extraction facility in area 1, like the solids lean water 16 from thickener 18 can be added to recycled water 43. The fine tailings that are used for generating steam and solid waste in my invention are the MFT. They are pumped from the deep areas of the fine tailings 43. Fuel 48 and oxidizing gas 49 are injected into a DCSG. MFT 43 is pumped from the lower section of the tailing pond and is then directed to the DCSG 50. The MFT 43 can be pre-heated prior to its injection to the DCSG 50. The DCSG described in FIG. 12 is a horizontal, counter flow rotating DCSG. However, any available DCSG that can generate gas and solids from the MFT can be used as well. Due to the heat and pressure inside the DCSG, the MFT turns into gas and solids as the water is converted to steam 47. As described in other figures the heat and water in the produced steam flow 47 recovered in vessel 45 where the heated recycled and condensate water 46 is used as the hot extraction water 52 in extraction facility 1. The Non Condense Gas 44 is discharged for other usages or released to the atmosphere. The solids are recovered in a dry form or in a semi-dry, semi-solid slurry form 51. The semi-dry slurry form is stable enough to be sent back into the oilsand mine without the need for further drying to support traffic. The produced steam 14, needed for extraction and froth treatment, is generated by a standard steam generation facility 36 from BFW 37, fuel gas 38 and air 39. The blow-down water 20 can be recycled into the process water 20. By continually consuming the fine tailing water 43, the oil sand mine facility can use a much smaller tailing pond as a means of separating the recycled water from the fine tailings. This smaller recyclable tailing pond is cost effective, and it is the simplest way to do so as it does not involve any moving parts (in contrast to the centrifuge or to thickening facilities). This solution will allow for the creation of a sustainable, fully recyclable water solution for the open mine oilsand facilities.

FIG. 12A shows the integration of a parallel flow DCSG with a direct contact process water heater and with solid discharge force oxidation. Fuel 76, like petcoke, that includes high levels of sulfur, is injected with oxidizing air 75 into a parallel flow DCSG. Low quality water that can include large percentage of organics 77 is injected into the DCSG. MFT 43 from deep 57 in the tailing pond is also injected to the DCSG. The DCSG includes Direct Contact heat transfer section, with chains that improve the heat transfer and break solid deposits inside the reactor. The DCSG pressure is in the range of 103 kpa-5,000 kpa. The solids are discharged by a screw as a semi-solid, concentrated material. Lime Stone is added to the DCSG water feed (77 and 43) to react with the generated SO2. The generated Calcium Sulfite will be forced to oxidize with air 78 and water to generate gypsum at mixer 710. Possible mixers types that can be used were mentioned in FIG. 11. Screw conveyor 710 with air supply 78 can be used as well. If required, more water can be added in the form of MFT 43. The hot discharged solids 718 leaving the DCSG are mixed with air 78 and possibly additional MFT 79. Due to the solids heat additional water can be removed in the form of vapor. The discharged solids will be stable enough to support traffic. The combustion gas and steam 717 will be mixed in direct contact heat exchange 45 with the process water 41 which can be supplied from the tailing pond 58 or from the operating oilsand facility 50 that creates the tailings 27 and include the course tailings 56 that can be used as the tailing pond dyke 55. The hot process water 46, that includes the condensed water from the MFT is separated from the NCG 44 and supplied 52 to the oilsand plant for mixing with the oilsand ore.

FIG. 13 is a schematic of gasifier unit and an open mine oilsand extraction facility, where the hot process water is heated in direct contact with the syngas. In this figure, the MFT 33 is not converted into steam and solids, but is mixed with the dry solids generated by the system 15. Gasifier 5, with a water quenching bath at its bottom, generates HP (High Pressure) steam 3 from BFW 4 that is supplied from water treatment plant (not shown). The gasifier generates syngas from partial combustion of low grade fuel, like petcoke or coal 1 with oxidizing gas 2. The hot syngas is mixed with water in an up-flow direct contact steam generator 10 Make-up water 35 is added to the gasifier sump. Solids contaminated water 8 removed from the bottom of the gasifier sump. The hot combustion gas 7 flows to the DCSG 10 where contaminated water 9 are sprayed 11 to the up flow hot gas 7. The dry solid particles are removed from the gas flow 12 with a cyclone 13 separator and after first separation 14 to electrostatic 16 separator or with any commercial separation package 16. The solid lean syngas stream 18 flows to vessel 23, where it is mixed in direct contact with cold extraction water 27 to heat the water to 80 C-90 C. It is also possible to use the configurations described in FIGS. 3, 3A and 3B to heat the extraction water 27. The hot process water 24 is used in the ore preparation facility 40 to produce slurry 41. The slurry 41 is used in the oilsand separation and processing facility 42 to produce the bitumen product and tailings flow 43. The scrubbed cold syngas 26 is recovered for other usages. The dry solids 15 and 17, generated by gasifier 5, are mixed in mixture 20 with MFT 33 which is pumped from the tailing pond 46 to generate a stable material 22 that can be used to support traffic. The tailing pond is described in FIG. 12 and includes a dyke 44, course tailings deposit 45, recycled water 47 and MFT 46. In the process, water from the MFT is not recovered, or used to generate steam or hot process water. This arrangement is less effective in recovering MFT, but easier to implement. It can only be implemented if removal and reclamation of MFT will be done using other methods, and not with DCSG.

Figure 14:
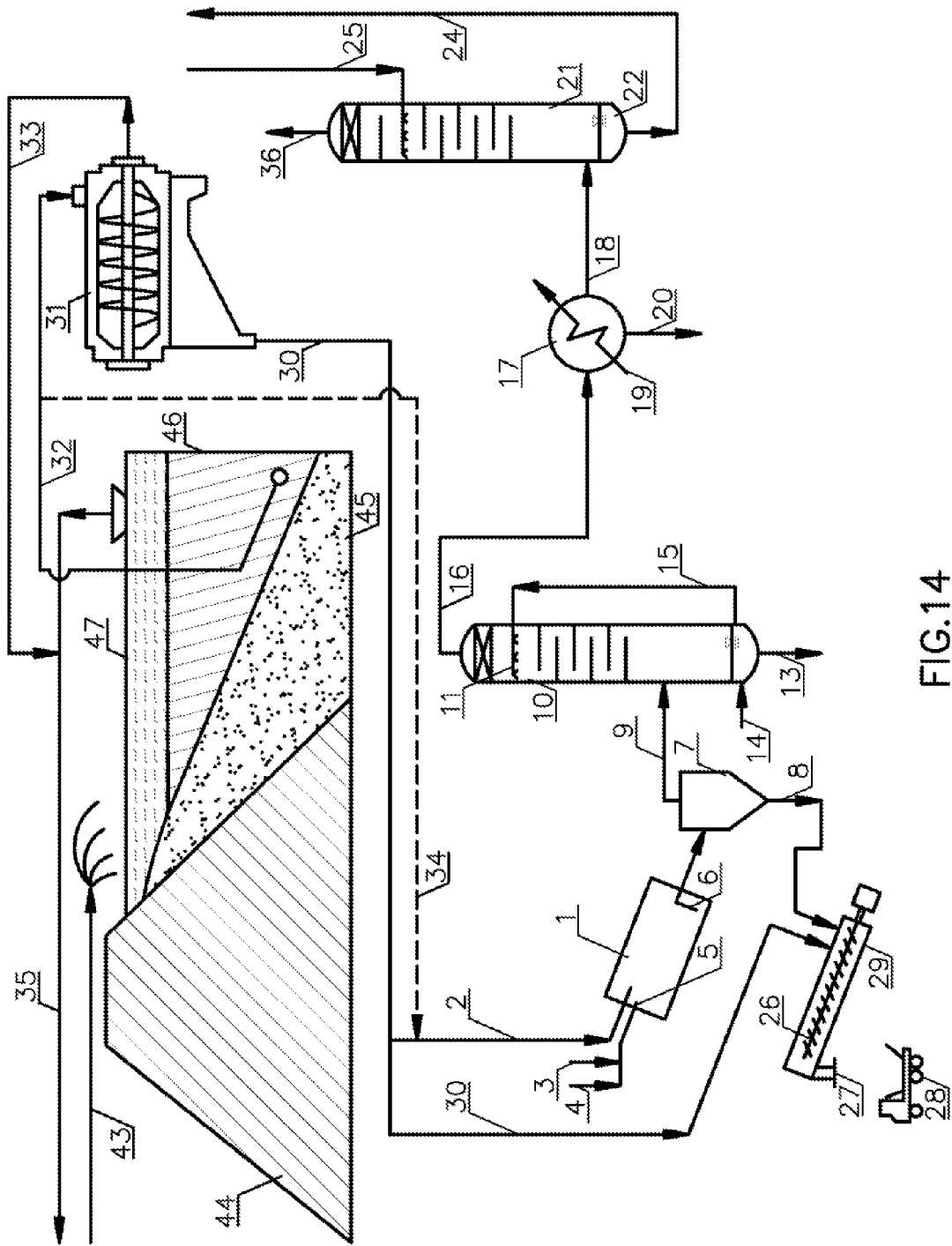
FIG. 14 is another schematic view of the present invention with an open mine oilsand extraction facility, where the hot process water for the ore preparation is generated from condensing the steam produced from fine tailings.

FIG. 14 is a schematic of the invention with open mine oilsand extraction facility, where the hot process water for the ore preparation is generated from condensing the steam generated from the fine tailings. The tailing water from the oilsand mine facility 43 (not shown) is disposed of in a tailing pond. Fuel 3 (possibly petcoke, coal or asphaltin slurry) and oxidizer 4 (possibly air) are fed into and then combusted 5 inside a horizontal parallel flow DCSG 1. The energy source of the fuel and oxidizer generating hot combustion gas can be replaced with steam. Concentrated MFT 2 is injected into the DCSG as well. The MFT is converted to gas, steam, and solids 6. The solids are removed in a solid gas separator 7 where the solid lean stream 9 is washed in tower 10 by saturated water 15 that are sprayed in the upper section 11. In the tower, the solids are washed out and then removed 13. SO2 can be removed from the saturated water using lime. The solid rich discharge flow 13 can be recycled back to the DCSG or to the tailing pond for disposal. Heat is recovered from saturated gas 16. The amount of heat recovery is limited in order to maintain heat exchanger 17 at a reasonable size. Steam is condensed to water 20. The recovered heat 19 can be used for pre-heating the MFT, BFW (not shown) or for use in any other process. The condensed water 20 can be used as hot process water and can be added to the flow 24. The remaining heat in flow 18 is recovered and the water vapor is washed. It condenses to liquid water 22 in vessel 21 because of direct contact with cold process water 25. The NCG 36 can be used as part of the process for slurry aeration or for reducing the pH in the tailing water (not shown). If large size heat exchanger 17 is used it will be possible to avoid the direct contact heat exchanger 21 as described in FIG. 3B. The fine tailings 32 are pumped from the tailing pond and separated into two flows by a centrifugal process 14. This unit separates the fine tailings into two components: solid rich 30 and solid lean 33 flow. The centrifuge unit is commercially available and was tested successfully in two field pilots. Other processes, like thickening the MFT with chemical polymer flocculent, can be used as well instead of the centrifuge. The solid lean flow can contain less than 1% solids. The solid rich flow is a thick slurry ("cake") that contains more than 60% solids. The solid lean flow is recycled back to a settling basin (not shown) and eventually used as process water 35. The solid concentration is not dry enough to be disposed of efficiently and to support traffic. This can be solved (shown in my invention) by mixing it with the "water starving" material (virtually dry solids generated by the DCSG), possibly with calcium sulfite and calcium sulfate. Mixing of the dry solids and the thick slurry can be achieved through many commercially available methods, as mentioned in FIG. 11. In this particular figure, the mixture is done by a screw conveyor 29 where the slurry 30 and the dry material 8 are added to the bottom of a screw conveyor, mixed by the rotating auger 26, and then the stable solids are loaded on a truck 28 for disposal. The produced solid material 27 can be backfilled into the oilsand mine excavation site and then used to support traffic. In this particular figure, there are two options for supplying the fine tailing water to the DCSG: one is to supply the solid rich thick slurry 30 from the centrifuge or thickening unit 31. The other is to provide the "conventional" MFT 34, typically with 30% solids, pumped from the settlement pond. Feeding the MFT "as is" to the DCSG eliminates the TIC, operation, and maintenance costs for a centrifuge or thickening facility. For option 1, the overall amount of recovered MFT will be larger, while the heat efficiency and the amount of heat recovered from each ton of fuel will be smaller (and vice versa for option 2). The tailing pond characters 44, 45, 46 and 47 are described in FIG. 13.

Figure 15:
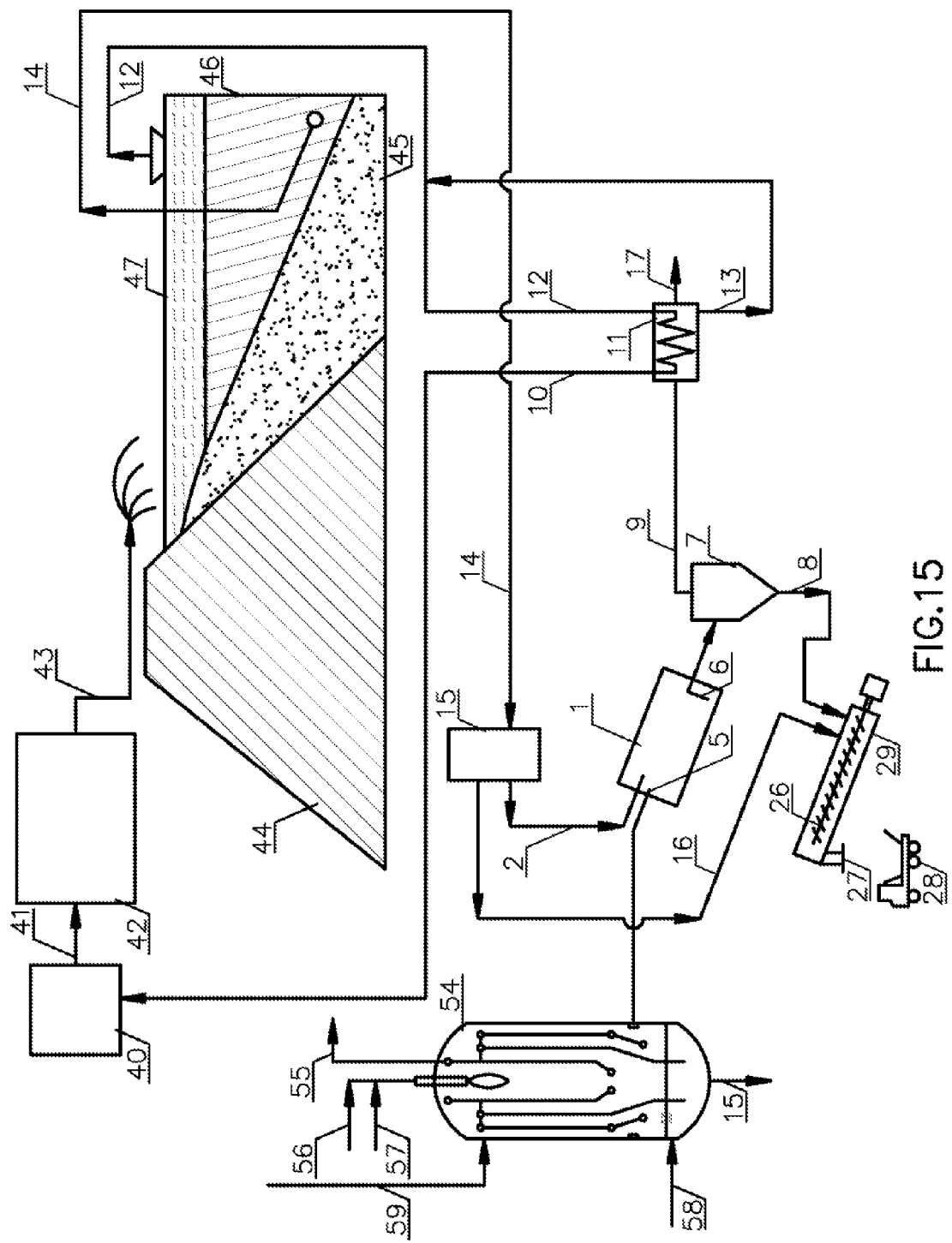
FIG. 15 is a schematic view of the present invention with an open mine oilsand extraction facility, where the heat source is a gasifier with maximization of mature fine tailing recovery.

FIG. 15 is a schematic of the invention with an open mine oilsand extraction facility, where the heat source is a gasifier with maximization of the MFT recovery (in comparison to FIG. 13). The partial combustion takes place inside the gasifier 54. Fuel 56 and oxidizer 57 are injected and combusted in the gasifier. Steam 55 is generated from BFW 59. Contaminates mostly solids are removed from sump in a liquid form 15 for treatment or disposal. Make-up water are added to the sump. The hot syngas 5 flows to the horizontal parallel flow DCSG 1. Concentrated MFT 2 is also injected into the DCSG. The MFT is converted to gas—mainly steam, and solids 6. The solids 8 are removed in a solid gas separator 7. The solid lean stream 9 flows through heat exchanger 11, where it heats the process water or any other process flow 12, indirectly through a heat exchanger to generate hot extraction water 10. Sour condensing water 13 is removed from the bottom for further treatment. The syngas 17 is also treated further. This treatment can include the removal of the H2S in an amine plant. It can also include generating a hydrogen and CO based gas to replace the natural gas (not shown). The fine tailings 14 are pumped from the tailing pond and can then be separated into two flows through a specific separation process. Separation 15 is one option to increase the amount of MFT removal. The process can use natural MFT both at flows 2 and 16. This separation can be based on a centrifuge or on a thickener (like a High Compression Thickener or Chemical Polymer Flocculent based thickener). This unit separates the fine tailings into solid rich 16 and solid lean 2 flows. The solid lean flow 2 possibly after pre-heating is fed into the DCSG 1 where dry solids are generated and removed from the gas-solid separator. The solid rich flow 16 is mixed with the dry solids 8 in a screw conveyor 29. The heat of the solids 8 can dry portion of the water in tailing flow 16 during the mixing 26 to generate a cooled stable material 27 that can be trucked 28 for backfilling the oilsands excavation pit. The tailing pond and extraction characters 40, 41, 42, 43, 44, 45, 46 and 47 described in FIG. 13.

Figure 16:
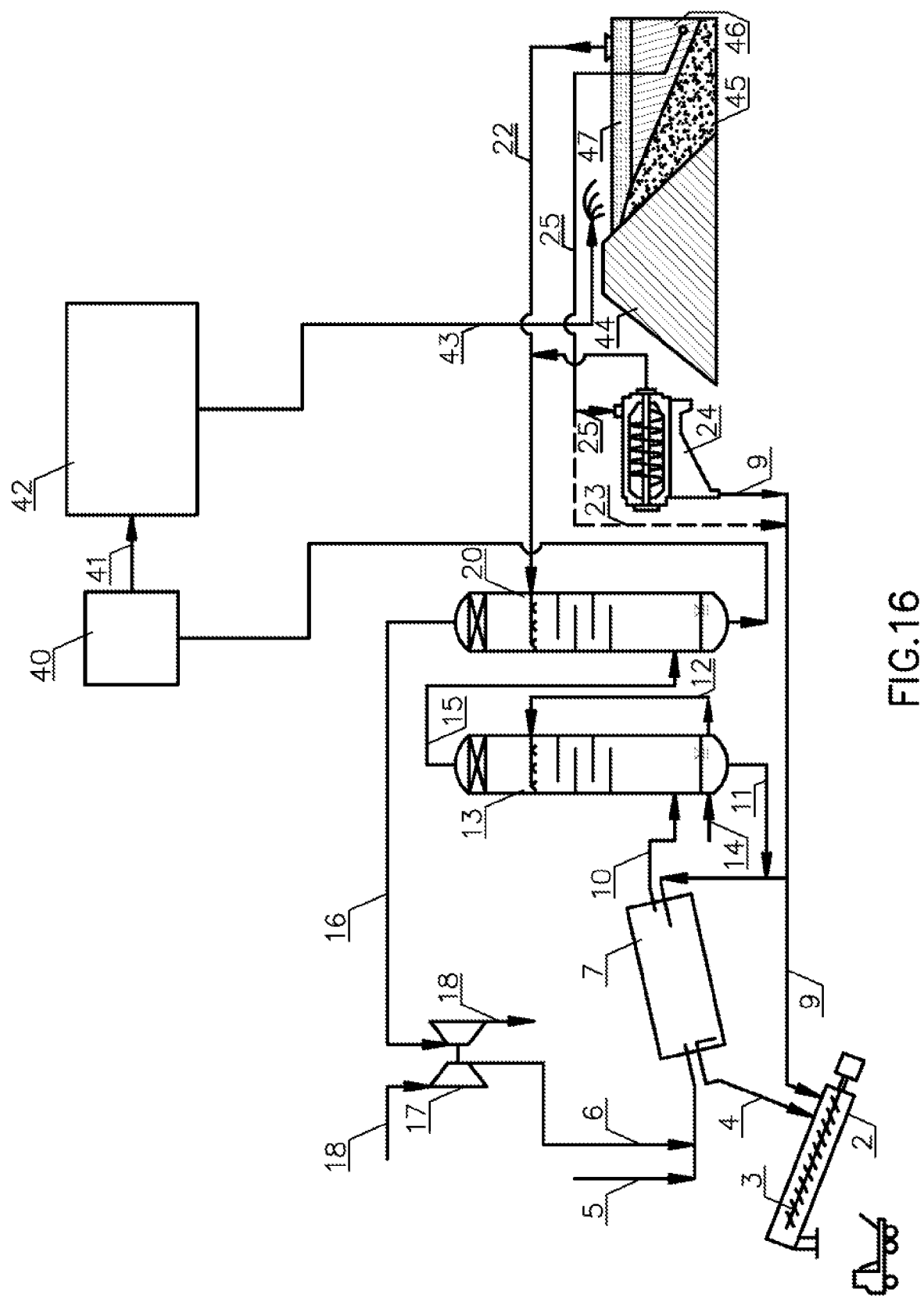
FIG. 16 is a schematic view of the present invention with an open mine oilsand extraction facility, where the hot processed water for the ore preparation is generated from direct contact heat exchange between the process water, the condensing steam generated from the mature fine tailing, and the combustion gas.

FIG. 16 is a schematic of the invention with an open mine oilsand extraction facility, where the hot processed water for the ore preparation is generated from direct contact heat exchange between the process water, the condensing steam generated from the MFT, and the combustion gas. The tailing water from the oilsand mine facility 43 disposed of in a tailing pond. The tailing pond that includes characters 44, 45, 46 and 47 is described in FIGS. 13, 14, 15. Fuel 5 (possibly petcoke, coal, or asphaltin slurry) and air 6 is injected into and then combusted inside a horizontal counter flow DCSG 7. The fuel and oxidizer can be replaced as an energy source by steam.

MFT flow 9 is injected into the DCSG. The MFT is converted to gas—mainly steam, and solids. The solids are directly removed from the DCSG. The solid lean discharge stream 10 is washed in tower 13 by saturated water 12. In the tower, the solids are washed out and removed. SO2 is removed using lime. The solid-rich discharge flow 11, with the generated calcium sulfite and calcium sulfate, is recycled back to the DCSG 7. Make-up water 14 with chemicals additives is added to vessel 13 to replace the discharged water 11 and the water evaporated and converted to gas to generate saturated steam. The steam saturated gas 15 flows to vessel 20, where it is mixed with the cold process water 22 recycled from the tailing pond. The generated hot water is used in ore preparation unit 40. The ore slurry 41 is processed in the oilsands processing plant 42 that includes flotation separation and froth treatment and generate stream of tailings 43 The pressurized NCG 16 from vessel 20 can be used in the process (not shown) or expanded on a turbo expander 17 to recover part of the energy used for compressing the oxidizing air 18. The fine tailings 25 are pumped from the tailing pond. They can be separated into two flows by a centrifuge or thickening process or used in their natural form without any treatment 23. This centrifuge 24 or thickening unit separates the fine tailings into a solid rich flow 9 and a solid lean flow. The centrifuge and thickening units are commercially available. The solid lean flow is recycled back to process water 22. The solid concentrated flow 9 is mixed 3 with the hot dry solids 4 to generate a cooler stable disposal material at 2.

Figure 16A:
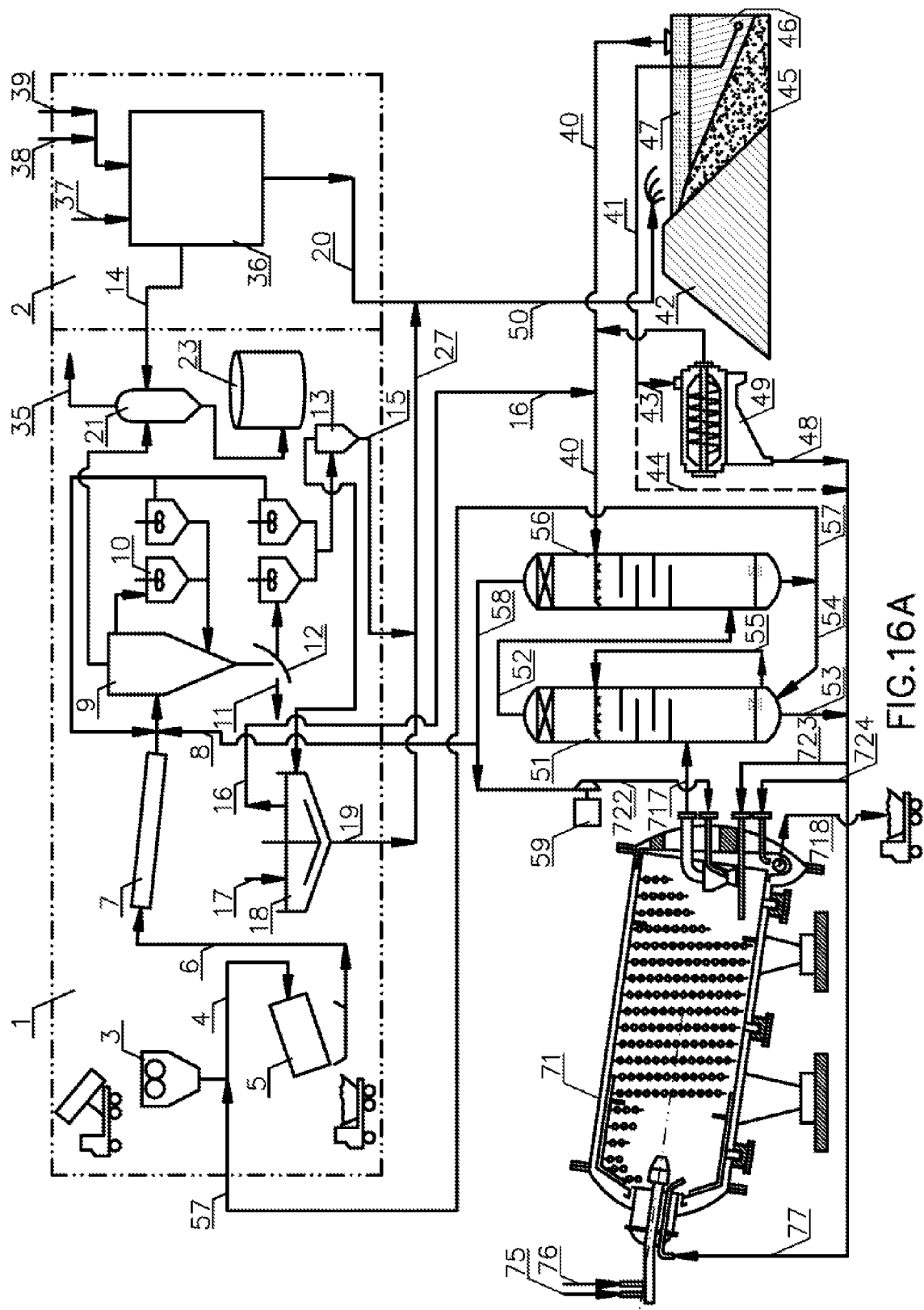
FIG. 16A is a schematic view showing the system of FIG. 16 with a direct contact steam generator.

FIG. 16A is a schematic of the present invention with a parallel flow DCSG. A typical oilsands mine and extraction facility is briefly described in block diagrams 1 and 2. the characters in blocks 1 and 2 that includes 3, 4, 5, 6, 7, 17, 18, 19, 16, 8, 9, 10, 11, 12, 13, 15, 21, 23, 35, 14, 36, 20, 37, 38, 39 and 27 described in FIGS. 11 and 12.

The oilsands plant generates a flow of tailings 50 and cold process water 40. For its operation, the plant mainly consumes the process water after it has been heated-up to 70 C-90 C. The tailing 50 includes a portion of stable FT (Fine Tailings) that will be pumped from the deep locations of the tailing pond. Fuel 76 and oxidation gas 75 are injected into a vertical parallel flow DCSG 71. FT 77 is injected into the DCSG. Chains are used to improve the heat transfer and to remove solids deposits. FT can be injected into the DCSG near the discharge side. FT flow 723 is injected in order to control the discharge temperature, for dust control, and to exactly control the moisture content of the solids discharge. The solids 718 can be removed from the system using a single or double extruder type design or any other controlled way that can mobilize the stable solids. The removed solids are trucked out to be used as re-fill and to support traffic. The DCSG can also include a solid removal cyclone on the steam and combustion gas discharge 717. The discharged gas is washed 55 in vessel 51 to remove SOx, NOx, and any solid remains. Contaminated Blow-down 53 from vessel 51 is removed to maintain controllable contaminates levels within vessel 51. The contaminate scrubber blow-down 53 is injected close to the DCSG discharge 718. Make-up water 54 is continually added to vessel 51, possibly with an alkali chemical like Lime stone slurry to remove the SO2. The generated solids, with the lime stone remains that didn't react with the SO2, are recycled back to the DCSG, together with the FT, where they can complete their reaction with the SO2. The injection of the FT 44, thickened FT 48 and blow-down 53 to the DCSG is done in few locations 77 at the higher end of vessel 71, 723 at the lower end of vessel 71 and 724 close to vessel 71 discharge 718. The make-up water is taken from the hot process water 57. The solids free and SO2 free (traces levels of sulfur oxides will remain even after the two stages of SO2 removal in the DCSG 71 and in the scrubber 51) saturated gas flow 52 will flow to vessel 56 (a counter flow direct contact heat exchanger between the cold process water 40 that is spread at the top of the vessel and the up-flow saturated steam and combustion gas 52). The saturated steam (from the FT) condenses with the process water. The hot process water 57 supplied back to the oilsand extraction plant. The NCG 58 that can include light hydrocarbons is recovered from heat exchanger 56 and is mixed 8 with the oilsands emulation 7. Portion of the NCG 58 can be compressed 59 and recycled back to the DCSG 722 where it can be used to separate solids from the discharged produced steam 717. The tailing pond characters 42, 45, 46 and 47 are described in FIG. 16. Portion 43 from MFT 41 pumped from the tailing pond can be separated 49 to recycled water and thickened tailings 48.

Figure 4:
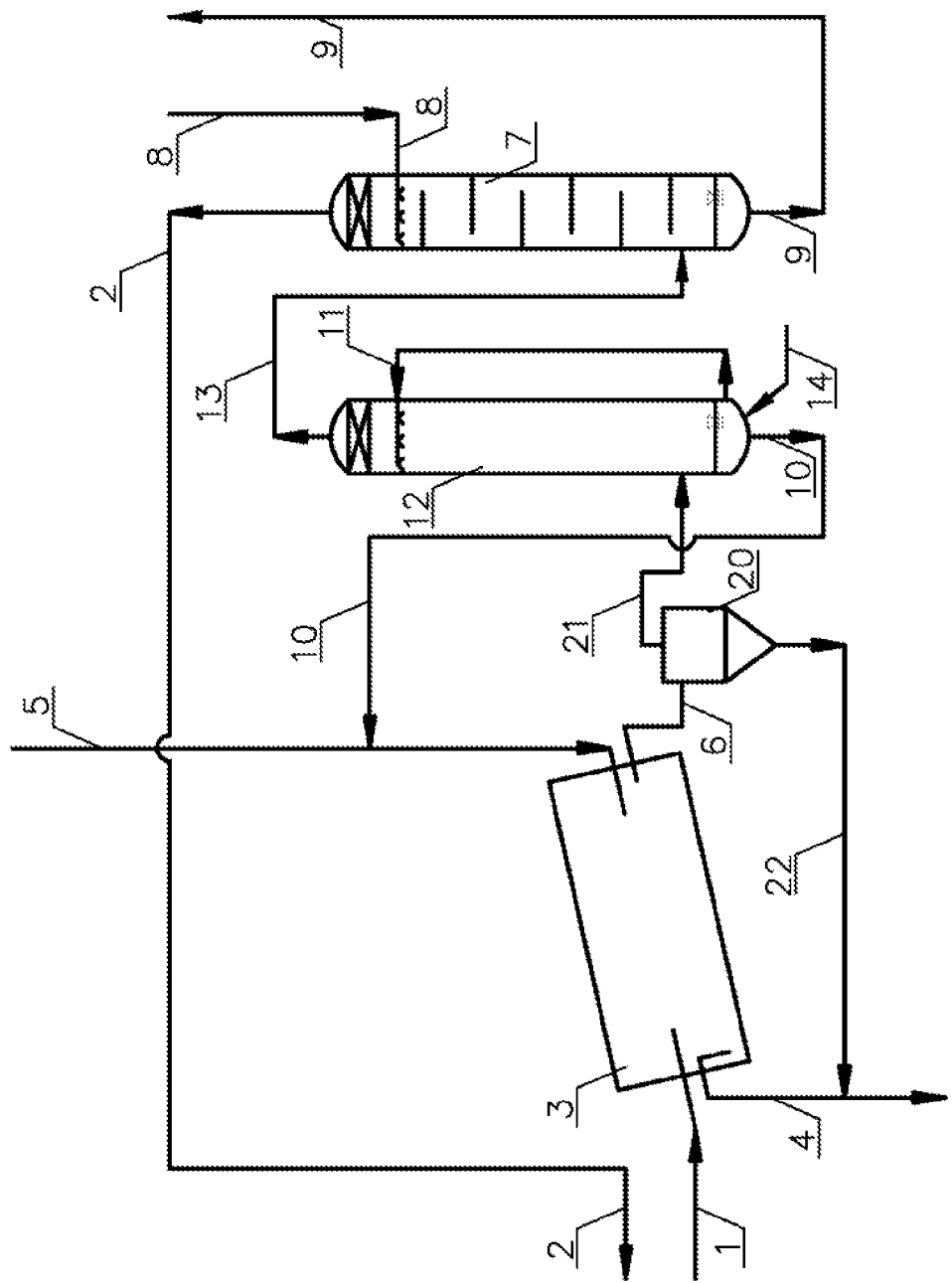
FIG. 4 is a schematic view of an illustration of the current invention without waste water discharge and SO2 removal.
Figure 17:
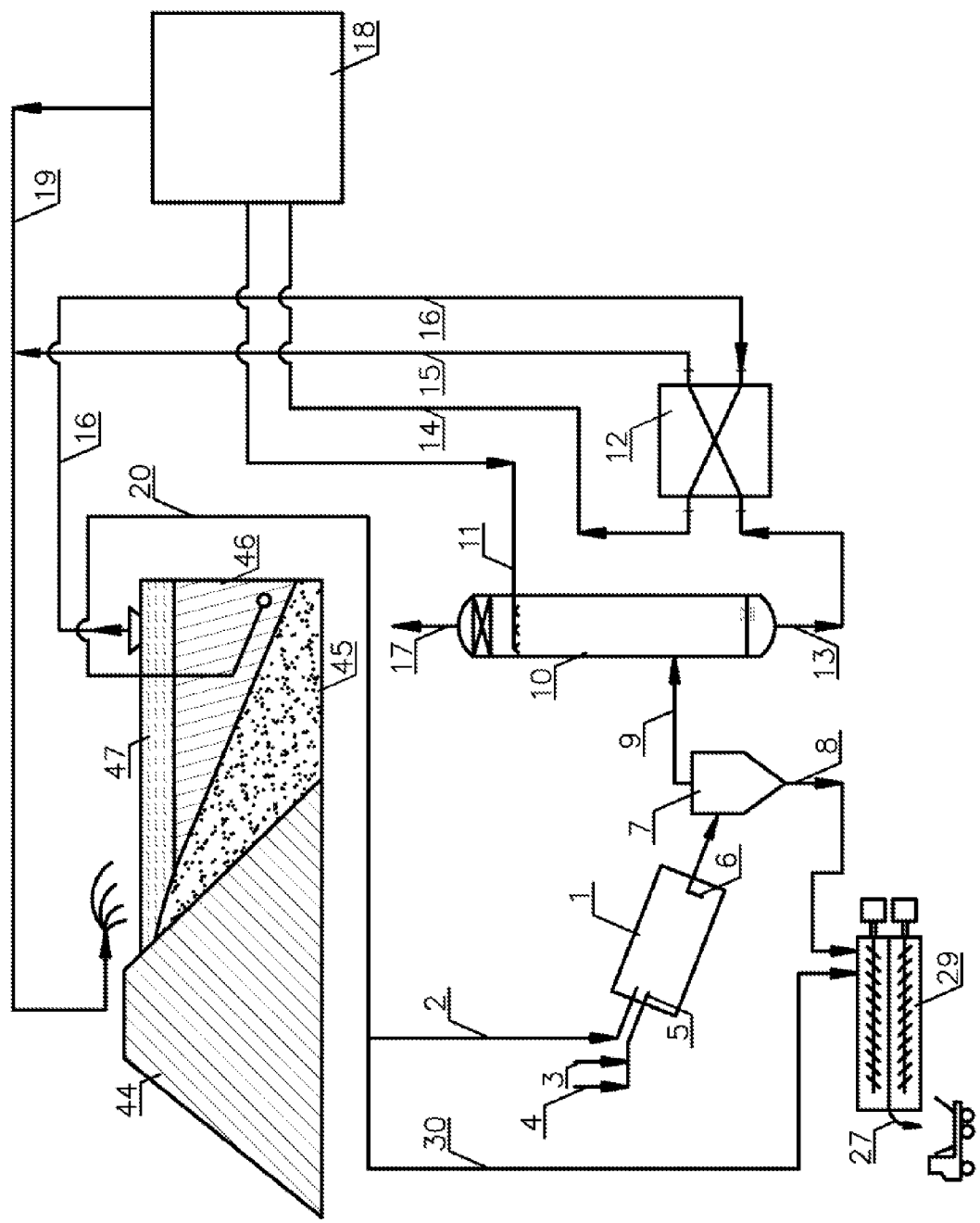
FIG. 17 is a schematic view of the present invention with an open mine oilsand extraction facility, where the hot process water for the ore preparation is generated from condensing the steam generated from the mature fine tailings and from cooling the combustion gas through an indirect heat exchanger.

FIG. 17 is a schematic of the invention with an open mine oilsand extraction facility, where the hot process water for the ore preparation is generated from condensing the steam generated from the MFT and from cooling the combustion gas through an indirect heat exchanger. Fuel 3 and oxidizer 4 are mixed and combusted inside a horizontal parallel flow DCSG 1. It is also possible to inject hot gas 5 into the DCSG. MFT 2 is also injected into the DCSG. The MFT is converted to gas 6, mainly steam, and solids. The injected MFT can include lime stone or HLS sludge from OTSG facilities, like SAGD. The calcium will react with the SO2 to reduce the amount of SO2 in the DCSG discharge. The solids 8 are removed in a solid gas separation 7. The solid lean stream is washed in tower 10 by discharged tailing water 11 from the oilsands extraction facility 18. This tailing water collects the heat from the up-flow gas 9 and the condensed saturated water 17. The hot tailing water 13 exchanges heat in non-direct heat exchanger 12 where the water heats the cold process water while cooling the tailing water. The cooled tailing water 15 is directed to the tailing pond where its acidity (especially due to the CO2 and SO2 gas remains from the fuel combustion) might accelerate the steeling time for the fine tailings, thus decreasing the tailing pond size. The recycled water 16 after heating to generate hot process water 14 is used for the ore preparation. The pressurized NCG 17 can be used for aerating the slurry or for expansion on a turbo expander for producing energy, as described in previously figures. The amount of SO2 in the discharged gas 9, even with the use of lime stone slurry with the MFT, will be higher than, for example, in FIGS. 3A and 4 where the SO2 it is removed in two stages (the calcium that didn't react in the wet scrubber flows backwards to the DCSG). This option, for increasing the acidity of the tailing pond using SO2 (and to a much smaller extent, with the high level of CO2 presence in the DCSG combustion gases), can be used with the previous Figures. However, even if the acidity will accelerate the FT separation, it will be required to remove the acidity from the recycled process water before it is reused (to bring it to a pH that is only slightly caustic) and to investigate the environmental impacts of acid tailing ponds. Tailing water 19 from the oilsands facility 18 is discharged to the tailing pond. MFT 20 from the tailing pond is directed to mixer 29 where it mixes with the hot solids 8 generated by the DCSG 8 to generate cooled and stable solid back-fill material that can support traffic. Characters 44, 45, 46 and 47 are described in FIG. 16.

Figure 18:
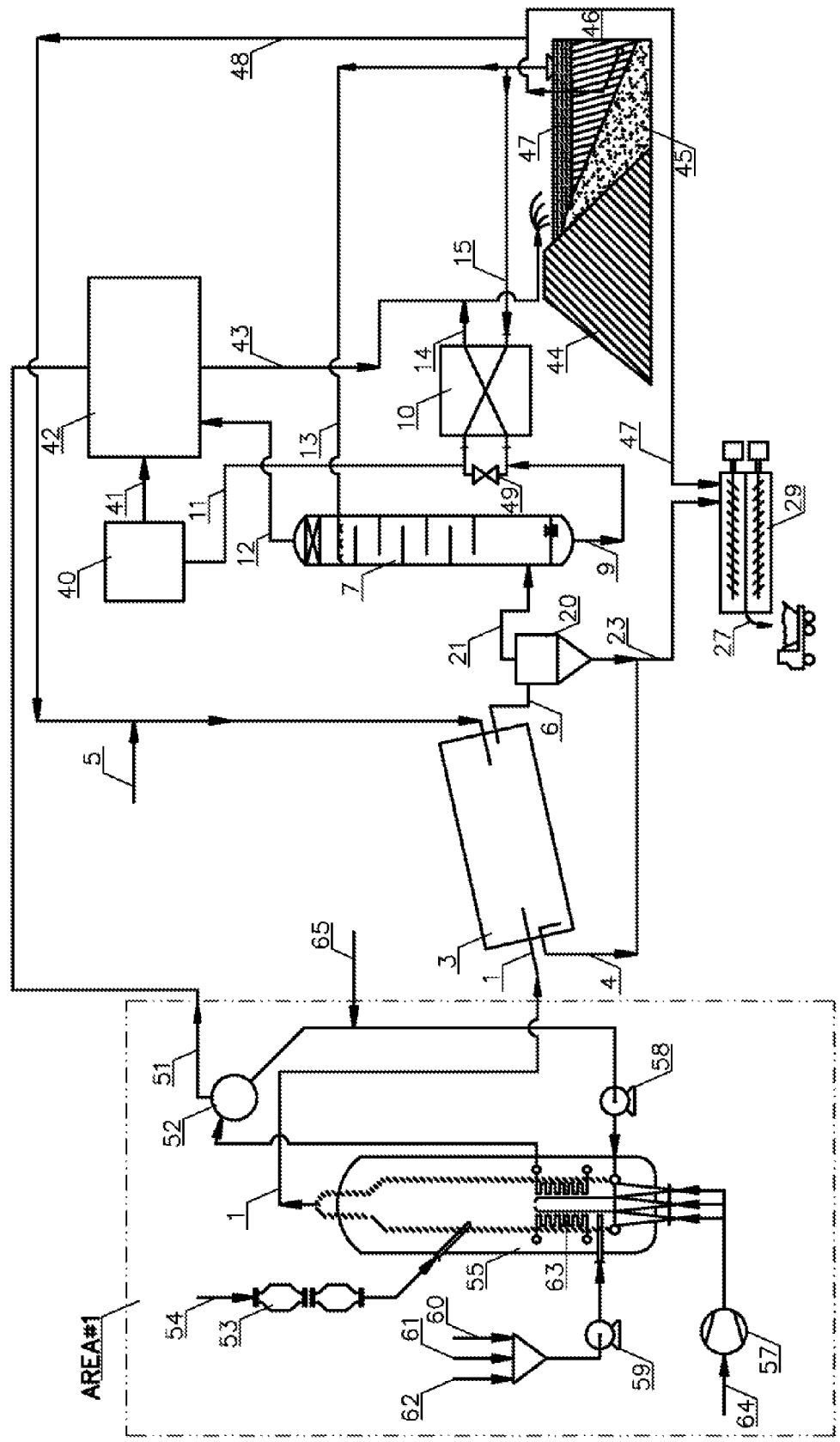
FIG. 18 is a schematic view of the present invention with an open mine oilsand extraction facility and a prior art commercially available pressurized fluid bed boiler that was used for combustion coal for power supply.

FIG. 18 is a schematic view of the invention with an open mine oilsand extraction facility and a prior art commercially available pressurized fluid bed boiler that uses combustion coal for power supply. Examples of pressurized boilers are the Pressurized Internally Circulating Fluidized-bed Boiler (PICFB) developed and tested by Ebara, and the Pressurized-Fluid—Bed-Combustion-Boiler (PFBC) developed by Babcock-Hitachi. Any other pressurized combustion boiler that can combust petcoke or coal can be used as well. AREA #1 is a prior art Pressurized Boiler. Air 64 is compressed 57 and supplied to the bottom of the fluid bed combustor to support the combustion. Fuel 60, like petcoke is crushed and grinded, possibly with lime stone 61 and water 62, to generate pumpable slurry 59. The boiler includes internal heat exchanger 63 to generate high pressure steam 51. Dry fuel 54 can be fed to the pressurized boiler through dry feeding system 53 which includes a set of pressurized chambers. The steam 51 is generated from steam boiler drum 52 with boiler water circulation pump 58. The boiler heat exchanger 63 recovers energy from the combustion. BFW 65 is fed to the boiler to generate steam 51. The steam can be used in the bitumen plant for various uses like flashing solvent and traditional heating of the produced water. The boiler generates pressurized combustion gas 1 at a pressure of 103 kpa and up to 1.5 mpa and temperatures of 600 C-900 C. The discharge flow can include a cyclone (not shown) to recycle unburned fuel back to the fluid bed. The cyclone will be simple compared to the solid separation required in the prior art. The reason is that in the prior art, the hot combustion gas from the PFBC expands on a gas turbine to recover energy and after that it is released to the atmosphere. The gas turbine is sensitive to solid particles (both for abrasive particles and for particles that intend to be deposited on the turbine stators and rotors). The discharge to the atmosphere is even more stringed and will required filter bags or electrostatic separators, together with gas scrubbers, to remove some amount of SOxs and NOxs to meet the specified level. In my application there is no need to remove solids from the combustion gas 1 because this gas is fed to the DCSG 3 where additional solids are created (due to the conversion of MFT to solids and gas). Solids from the fluid bed of the PFBC 55 can be recovered to maintain the fluid bed solids level. (This is a common practice in FBC (Fluid Bed Combustion) and PFBC). The solids are directed and added (not shown in FIG. 18) to the solids discharged from the DCSG in lines 4 and 23. The fluid bed solids can be mixed with the DCSG solids and discharged as a stable solid waste 27 possibly with additional MFT 47 that can be back-filled and used to support traffic. The pressurized combustion gases leaving AREA#1 are mixed with MFT 48 and possibly with other low quality waste water and slurry sources 5, like HLS/WLS sludge produced by SAGD/CSS water treatment plant. Additional lime stone can be added to the DCSG. There are a few designs that can be used as the DCSG 3. The solids in dry form, possibly with a small amount of water to reduce dust problems, are discharged from the DCSG. Another option is to add a solids separator 20 at the DCSG discharge flow line 6. This might not be required if the solids are removed effectively from the DCSG lower section, and especially if they contain a high enough water humidity to control the generated dust. The amount of water required with the discharged solids 27 will be according to the back-fill specification. The heat within solids 23 can evaporate portion of the eater within the MFT 47. The maximum amount of humidity in the discharged solids should be allowed as long the solids are stable enough to be transported by standard oilsands mine equipment and support traffic. This will maximize the amount of MFT consumed in the process and minimize possible dust problems. The heat from the combustion NCG and from the steam leaving the DCSG 21 is recovered by direct contact heat exchange and condensation with liquid water 13. The hot water from tower 7, with the condensing steam from flow 21, is used by non-direct heat exchange 10 to heat the process water 15 which is used 11 in the oilsand mine ore preparation facility 40 for mixture with the mined oilsand ore. The cool condensate 14 (that was originally generated from the MFT in the DCSG), that possibly contains low levels of sulfur and nitrogen acids and some solid remains as well, is separated to recycled water 43 and fine tailings 64 in a tailing pond. The water recovery and thermal efficiency in this scheme is lower than in, for example, the heat and water recovery described in FIG. 12 or FIG. 3A. However, this configuration can be simpler to implement and less sensitive to solids, acids and other contaminations in the generated gas. If the levels of contamination in the heated scrubbing water 9 are acceptable for use in the ore preparation facility, the heated scrubbed water can be directed there 49, as described in FIG. 12. The NCG 12 from direct contact heat exchanger and scrubber 7 can be used in the extraction facility for froth aeration or as a source for light hydrocarbons. One possible problem with using it will be the change in pH from caustic to light acidity due to the high percentage of CO2 in the combustion gas. The impact of that on the extraction and separation process should be examined further and tested. The MFT 46 is supplied to the DCSG 48. Some MFT 47 can be directed and mixed with the extracted solids to increase their humidity content as previously described. The tailing pond characters 44, 45, 46, and 47 are previously described in FIG. 16. The oilsands facility characters 40, 41 and 42 are previously described in FIGS. 13, 15 and others.

Figure 19:
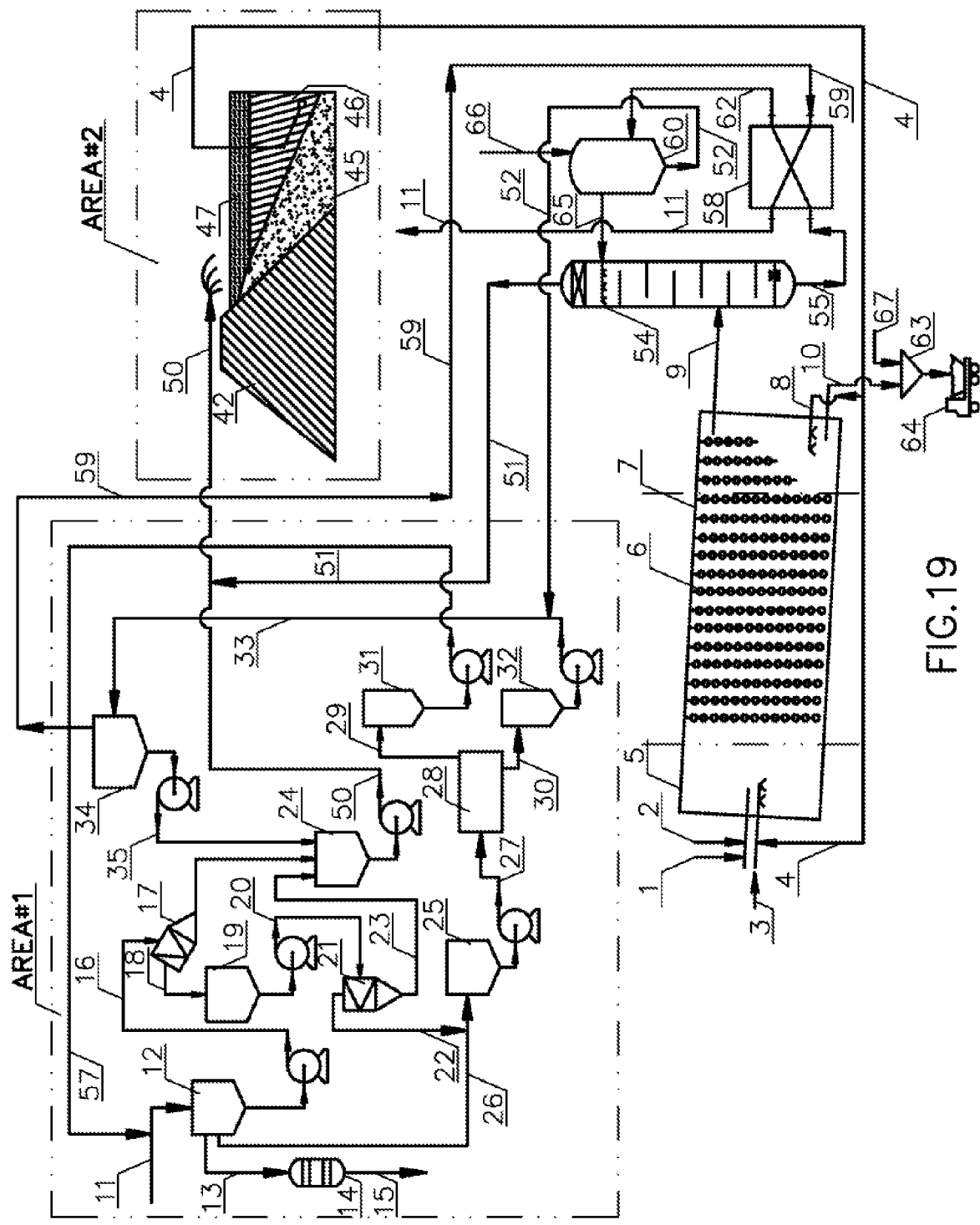
FIG. 19 is a schematic view of the present invention with an open mine oilsand extraction facility that includes cyclones and thickeners, a tailing pond, a rotating direct contact steam generator and with indirect heat exchange.

FIG. 19 is a schematic of the invention. AREA 1 includes a prior art extraction facility. (See "Non Segregating Tailings at the Horizon Oil Sands Project" presented by Canadian Natural Resources Limited on December 2008 at the International Oil Sands Tailings Conference in Edmonton, Alberta). Hot water 11 is mixed with oilsand ore (not shown) and hydro transported 11 to PSC (Primary Separation cell) 12. Bitumen Froth 13 is separated from the PSC and after deaeration 15 in froth deaerator 14, is supplied to the Froth treatment facility (not shown). The water, solids, and bitumen remains are pumped 16 from the bottom of the PSC 12 and directed to the first stage cyclones 17. The water and solids are discharged from the cyclone bottom and directed to NST (Non Segregating Tailing) pump box 24. The water, with some bitumen, 18 flows to the second stage cyclone feed pump box 19 and from there it is pumped 20 to the second stage cyclones 21. The water and solids 23 from the second stage cyclones are directed to the NST pump box 24. Water, with bitumen recovered from the second cyclone top 22, together with water, bitumen and solids recovered from the middle of the PSC 26, is directed to a flotation feed pump box 25 and pumped 27 into flotation cells 28. From the flotation cells the flotation froth 29 is recovered and recycled 57 from the flotation froth pump box 31 back to the PSC. The tailings 30 are recovered and pumped 33 from the flotation tailings pump box 32 to a thickener 34. Process water 59 is recovered from the thickener for reuse. The thickened tailings 35 from thickener 34 are pumped to the NST pump box 34 and from there the tailings are pumped 50 to AREA 2 tailing pond. To accelerate the settling in the tailing pond the combustion gas 51 that are rich with CO2 and possibly SO2 are mixed with the tailings stream 50. The recovered process water 59, possibly with make-up water from other sources, and recycled water 47 from the tailing pond (not shown), are directed to a heat exchanger 58 where it heats the water using the heat recovered from the DCSG gas discharge to generate hot extraction water 11. The tailing pond described in AREA#2 includes characters 42, 45 and 46 described in FIG. 16A. A DCSG 6 heats MFT 4 with hot combustion gas. Additional MFT 8 is added close to the solids discharge to generate slurry, scrub fly solids from the gas and to increase the overall consumed MFT. The discharged hot slurry 10 is mixed with air 67 in mixer 63 to remove additional water from the tailing to generate cooler stable solids 64 that can be use for back-fill. The produced steam 9 is condenses in direct contact heat exchanger with liquid water. The gas 9 heat is recovered to heat cold process water 59 to generate hot process water 11. The hot liquid flow with the scrubbed solids 55 is used to heat that remained in gas flow 9. The cooler water 62 is separate in separator 60 to a solids rich flow 52 that is added to the fine tailings and to a solids lean flow 65 that is sprayed 54 into steam 9. Make-up water 66 is added to the system to replace the solids rich discharged flow 52 and the evaporated water 51. The system characters 1, 2, 3, 4, 5, 6, and 7 are described in FIG. 3A, however, any other configuration, as described in FIGS. 2A-D, with internal fired DCSG or external PFBC connected to DCSG, can be used as well. The condensate 52 from the MFT and that was gasified in the DCSG 4, is recovered and directed to the thickener 34. Any acidity or solids are diluted and removed in the thickener, and eventually recovered and recycled back as process water. The cold NCG combustion gas, after the steam and the water are recovered, is mixed with the NST (Non Segregating Tailings) to reduce the low pH occurring due to the high content of CO2. Four Streams 11, 51, 52 and 59 connection between the prior art extraction plant described in AREA #1 and the proposed method. Any other extraction configuration in AREA #1 can be used as well.

Figure 20:
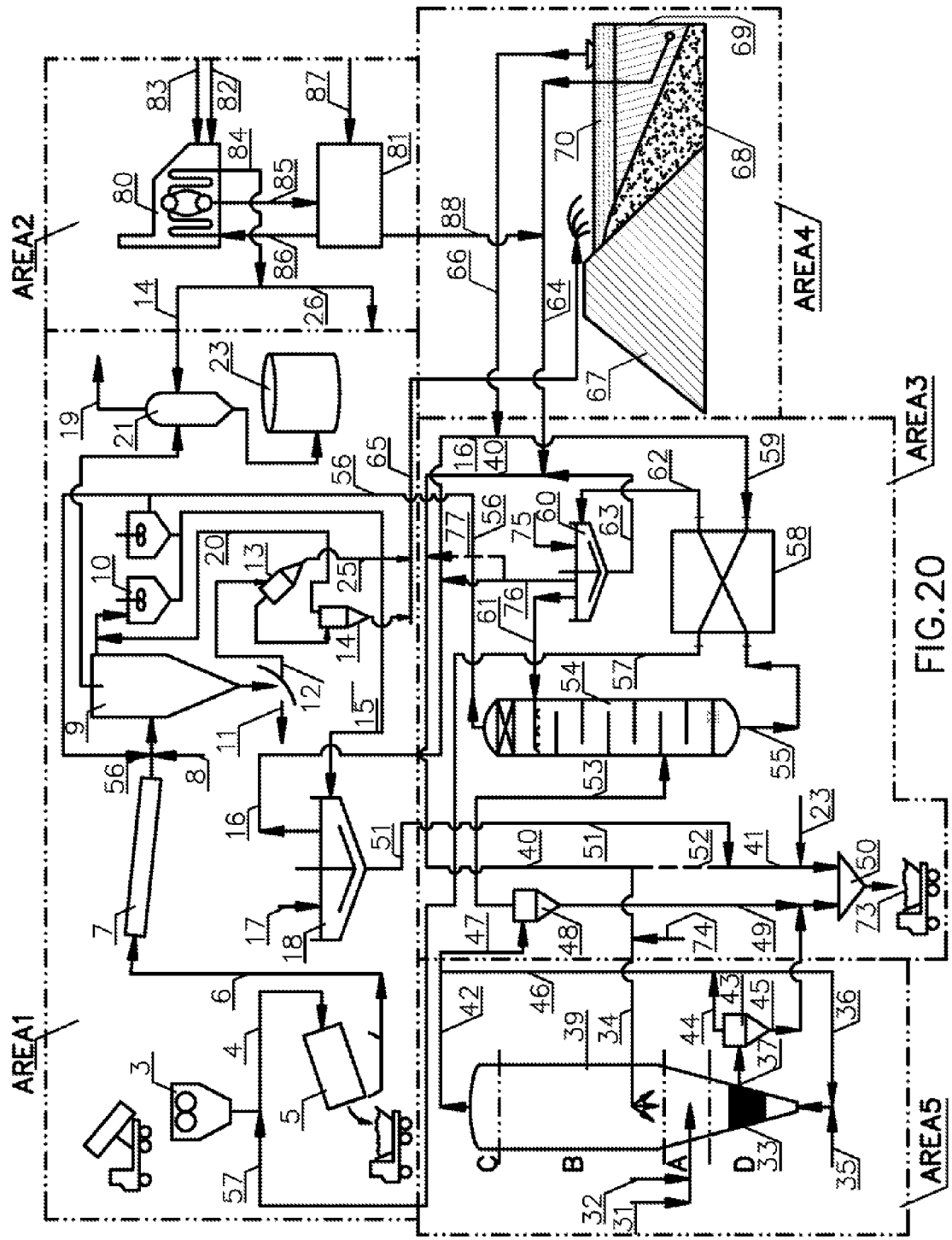
FIG. 20 is a view of the present invention with an open mine oilsand extraction facility with 5 areas where AREA1 is the oilsand mine plant, AREA2 is a steam generation facility, AREA3 is the process water heating area, AREA4 is the tailing pond area with MFT pumping and AREA5 is the pressurized up-flow boiler with MFT injection for steam generation.

FIG. 20 is a schematic of an oilsand mine plant of the present invention divided into a few areas. AREA 1 describes a schematic view of an oilsand plant that includes elements from the plant described in FIG. 11 and the Extraction described in FIG. 19. FIG. 11 describes the following characters 3, 57, 4, 5, 6, 7, 18, 17, 16, 8, 9, 10, 11, 12, 21, 23 and 14. The discharge from PSC 9 is separated in a first cyclone separator 13 and in a second cyclone separator 14. The fine tailings from the first cyclone 25 and the second cyclone discharged into the tailing pond 65. The bitumen froth from the second cyclone separator 20 is recycled back to the floatation cells 10. The water and solids 15 from the flotation cells 10 discharged to thickener 18. AREA 2 includes a steam generation facility, where water 87 and boiler blow-down 85 is treated in water treatment facility 81, as described in FIG. 9, to generate BFW 86. Fuel 83 and air 82 is combusted in boiler 80. Liquid waste discharge 88 from the water treatment facility is recycled with the tailings. The generated steam 84 used in the extraction and bitumen treatment plant 14 and in the froth treatment plant 26 for stripping gas 19, solvent etc. The fuel 83 used for the steam production in AREA 2 is typically natural gas, to eliminate expensive scrubbing facilities. AREA 4 includes the tailing pond. MFT 64 is recovered from the tailing pond in order to be gasified in direct contact with combustion gases. The tailing pond includes confinement dyke 67, course tailings 68, MFT layer 69 and recycled water 66 pumped from the top layer 70 of the tailing pond. Some additional MFT 41 can be removed by mixing it with the dry solids 45 and 49 generated from the combustion and from the evaporation of the MFT when it is exposed to high temperatures. AREA3 is used for transferring the heat from the generated steam rich gas stream 53 to generate the hot process water 57 for mixing it with the oilsands ore. AREA 5 includes a fluidized bed up-flow DCSG. Fuel 31, like petcoke, and oxidizing gas 31, like air, is combusted to generate an up-flow stream of combustion gas. MFT 40 is spread into the upflow combustion gas stream. The solids are supported by circulating up-flow combustion gases 36. Solids 49 and 45 are removed in a dry form where they are further mixed with MFT to prevent dust problems and to remove additional MFT from the tailing pond. AREA 5 includes a vertical fluid bed MFT evaporator 39. In section A fuel 31 and oxidizer 32 are burned to generate heat. Fine tailings 34 is sprayed, possibly with other chemicals 74, in section B located above section A where due to the heat it converted to gas mainly steam and solids. Section D at the bottom includes a fluid bed 33 with oxidizer injection 35 and recycled produced steam and combustion gas injection 36. Solids 37 are removed from the fluid bed with carry gas 44 that is separated from the solids in cyclone 43. The produced gas 42 removed from section C where portion 46 can be recycled to the fluid bed. There are a few systems and designs that can be used in AREA5, some of them described in other figures of the present invention, like the fired DCSG in FIG. 12A or the PFBCB of FIG. 18. The PFBCB can replace the steam generation facility in AREA2, as some of the combustion heat can be used for generating the steam for the extraction and bitumen processing facility of AREA1. AREA 3 includes the solids removal and the hot extraction water generation. Solids 49 are separated from the produced steam 47 in separator 48. The hot and dry solids, together the solids from the fluid bed 45 are mixed 50 with FT 41 and air 23 to remove additional water and generate stable solids 73 that can be used for back-fill. The fine tailings 41 includes tailings 51 discharged from thickener 18 as well as a controlled flow 52 of MFT 40. The heat and vapour from the produced steam 53 is recovered in vessel 54. The hot condensate 55 that also scrubbed the solids remains in flow 53 is heating the process water 59 in heat exchanger 58. The cooled condensate and scrubbing water 62 are separated in a thickener 60. Fine tailings 63 are removed from the thickener. Chemicals 75 to accelerate the thickening separation can be added to the thickener. Water 61 from the thickener is recycled back to vessel 54. The solids lean water from the thickener 76 are heated through the heat exchanger 58 and used as the hot process water 57. For upset situation it is possible to direct water 77 from the thickener to tailings line 40. The coiled NCG that can include light hydrocarbons introduced with the fine tailings as well as other NCG gas are used in the extraction process described in AREA 1.

EXAMPLE 1

Figure 21:
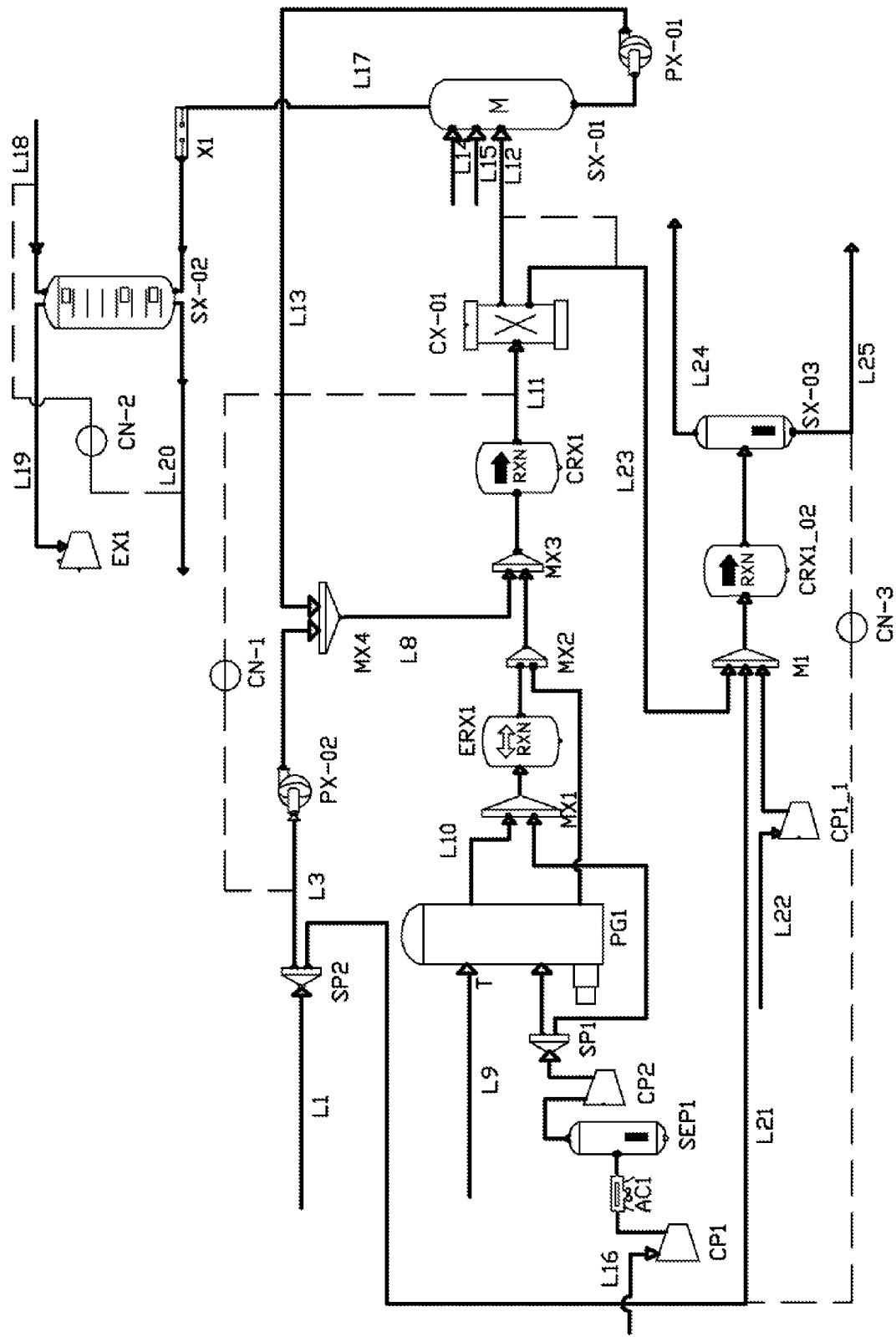

The following example, as shown in FIGS. 21, 22, and 23, is a simulation of the present invention that was done using a VMG Sim simulation program. Coal feed with high sulfur content in a slurry form, together with compressed air, was fed into a Plasma gasifier PG1. The system pressure is 10 bar. The coal flow burned in the process is 1.08 mt/hour. The amount of sulfur in the coal was increased in the simulation to 13.8%, which is more than four times the amount of sulfur in low grade coal, to check the sensitivity of the process. Some air by-passes the gasifier and is mixed with the syngas to generate additional heat and for full combustion. Flow L8, composed of pond water and make-up water, is supplied with the lime stone to SX-01 and mixed with the combusted syngas to generate a stream of gases and solids. The Flow L8 includes the pond water (MFT) together with the recycled water that includes the solids that by-pass the solid separator and the lime stone solids. The Flow L8 is 11.7 mt/hour at a temperature of 81 C and has a 24% solids content by weight. The discharge from CRx1, called Flow L11, is the discharge from the DCSG before the removal of the solids (it is different from the DCSG where the solids are removed with some water content to prevent dust as was described in FIG. 3A, for example). Pond water with 23% solids is supplied to the process at a rate of 6.9 mt/hour and at a temperature of 25 C. Water L15 and lime stone is supplied to SX-01. The Water L15 is different from the process water used, after heating, for mixture with the oilsand ore. It can include fine tailings as long they will stay in a liquid form, even after adding the lime stone and the by-pass solids. In another example, the whole stage of SX-01 was eliminated and replaced directly with the "Water Recovery Tower" as described in FIG. 2A, FIG. 12 etc. where the solid remains are scrubbed by the oilsands plant hot process water (stream L20) and the lime stone is supplied with the petcoke fuel or with the "Pond water" (MFT water that will replace the Flow L8 in the present simulation). One option is to supply dry solids from separator CX-01 are supplied to mixer M1 where they are mixed with additional MFT (and therefore removing additional MFT from the tailing pond) with low pressure air to oxidize the generated $CaSO_3$ to gypsum and increase the water content in the solids to reduce potential dust while still having a stable, solid material that can be used as back-fill and to support traffic. The saturated steam and combustion gas mixture from multi feed separator SX-01, named Flow L17, is at a temperature of 167 C, has a mass flow of 21 mt/hour and includes 52% steam, and the rest is the combustion NCG. The Flow L17 is directed to the water recovery tower SX-02, where it is washed with cold water L18, which is the water supplied from the oilsand mine plant and used, after heating, for the extraction process for mixing with the oilsands ore. The cold water L18 flow is at a temperature of 20 C and has a mass flow of 93.4 mt/hour. The cold non-condensable gases expand on turbo-expander EX1 with an efficiency of 48% and generate 240hp. The produced hot water L20 temperature is 90 C with a mass flow of 104.3 mt/hour. The additional water in the heated process water is due to the steam condensation from the flow L17, which includes 52% steam. The produced hot water L20 is directed to the oilsand plant, where it is mixed with the oilsands ore for extracting the tar. The $CO_2$ product ratio (defined as the amount of product hot water at 90 C) generated per 1 kg of generated $CO_2$ is 40 [kg $H_2O$/kg$CO_2$], (without considering the air compression electrical consumption).

EXAMPLE 2

Figure 24:
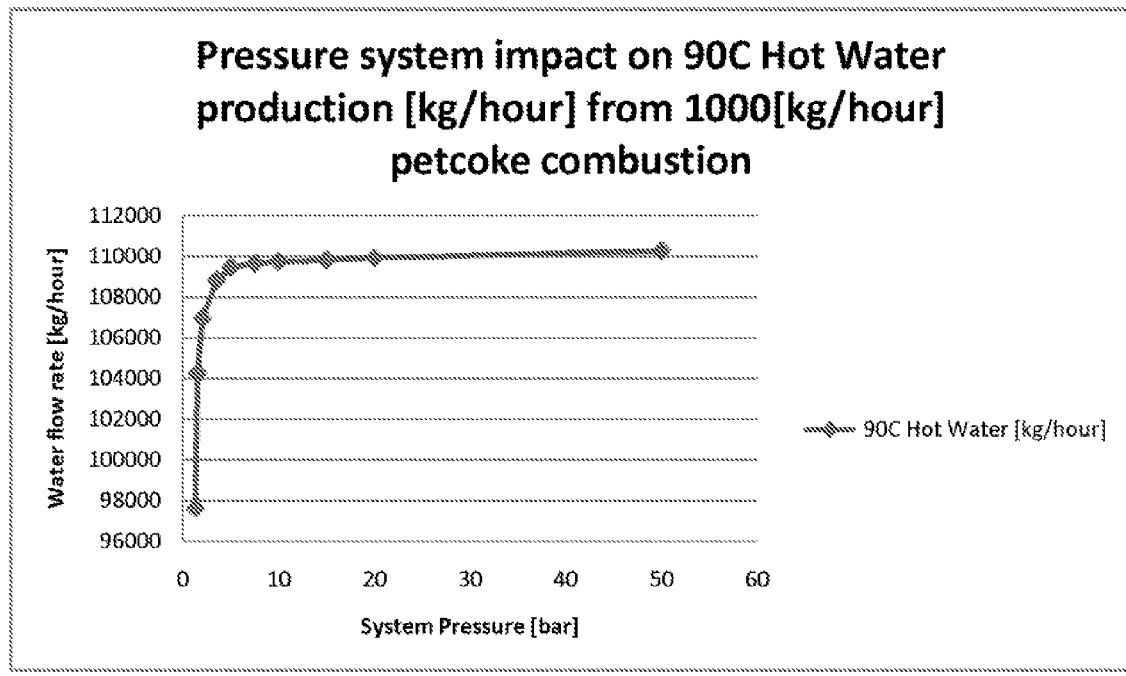
FIG. 24 is a graph illustration of System Pressure and Water Flow for process simulation according to Example 2.

The graph of FIG. 24 is a simulation of the system pressure's impact on the performance of the process as described in FIG. 2A. The variable in this process is the system pressure. The heated process water 9 is at a temperature of 90 C. The graph below is for the combustion of 1000 kg/hour of petcoke, the fuel, in air. The pressure is in bars. The conclusion that can be drawn from the simulation graph is that the optimal pressure for that particular system is in the range of 1.25 bar to 10 bar. Beyond that pressure of the recovery, the efficiency increases slightly, but the facility TIC (Total Installed Cost) and operation costs will increase dramatically due to the higher pressure.

EXAMPLE 3

The following results show the simulation of a hot water generation system, as described in FIG. 12. The system pressure is 10 bar. The simulation balance was done for 1 ton/hour of petcoke. Flow S-1 on the spreadsheet is stream 43 on FIG. 12 which is MFT with 23% solid concentration. Flow S-3 is flow 48 on FIG. 12 which is petcoke fuel. Flow S-2 is flow 49 on FIG. 12 which is the combustion gas (air). Flow S-6 is flow 47 on FIG. 12 which is the discharged gas and steam stream from the DCSG. The discharged gas during the simulation was at about 300 C. The discharged gas temperature could change the amount of MFT that is converted to hot water and solid waste per each ton of fuel (or per each ton of generated hot process water). Reducing the DCSG discharged gas temperature will increase the amount of MFT 43 consumed by the DCSG. Stream S-7 is stream 51 on FIG. 12. 90% of the MFT solids are removed through S-7 and the rest carries on to S-6. It is expected that the discharged solids will include some water. However, to simplify the simulation it is assumed that all the water evaporates. Stream S-8 is the cold process water supplied from the tailing pond 41. It is assumed that the tailing pond recycled water is at 20 C. Stream S-10 is the generated hot process water. The heated process water temperature is 90 C.

The bottom-line is that, as the simulation results show, for each one ton/hour of combusted petcoke, about 100 ton/hour of 90 C heated process water is generated. About 12 tons/hour of MFT are converted to process hot water and dry solids. This does not include the additional MFT that can be removed by mixing the generated "water starving" dry solids from the DCSG with additional MFT or even with the dewatered centrifuge MFT "cake".

gas will not be so widely available as it is today and will be preserved for residential use, the correct comparison should include the amount of CO2 that will be generated from hydrocarbon gases produced from burning coal (like with the Fischer-Tropsch synthesis), This will add significant amounts of CO2 to the produced gases, even without taking into consideration the significant TIC and operation costs for such facility.

EXAMPLE 5

The simulation results in FIG. 26 show a simulation of a hot water generation system, as described in FIG. 2B, with different system pressures. The simulation balance was done for 1 ml of petcoke.

EXAMPLE 6

Figure 27:
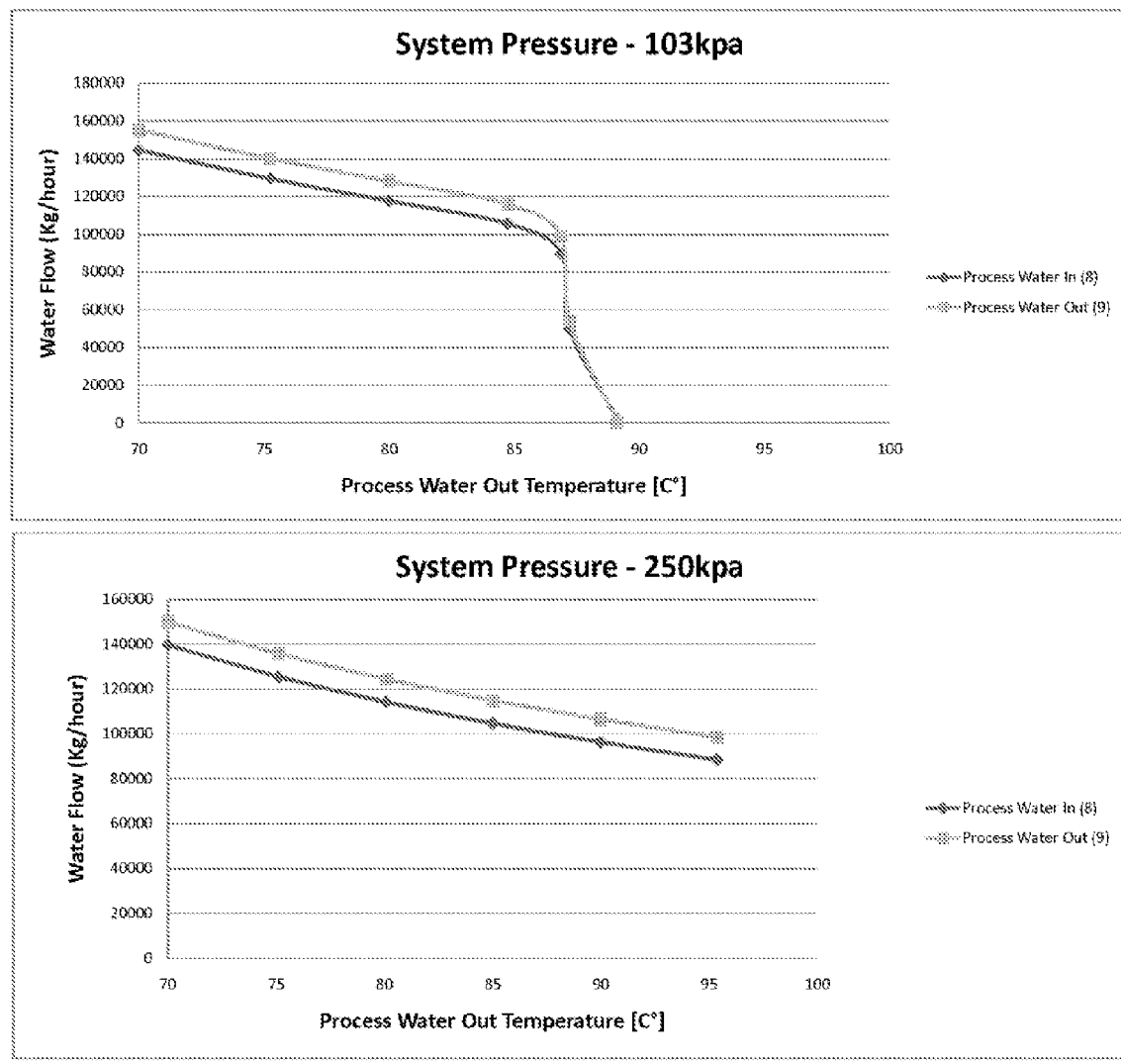
FIG. 27 shows a series of graph illustrations of the process simulation of the present invention according to Example 6.

The simulation results in FIG. 27 show a simulation of a hot water generation method, as described in FIG. 2B, for two

|  | S-1 (WATER) | S-2 (AIR) | S-3 (FUEL) | S-5 | S-6 | S-7 | S-8 | S-10 |
|---|---|---|---|---|---|---|---|---|
| T, C. | 20.00 | 25.00 | 25.00 | 299.73 | 299.73 | 299.73 | 20.00 | 89.98 |
| Enthalpy, MJ/h | −165005.00 | −97.30 | 0.00 | −165103.70 | −152754.60 | −12349.13 | −1467370.00 | −1580274.00 |
| Mass Flowrate, kg/h | 12311.00 | 12527.84 | 1000.00 | 25838.84 | 23281.94 | 2556.90 | 92300.00 | 101463.90 |
| H2O | 9470.00 | 0.00 | 0.00 | 9470.00 | 9470.00 | 0.00 | 92300.00 | 101179.80 |

EXAMPLE 4

FIG. 25 shows the simulation results of a simulation of a hot water generation system, as described in FIG. 11A, with different system pressures. The simulation balance was done for 1 ton/hour of petcoke. To simplify the simulation and to create a comparison base, it was assumed that all the steam generated in the pressurized boiler was used for heating the process water from 20 C to 75 C with no heat losses. The results were compared to a "standard" coal fired boiler and natural gas fired boiler at closed conditions. In comparison, a Natural gas boiler is presented in AREA2 in FIG. 11. The CO2 product ratio is defined as the amount of product (hot water at 75 C) generated per 1 kg of generated CO2 was found to be as follows:

The ratio for "standard atmospheric coal" boiler was 33.9 [kg H2O/kgCO2] The ratio for the system in FIG. 11A in different system pressures was as follows:
For a pressure of 103 kpa, the ratio was 34.15 [kg H2O/kgCO2]
For a pressure of 2 bar, the ratio was 37.9 [kg H2O/kgCO2]
For a pressure of 5 bar, the ratio was 41 [kg H2O/kgCO2]
For a pressure of 10 bar, the ratio was 43.25 [kg H2O/kgCO2]
The ratio for a standard atmospheric natural gas boiler was 74.9 [kg H2O/kgCO2]
The results show that the efficiency of the system in FIG. 11A is higher than the efficiency that can be expected if a "standard coal" boiler was used; this is shown even without considering the cleaning facilities required to clean the combustion gas to remove acid gases and flying particles before they can be released to the atmosphere. The CO2 efficiency of the natural gas boiler (not the thermal efficiency) is significantly higher, even when compared to the high efficiency 10 bar system. The reason for that is: burning natural gas generates water that contributes a significant amount of the heat energy. On a more general note, because coal is a much more widespread fuel resource compared to natural gas, in the future, when natural different system pressures. The simulation balance was done for 1 ton/hour of petcoke. The simulation shows the amount of generated hot process water as a function of the process water temperature. The results shows that for the particular process feeds and assumptions, generating high temperature water at 90 C will require a higher combustion pressure system. If the temperature of the process water can be slightly reduced (to the range of 80 C-85 C), the system pressure can be reduced to 103 kpa without significant impact on the overall process performance. The biggest advantage for reducing the system pressure will be a reduction in the TIC cost and the operation costs. The cost and complexity of a Pressurized Fluid Bed Boiler will be significantly lower for pressures as low as 103 kpa in comparison to a typical combustion pressure of 1000 kpa that is generally used for generating electricity.

EXAMPLE 7

Figure 28:
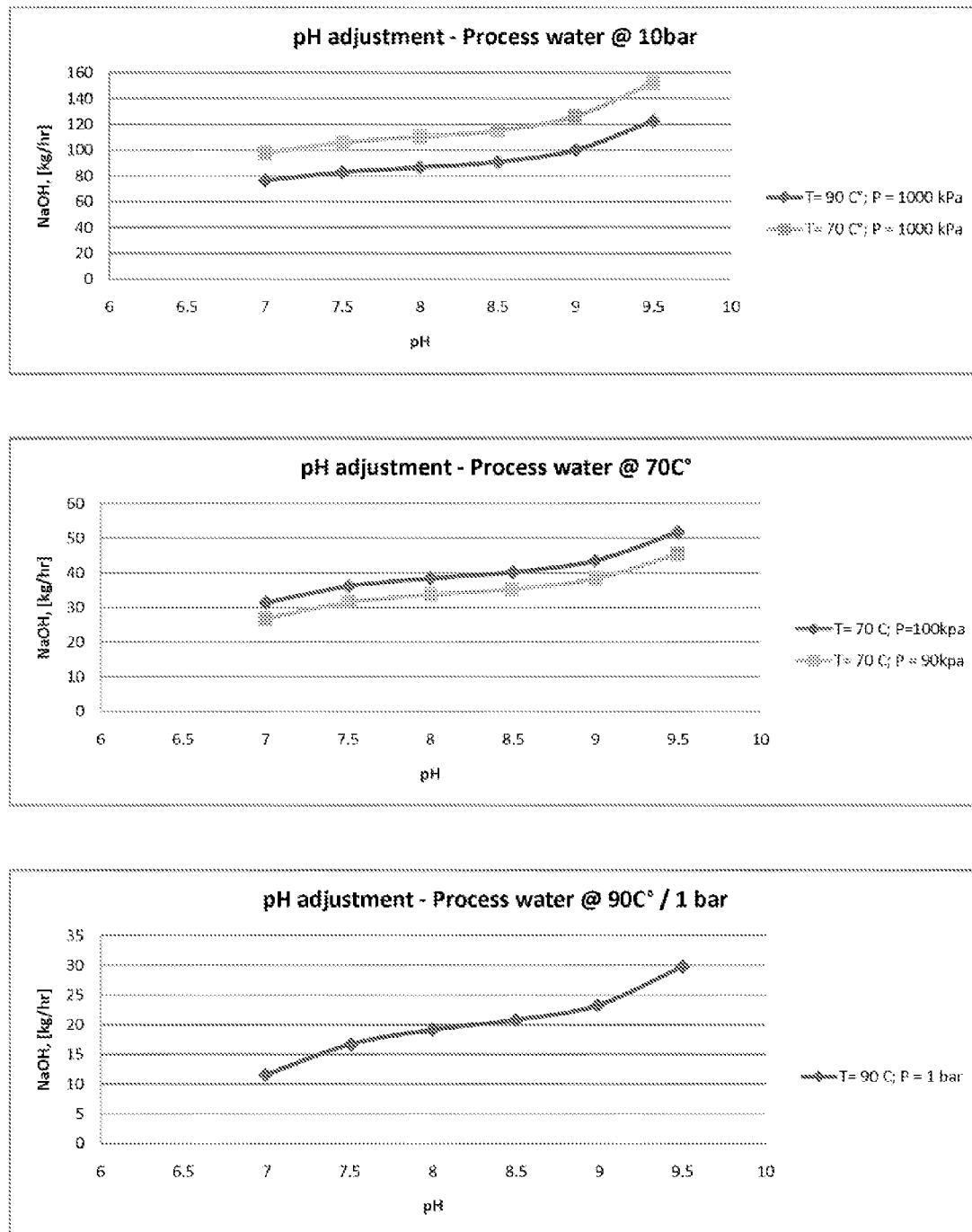
FIG. 28 shows a series of graph illustrations of pH adjustment in the process simulation of the present invention, according to Example 7.

The simulation results described in FIG. 28 show the simulation of a pH adjustment method, as described in FIG. 2D. The system pressure varies between 1000 kpa and 90 kpa. The simulation balance was done for 100 metric ton/hour of hot process water. The simulation shows the amount of soda caustic to generate alkali process water for extraction with the use of direct contact heating of the process water with the combustion gas. The combustion gas might have "strong acid" gases (like SOx and NOx) that can be almost entirely removed during the combustion and by integrated dry or wet scrubbing (like adding lime stone slurry to the fuel and to the fine tailing water injected to the combustion chamber or to the combustion gas, as previously described). However, the combustion gas includes large amounts of "weak acid" CO2 as a basic part from its composition. The CO2 generates carbonic acid with water. This will immediately react and remove the caustic in the process water. One solution can be to use non-direct heat exchange with the process water. This can be done through a gas-liquid non-direct heat exchanger/condenser, as described in FIG. 6, 15 etc., or by direct contact heat exchange with the combustion gas using a liquid-liquid non-direct heat exchanger as described in FIGS. 3, 3A, 9 etc. Another solution, as described in FIG. 2D, will be to use a direct-contact heat exchanger but to minimize the amount of NaOH required. The example shows that by increasing the temperature of the process water and reducing the pressure to remove soluble CO2 from the process water, the amount of NaOH can be minimized as described in FIG. 28.

I claim:

1. A method for producing bitumen, the method comprising the steps of:
   combusting carbon based fuel at a controlled pressure and temperature;
   evaporating solids-rich water with combustion heat so as to generate steam, solids and combustion gas mixture;
   separating the solids from the gas mixture to generate a solid lean gas stream;
   extracting heat from the solid lean gas stream while condensing the steam to condensed water;
   heating process water with extracted heat; and
   extracting bitumen with heated process water.

2. The method of claim 1, further comprising the steps of:
   after the step of extracting heat from said solid lean gas stream,
   mixing said condensed water with oilsands ore to generate a slurry; and
   recovering bitumen from said slurry.

3. The method of claim 1, wherein the step of separating the solids further comprises:
   mixing saturated water with said solid lean gas stream at a controlled pressure to scrub remaining solids and contaminant gases to produce a saturated steam and solids free combustion gases mixture; and
   recycling at least a portion of the saturated water with scrubbed solids back to the step of evaporating solids-rich water with combustion heat to generate steam, solids and combustion gas mixture.

4. The method of claim 3, further comprising:
   condensing the saturated steam to generate heat and de-mineralized additional condensed water for steam generation.

5. The method of claim 3, where the fuel contains sulfur, the method further comprising the steps of:
   adding alkaline chemicals to said saturated water;
   scrubbing remaining solids and acid gases with said alkaline chemicals;
   producing saturated steam and solid rich saturated water; and
   recycling at least a part from said solid rich saturated water back to a solids-rich water feed for the step of evaporating said solids-rich water with combustion heat.

6. The method of claim 5, further comprising the steps of:
   condensing the saturated steam to generate heat and clean condensed water;
   generating steam with the heat and clean condensed water; and
   injecting the steam into an underground formation through an injection well for enhanced oil recovery.

7. The method of claim 1, where the fuel contains sulfur, the method further comprising the steps of:
   adding an alkaline chemical to said fuel or to said solids-rich water so as to reduce an amount of generated acid gases.

8. The method of claim 7, wherein said alkaline chemical is comprised of lime sludge from a water softening process.

9. The method of claim 1, further comprising the steps of:
   heating boiler feed water with the heated process water; and
   recovering oil with steam from the boiler feed water.

10. The method of claim 1, wherein the combustion is a partial combustion generating synthetic gas.

11. The method of claim 10, further comprising:
    combusting at least a portion of the synthetic gas with oxidizing gas;
    mixing non-segregating fine-tailings with the gas to evaporate water from the fine-tailings and to generate a stream of steam, solids, and combustion gas; and
    separating the solids from a gas phase to generate a solid-lean gas stream of steam and combustion gas.

12. The method of claim 10, wherein synthetic gas is a fuel source.

13. The method of claim 10, further comprising the step of:
    producing hydrogen with said synthetic gas.

14. The method of claim 1, further comprising the steps of:
    mixing at least a portion of said steam, solids and combustion gas mixture, after the step of extracting heat from the solid lean gas stream, with water, to reduce the pH by creation of carbonic acid with CO2 in the combustion gas and increasing the settling of different components in the water.

15. The method of claim 1, further comprising the steps of:
    mixing the generated solid with mature fine tailings slurry; and
    forming a construction material that can be back-fill and support traffic.

16. The method of claim 15, wherein a portion of said generated solids generated during said combustion and steam generation stages, is comprised of hydraulic material; and
    wherein mixing said solids with said mature fine tailings water generates hydrates, said hydrates stabilizing said construction material.

17. The method of claim 1, further comprising:
    mixing the solids-rich water with combustion gas into a solids mixture, wherein combustion heat energy changes liquid phase water in said solids mixture into steam.

18. The method of claim 1, further comprising the steps of:
    mixing the generated solid with de-watered mature fine tailing to generate stable material that can be back-fill and support traffic.

19. The method of claim 1, further comprising the step of:
    scrubbing remaining solids into said condensed water to produce a saturated steam and solids free combustion gases mixture.

20. The method of claim 1, wherein said solids-rich water is comprised of fine tailings generated during oilsands bitumen extraction.

21. A method for recovering bitumen from minable bitumen formations, comprising the steps of:
    mining a formation having bitumen and inorganic soil;
    combusting fuel with oxygenated gas under a controlled pressure and temperature to generate a combustion gas, wherein said fuel is carbon based fuel;
    mixing the combustion gases with process water at a controlled pressure to heat said process water;
    mixing the mined bitumen ore with heated process water to generate a slurry;
    recovering bitumen from said slurry;
    recovering said process water from said slurry; and
    recycling said process water to repeat the step of mixing the combustion gases with process water.

22. The method of claim 21, further comprising the steps of:
- adding non segregating fine-tailings during the combustion stage to control the combustion temperature and to evaporate the water from the fine-tailing while generating steam, solids and combustion gases mixture;
- separating the solids generated from the fine tailing from said gas phase to generate a solids lean gas stream of steam and combustion gas; and
- mixing the solids lean gas stream with process water at a temperature lower than a temperature of the solids lean gas stream to condense the steam and generate solids free scrubbed non-condensable combustion gas at a temperature lower than a temperature of combustion.

23. The method of claim 21, further comprising the steps of:
- recovering a portion of said combustion heat to generate pressured steam from de-mineralized water; and
- removing hydrocarbons from said bitumen with at least part of said pressured steam, said hydrocarbons being comprised of solvents and non-condensable gases from said bitumen.

24. A system for extracting bitumen from oilsand ore, the system comprising:
- a combustor means for mixing fuel, said fuel being comprised of carbon based fuel, with oxidation gases, said combustor means forming a mixture, wherein said mixture is combustible under controlled pressures and temperatures therein to generate combustion gases;
- a gas-solids separation unit in fluid connection with said combustor means, wherein combustion gases transfer to said gas-solids separation unit, said gas-solids separation unit separating solids from the combustion gases to generate a solid lean gas;
- a heat exchanger having a controlled pressure enclosure and being in fluid connection with said gas-solids separation unit, said heat exchanger heating process water with said solid lean gas flow in said controlled pressure enclosure so as to generate heated process water and non condensable gases; and
- an oilsands extraction facility in fluid connection with said heat exchanger, said oilsands extraction facility mixing oilsands ore with said heated process water to generate slurry, wherein said slurry is separable into bitumen and slurry water for use as said process water.

25. The system of claim 24, further comprising:
- a direct contact steam generator in fluid connection with said combustor means and said gas-solids separation unit, wherein said direct contact steam generator receives fine tailings water from said oilsands extraction facility, said direct contact steam generator mixing said fine tailings water with a combustion gas to generate a solids, steam and combustion gases mixture, the mixture being transferable to said heat exchanger after said gas-solids separation unit.

26. The system of claim 24, further comprises:
- a solids mixer in contact with said gas-solids separation unit, wherein separated solids from said gas-solids separation unit are contained in said solids mixer so as to mix said separated solids with additives to form a road construction material.

27. A system for extracting bitumen from oilsands formations, the system comprising:
- a combustor, containing fuel, said fuel being comprised of carbon and oxidation gases mixed with said fuel to form a mixture, said mixture being contained therein, said combustor having controlled pressures and temperatures for combustion of said mixture and generating combustion gases;
- a direct contact steam generator being in fluid connection with said combustor and being formed integral with said combustor, said direct contact steam generator containing waste water with solids, said combustion gases of said combustor mixing with said waste water in said direct contact steam generator to evaporate liquids and generate additional steam, combustion gases, and a solids mixture;
- a gas-solid separation unit in fluid connection with said direct contact steam generator, said additional steam, combustion gases, and said solids mixture being transferred therein, said gas-solid separation unit forming a solid lean gas flow by separating solids from said additional steam, combustion gases, and said solids mixture; and
- a heat and water recovery unit in fluid connection with said gas solid separation unit, wherein said heat and recovery unit recovers heat and water from said solid lean gas flow, said heat and water recovery unit being fluidly connected to an oilsands bitumen production facility.

28. The system of claim 27, wherein said combustor is comprised of a fluidized bed combustor, and wherein said combustor is made integral with said direct contact steam generator so as to form an integral unit, and wherein said integral unit comprises:
- a mixing means for solid fuel with waste water to generate pumpable fuel slurry;
- means for injecting additional water into said combustor to control the combustion temperature by evaporating the additional water with combustion heat to form said additional steam, and said solids mixture; and
- a non-direct heat exchanger placed in said integral unit so as to recover a portion of combustion heat to generate pressured steam from de-mineralized boiler feed water in said non-direct heat exchanger, wherein pressured steam is supplied to oilsands extraction facilities.

29. The system of claim 27, further comprises:
- a distillation water treatment plant in fluid connection with the gas-solid separation unit and with the combustor and placed in relation to said gas solid separation unit so as to generate a stream of de-mineralized water with heat from said additional steam, combustion gas and said solids mixture; and
- an enhanced oil recovery facility in fluid connection with said distillation water treatment plant so as to receive said stream of de-mineralized water, said enhanced oil recovery facility having a steam injection well, a produced bitumen and water production well and a separation facility to separate bitumen from water from the produced bitumen and water production.

30. The system of claim 27, further comprising:
- a gasifier in fluid connection with said combustor, said gasifier generating synthetic gases for mixing in said combustor, said gasifier containing fuel, said fuel being a carbon based fuel, and oxidation gases therein, forming a gasifier mixture, and combusting the gasifier mixture under controlled pressures and temperatures.

31. The system of claim 27, further comprising:
- an oilsands open mine facility in fluid connection with said combustor and said direct contact steam generator, said oilsands open mine facility generating a facility process water and a flow of fine tailings by excavating oilsands ore, mixing ore with said facility process water, separating bitumen from the facility process water, and discharging coarse tailings, wherein said flow of fine tailings is in fluid connection with said combustor so as to form said fuel, said fuel having carbon and being combusted under controlled pressure in said combustor, and wherein said facility process water of said oilsands mine facility is heated by said additional steam, resuseable combustion gases, and said solids mixture of said direct contact steam generator, said oilsands mine facility being in a heat transfer relationship with said direct contact exchanger steam generator.

32. The system of claim 27, where said combustor is comprised of an up-flow pressurized fluidized bed combustor.

33. A method for recovering bitumen from a minable oilsands formation, the method comprising the steps of:

mining an oilsands formation, the formation having bitumen and inorganic soil, the step of mining forming oilsands fine-tailings water;

combusting fuel with oxygenated gas so as to generate combustion heat and combustion gas;

heating said oilsands fine-tailings water with said combustion heat, while evaporating water and generating steam, solids and combustion gas;

separating the solids from said combustion gas to generate a solids lean gas phase;

heating a process water flow with heat from said solids lean gas phase;

mixing the mined formation with said heated process water to generate a slurry;

recovering bitumen from said slurry while generating fine tailings.

* * * * *